United States Patent
Bader et al.

(10) Patent No.: US 7,244,053 B2
(45) Date of Patent: Jul. 17, 2007

(54) MOUNTING FOOT FOR LIGHT BAR

(75) Inventors: Joseph F. Bader, Crete, IL (US); Jan C. Mol, New Lenox, IL (US); Sigmund S. Urbanski, Orland Park, IL (US); Charles P. Meyer, New Lenox, IL (US); Robert A. Czajkowski, Tinley Park, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 10/809,664

(22) Filed: Mar. 25, 2004

(65) Prior Publication Data
US 2004/0227370 A1 Nov. 18, 2004

Related U.S. Application Data

(60) Provisional application No. 60/457,491, filed on Mar. 25, 2003.

(51) Int. Cl.
*B60Q 1/26* (2006.01)
*B60Q 1/46* (2006.01)

(52) U.S. Cl. .................. 362/493; 362/487; 362/543

(58) Field of Classification Search .............. 362/542, 362/487, 493, 545; 340/332, 815.45
See application file for complete search history.

(56) References Cited

U.S. PATENT DOCUMENTS 3,721,374 A   3/1973   Eby
3,789,358 A   1/1974   Ellis
4,120,435 A   10/1978  Eby
4,365,232 A   12/1982  Miller
4,588,118 A   5/1986   Ferenc et al.

(Continued)

FOREIGN PATENT DOCUMENTS

EP   0 483 511 A2   5/1992

(Continued)

OTHER PUBLICATIONS

Federal Signal VAMA (Spain), "7000/8000 Series Lightbar Technical Specifications," Dec. 2002, 3 pages.

(Continued)

*Primary Examiner*—Sandra O'Shea
*Assistant Examiner*—Anabel Ton
(74) *Attorney, Agent, or Firm*—Leydig, Voit & Mayer, Ltd.

(57) ABSTRACT

A signaling system for mounting to an exterior surface of an emergency vehicle is provided. The signaling system includes a light bar and a pair of mounting feet. The light bar can include a plurality of signaling devices supported on and distributed along a base member and enclosed by a cover. The light bar can be secured to the mounting feet via a plurality of fasteners. The mounting feet can be connected to the emergency vehicle via roof straps. Each mounting foot can include a base, which can have a support portion, a contoured portion, and a pair of compartments; a pair of seals associated with each compartment; a pair of covers, which can be translucent, removably mounted to the base to enclose the compartments; and a roof strap secured to the base. Each compartment can house a signaling device, such as a lamp assembly.

33 Claims, 57 Drawing Sheets

U.S. PATENT DOCUMENTS

| | | | |
|---|---|---|---|
| 5,009,383 | A | 4/1991 | Chapman |
| 5,028,911 | A | 7/1991 | Wanat et al. |
| 5,091,828 | A * | 2/1992 | Jincks et al. ............... 362/542 |
| D326,621 | S | 6/1992 | Jincks et al. |
| 5,521,806 | A | 5/1996 | Hutzel et al. |
| 5,884,997 | A * | 3/1999 | Stanuch et al. ............. 362/493 |
| 5,911,499 | A | 6/1999 | Stafford et al. |
| RE36,245 | E | 7/1999 | Stanuch et al. |
| 5,947,208 | A | 9/1999 | Ha |
| 6,082,893 | A | 7/2000 | Kassa |
| 6,116,748 | A | 9/2000 | George |
| 6,140,918 | A * | 10/2000 | Green et al. ................ 340/468 |
| 6,623,151 | B2 * | 9/2003 | Pederson .................... 362/542 |

FOREIGN PATENT DOCUMENTS

EP 0 822 631 B1 10/2001

OTHER PUBLICATIONS

Federal Signal VAMA (Spain), "Series 7000/8000 CHL Emergency Light System Parts List, " Jun. 15, 2000, Rev. 4, 4 pages.

1 photograph of Federal Signal VAMA (Spain), Series 7000 light bar FLB-8 Double Lower Alley Head Lamp on sale in the United States prior to Mar. 24, 2005.

Whelen® Engineering Company Inc. (Chester, CT), "Installation Guide Lightbar Mounting Foot Leveler." 2001, 2 Pages.

Whelen® Engineering Company Inc. (Chester, CT) "Lightbar Mounting Guide Permanent & Strap Mount Styles," 1995, 2 pages.

Whelen® Engineering Company Inc. (Chester, CT), "Lightbar Mounting Guide Permanent & Strap Mount Styles," 2003, 2 pages.

Code 3,® Inc. (St. Louis, MO), Installation & Operation Manual, "EXCALIBUR® Dual Level Light Bar," Revision 10, Jul. 2005, pp. 1-24.

Code 3,® Inc. (St. Louis, MO), Installation & Operation Manual, "JAVELIN® Dual Level Light Bar," Revision 3, Jul. 2005, pp. 1-24.

Code 3,® Inc. (St. Louis, MO), Installation & Operation Manual, "LEDX™ 2100 SC Programmable Lightbar System," Revision 1, Nov. 2004, pp. 1-32.

Code 3,® Inc. (St. Louis, MO), Installation & Operation Manual, "LP 6000™ Low Profile Light Bar," Revision 6, Jun. 2001, pp. 1-12.

911EP (Jacksonville, FL), Mounting Instructions Application and Configurations, 2 pages.

Code 3,® Inc. (St. Louis, MO), Installation & Operation Manual, "MX 7000 Dual Level Light Bar," Revision 15, Jul. 2004, pp. 1-32.

All-Light Streethawk® Lightbar brochure, Federal Signal Corporation, #3121 396, © 1995.

Federal Signal Corporation Emergency Products Web Site, Police & Law Enforcement, www.fedsig.com/police/index.html (Dec. 20, 2002).

* cited by examiner

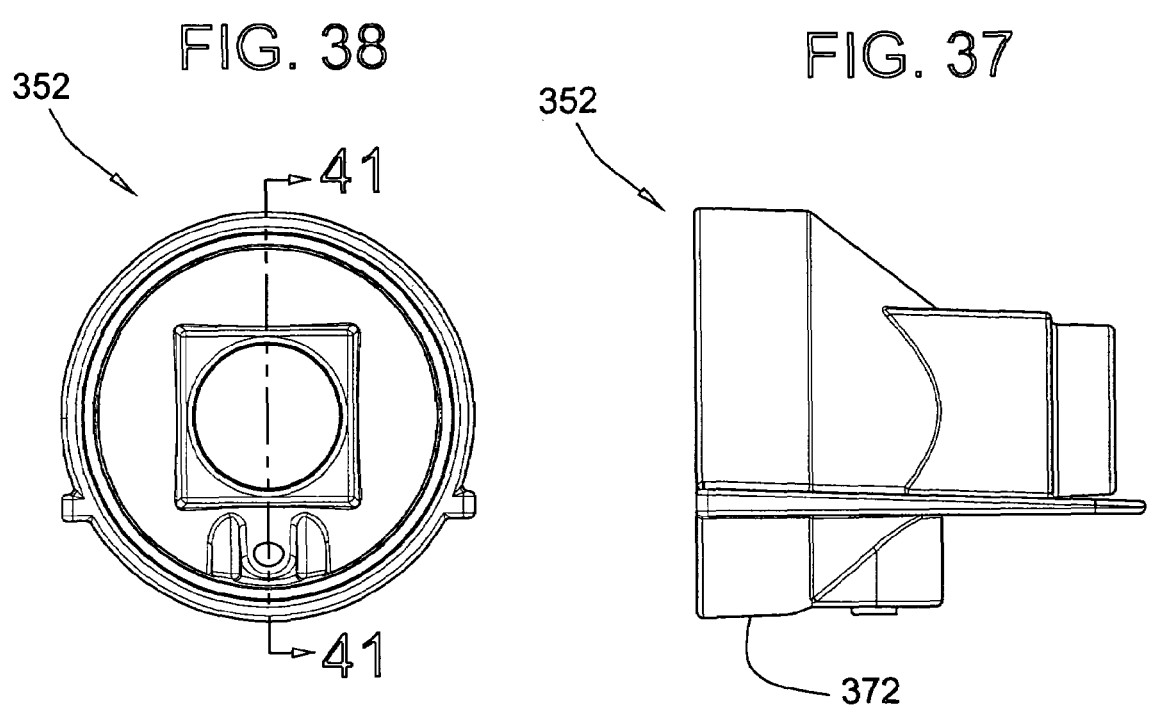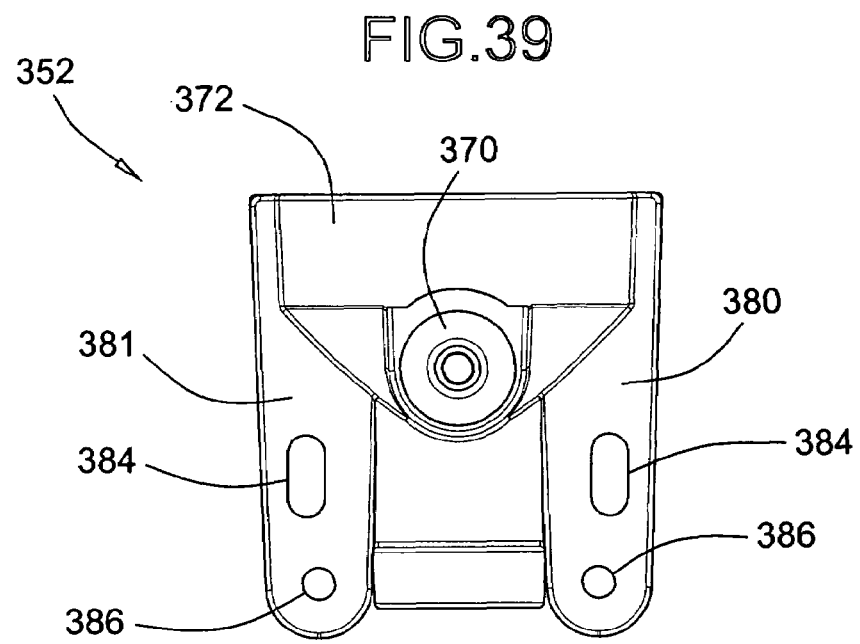

MOUNTING FOOT FOR LIGHT BAR

CROSS-REFERENCE TO RELATED PATENT APPLICATIONS

This patent application claims the benefit of priority to U.S. Provisional Patent Application No. 60/457,491, filed Mar. 25, 2003, and entitled "Mounting Foot for Light Bar," which is incorporated in its entirety herein by this reference.

FIELD OF THE INVENTION

This invention pertains to signaling systems for emergency vehicles and more particularly, is directed to warning light assemblies for mounting to emergency vehicles.

BACKGROUND OF THE INVENTION

Emergency vehicles such as police cars, ambulances, fire trucks, etc. typically have a signaling system including audio devices, such as sirens or speakers, and visual indicators, such as warning lights. One common type of warning light assembly for emergency vehicles is a light bar. A light bar can include a plurality of lights that are enclosed in a common housing. Different types of lights, such as stationary, strobe, oscillating, and rotating lights, as well as a speaker or siren can be packaged in a given light bar to provide a variety of different signaling options.

A light bar is typically mounted to a flat surface of the emergency vehicle, such as a roof surface, for example, using bolts that extend through the light bar to the interior of the vehicle and that can be secured thereto via washers and nuts.

Current light bar designs commonly make use of multiple, stacked lighting levels. Through the use of different levels, warning lights, such as flashing, rotating, or strobe lights are disposed in a level of their own, while other auxiliary lighting, such as takedown lights, alley lights, and directional indicators are disposed in a separate level. Through the use of this multi-level approach, devices within one level do not adversely affect the visual performance of other levels. The minimum height of a light bar using this scheme is limited based on physical limitations of the devices within each level and the stacking of each layer upon the other. Additionally, to reduce the conspicuity of a vehicle while not involved in an emergency situation, it is desired that a light bar have as low a profile as possible. The use of multi-layered light bars limits the height to which a light bar can be lowered while still maintaining adequate functionality.

SUMMARY OF THE INVENTION

The invention provides a mounting foot for use with a light bar. A signaling assembly can include a light bar and a pair of mounting feet in accordance with the present invention. The light bar can be secured to the mounting feet via a plurality of fasteners. The mounting feet can be connected to a vehicle, such as an emergency vehicle, via conventional methods, such as, roof straps. The mounting feet serve to attach and space the light bar off the roof of the vehicle while providing a platform for the mounting of components, such as, auxiliary lights, for example.

Each mounting foot can include a base, which can have a support portion, a contoured portion, and a pair of compartments; a pair of covers removably mounted to the base to enclose the compartments; and a roof strap secured to the base. A pair of seals can be associated with each compartment to seal the interior of the compartment. Each compartment can house a signaling device, such as a lamp assembly. Each cover can be made from a translucent material to allow a lamp assembly housed within the respective compartment to emit light therethrough. Each mounting foot can be disposed near the outer side edges of the roof. The contoured portion can be configured to substantially conform to the crown in the roof of the emergency vehicle to allow the mounting foot to be seated on the roof of the vehicle and to utilize more available space for the mounting of components, such as auxiliary lighting devices.

The invention allows for a reduction in the overall height of the light bar while maintaining the advantages of a multi-layered light bar. By mounting components, such as auxiliary lighting, within the light bar mounting feet, the area between the light bar and the vehicle roof fulfills the function of an auxiliary signaling layer while allowing the overall height of the light bar to be reduced.

BRIEF DESCRIPTION OF THE DRAWINGS

FIG. 37 is a side elevational view of the lamp housing FIG. 36.

FIG. 38 is a front end elevational view of the lamp housing of FIG. 36.

FIG. 39 is a bottom plan view of the lamp housing of FIG. 36.

DETAILED DESCRIPTION OF EMBODIMENTS OF THE INVENTION

Figure 1:
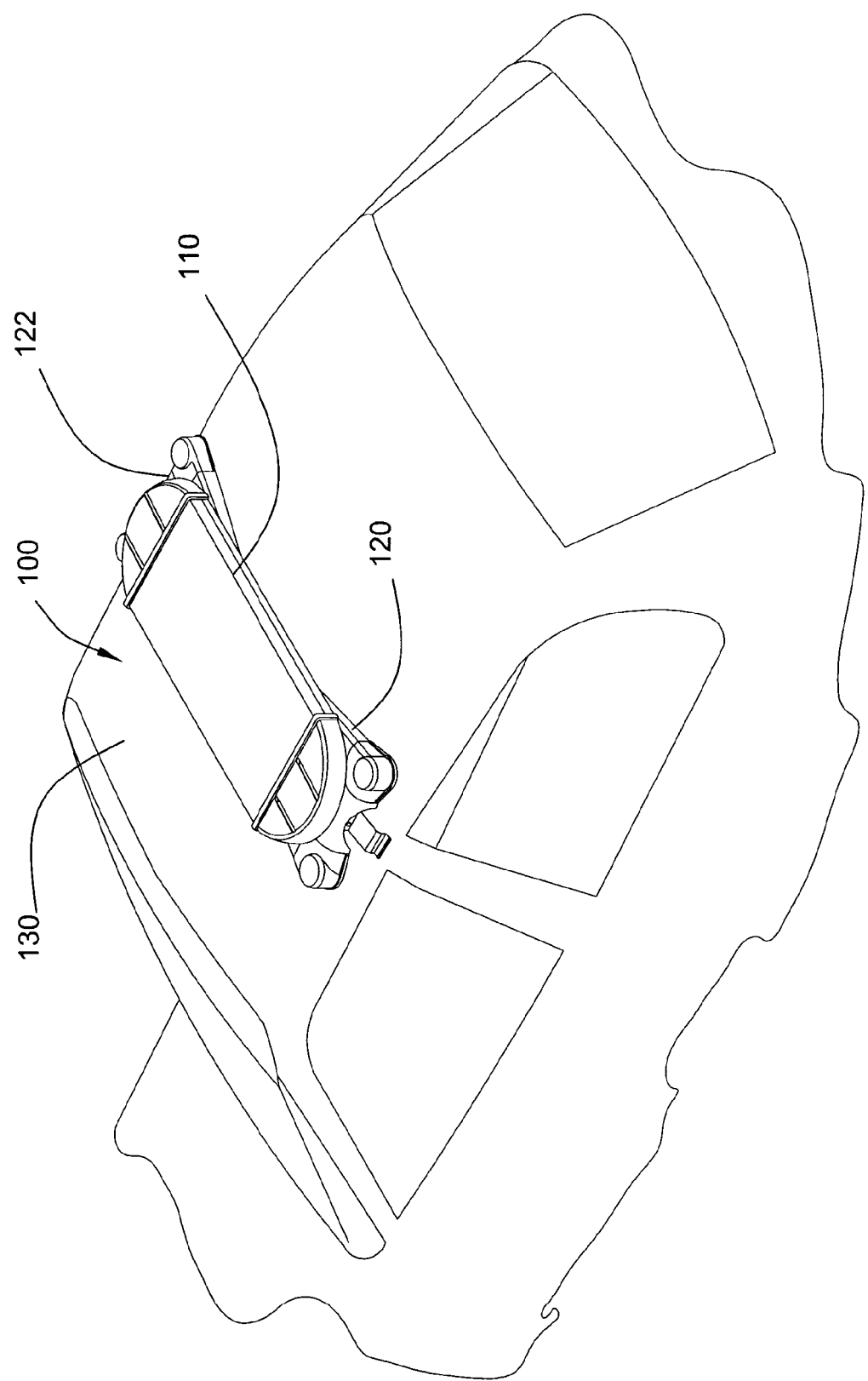
FIG. 1 is a fragmentary perspective view of an emergency vehicle equipped with a signaling assembly including a light bar and a pair of mounting feet in accordance with the present invention.
Figure 2:
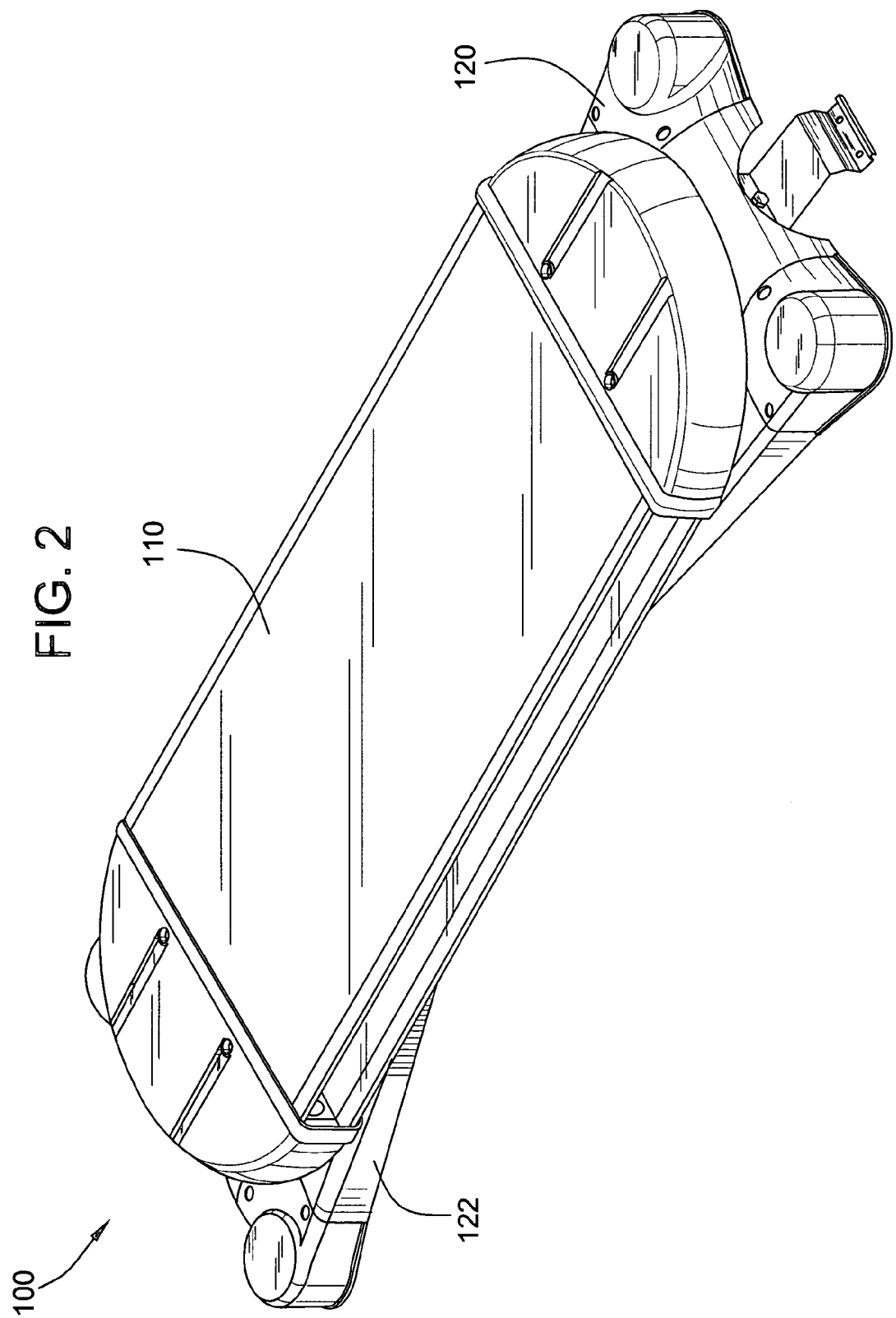
FIG. 2 is a perspective view of the signaling assembly of FIG. 1.

Referring now more particularly to FIG. 1 of the drawings, an illustrative signaling assembly 100 having a light bar 100 and a pair of light bar mounting feet or brackets 120, 122 in accordance with the present invention is shown installed on a vehicle 130. While the present invention is described in connection with an exemplary police car, the present invention is not limited to any particular type of vehicle. On the contrary, the present invention could be employed in any context in which it is desirable to be able to mount a light bar.

Figure 3:
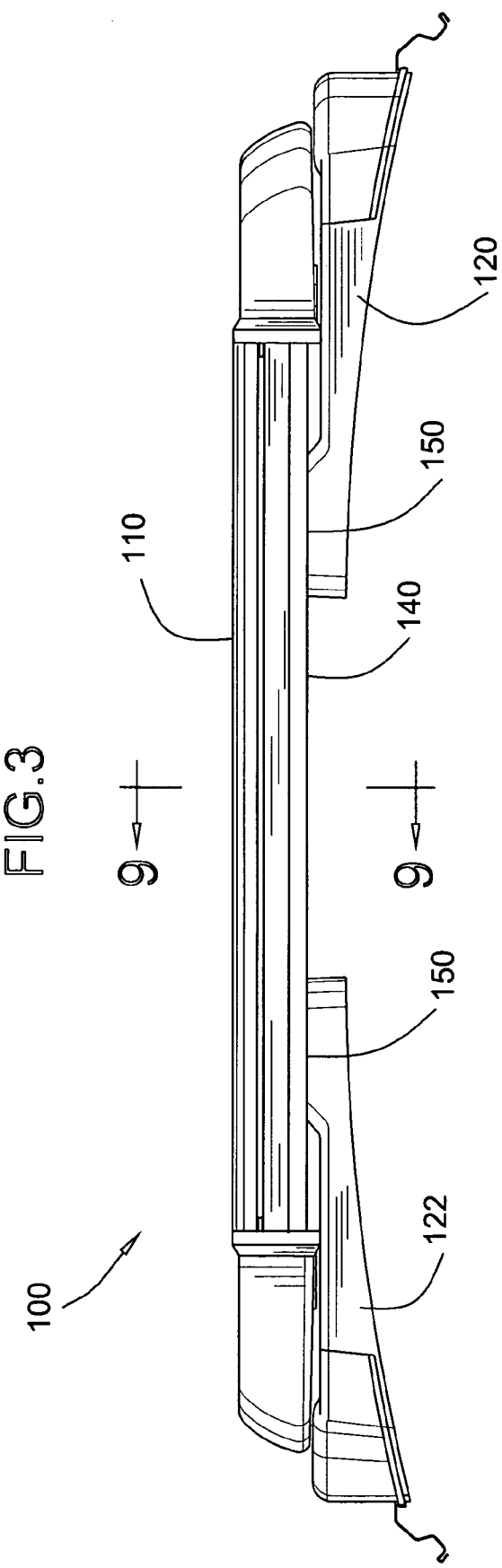
FIG. 3 is a side elevational view of the signaling assembly of FIG. 1.

Referring to FIGS. 2-9, the signaling assembly 100 is shown. The mounting feet 120, 122 are attached to the light bar 110 via a plurality of fasteners, such as, screws, bolts, and the like. Referring to FIG. 3, the mounting feet 120, 122 serve to attach and space a base 140 of the light bar 110 off the roof of the vehicle while providing a platform for the mounting of components, such as, auxiliary or warning lights, for example. The mounting feet 120, 122 are substantially identical to each other. Each mounting foot 120, 122 includes a substantially planar support portion 150 upon which the base 140 of the light bar 110 can be placed in contacting engagement. Fasteners can extend through the support portion 150 of each mounting foot 120, 122 and through the base 140 of the light bar 110 to secure the light bar 110 to the mounting feet 120, 122.

Figure 4:
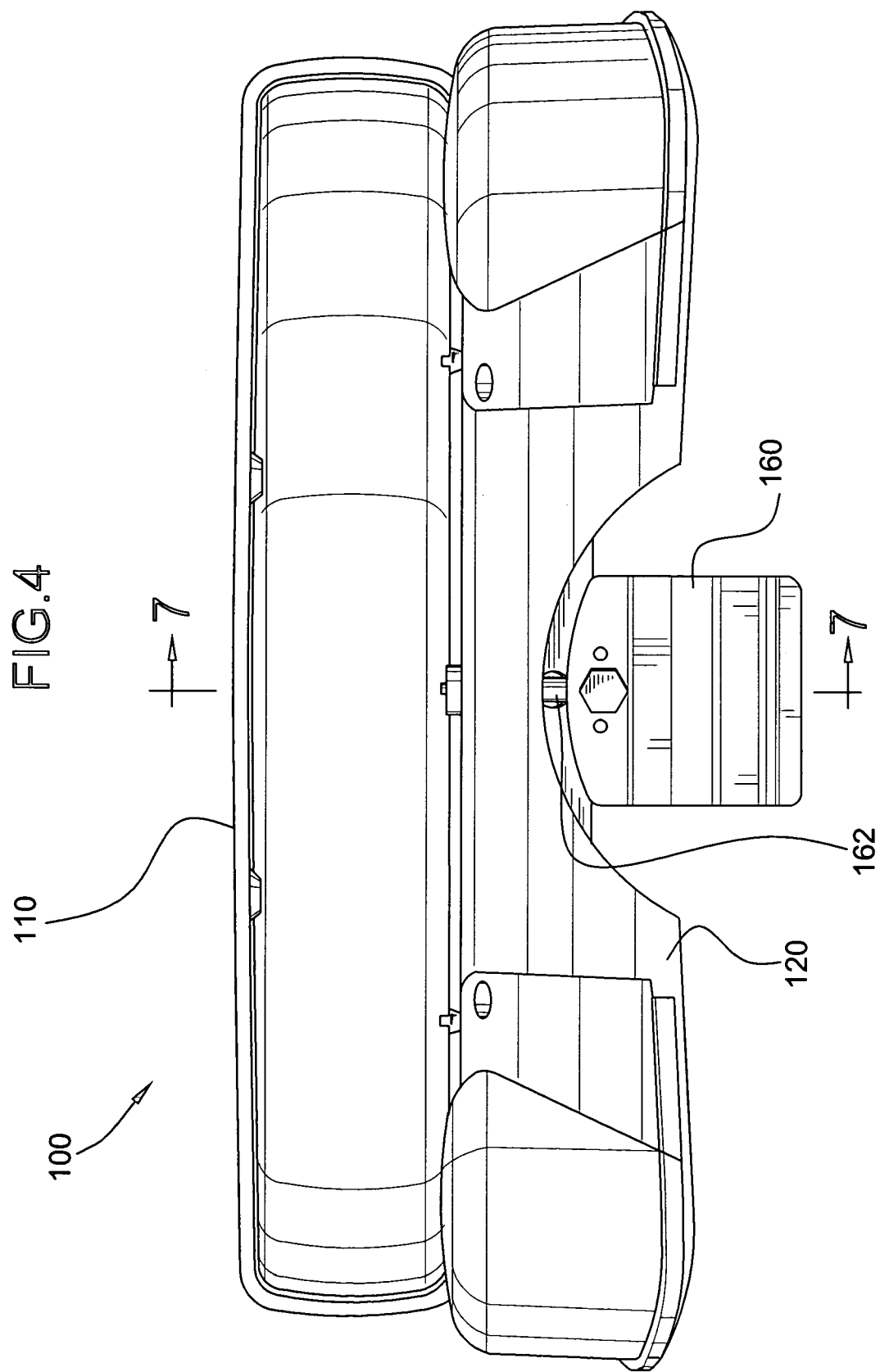
FIG. 4 is an end elevational view of the signaling assembly of FIG. 1.
Figure 5:
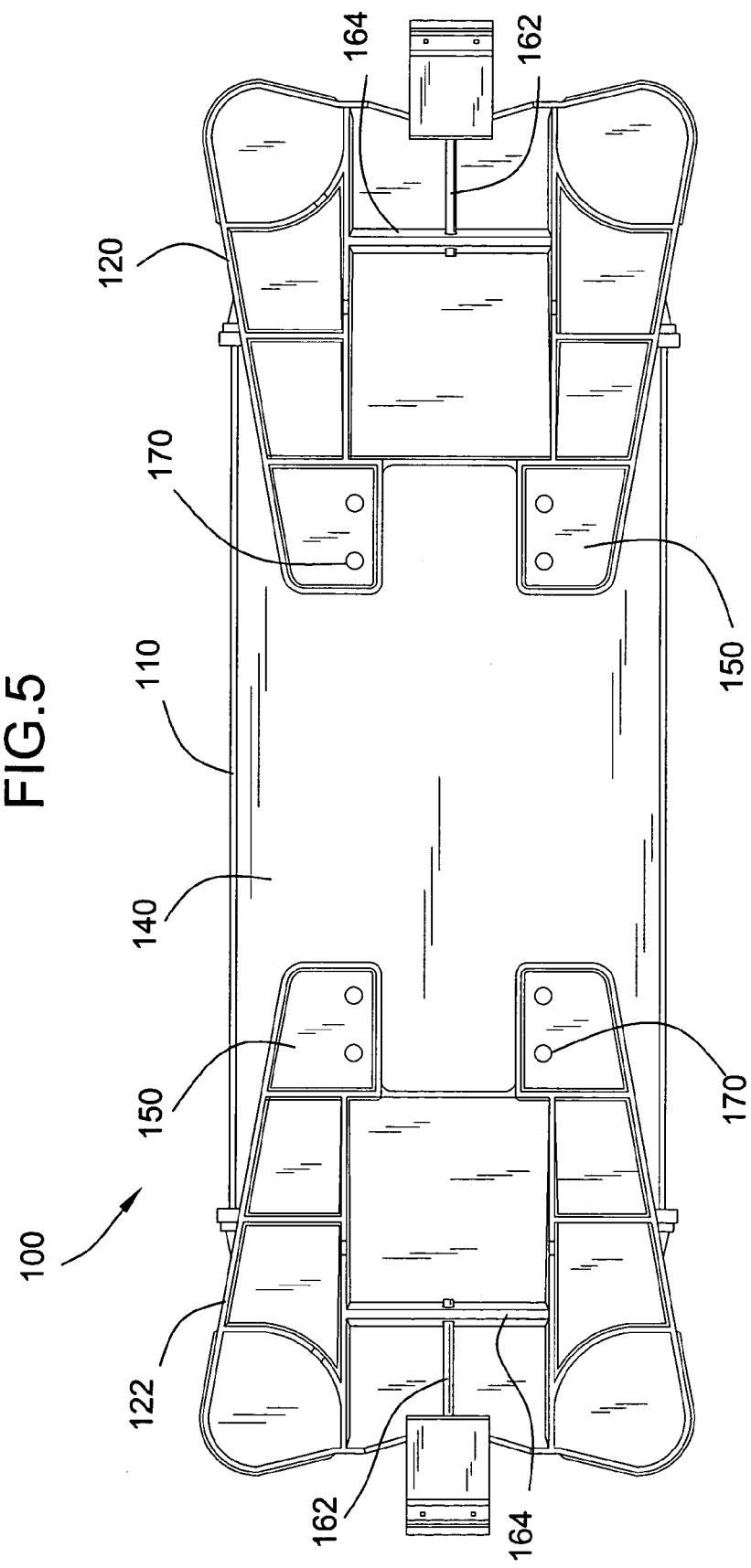
FIG. 5 is a bottom plan view of the signaling assembly of FIG. 1.
Figure 6:
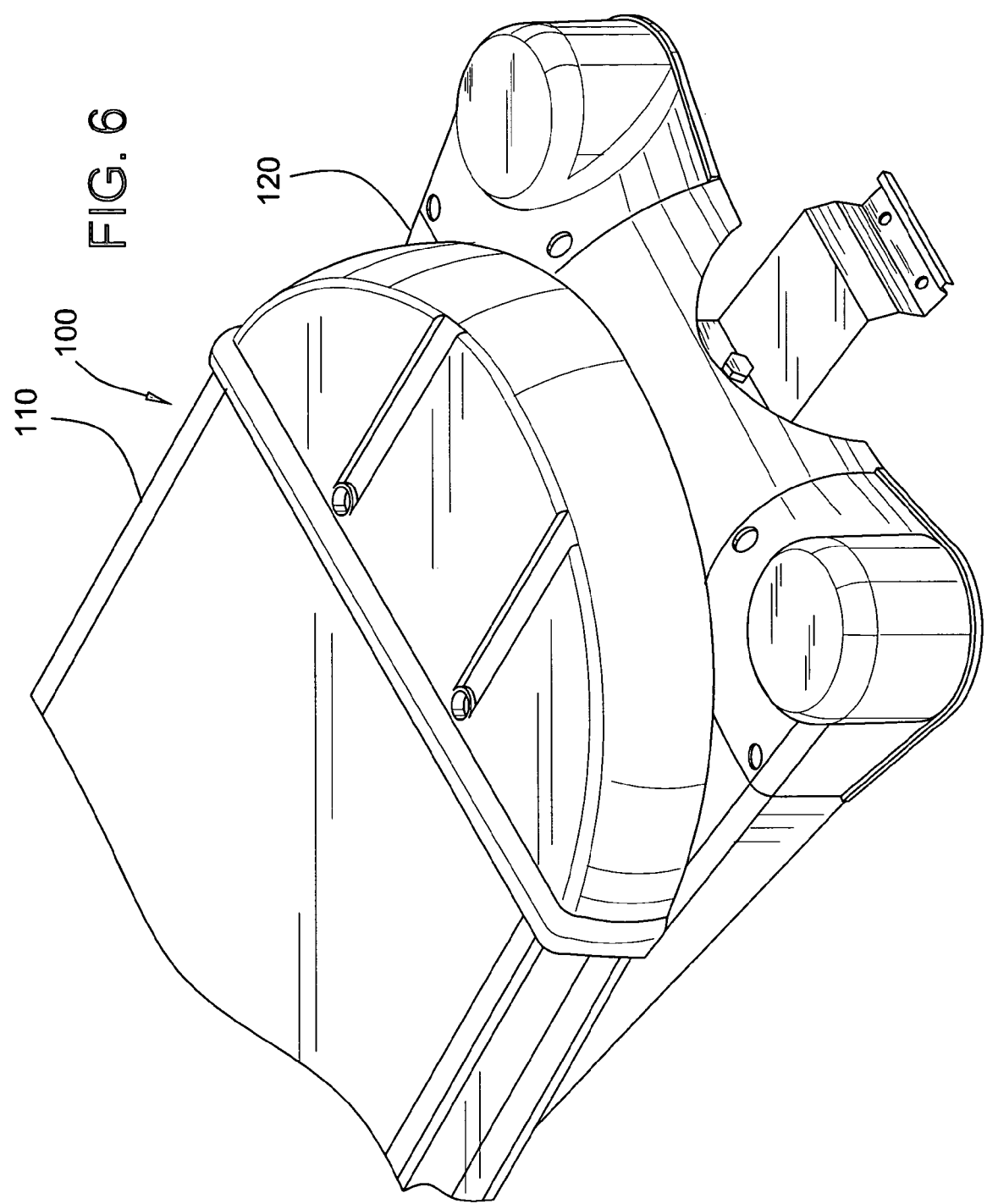
FIG. 6 is a fragmentary perspective view of the signaling assembly of FIG. 1.
Figure 7:
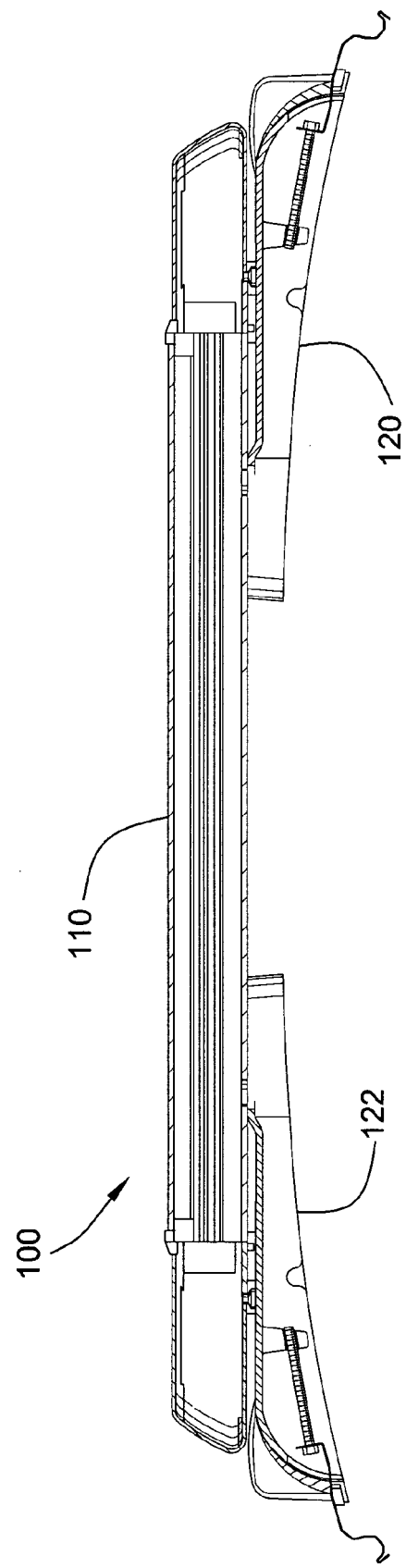
FIG. 7 is a cross-sectional view of the signaling assembly taken along line 7-7 in FIG. 4.
Figure 8:
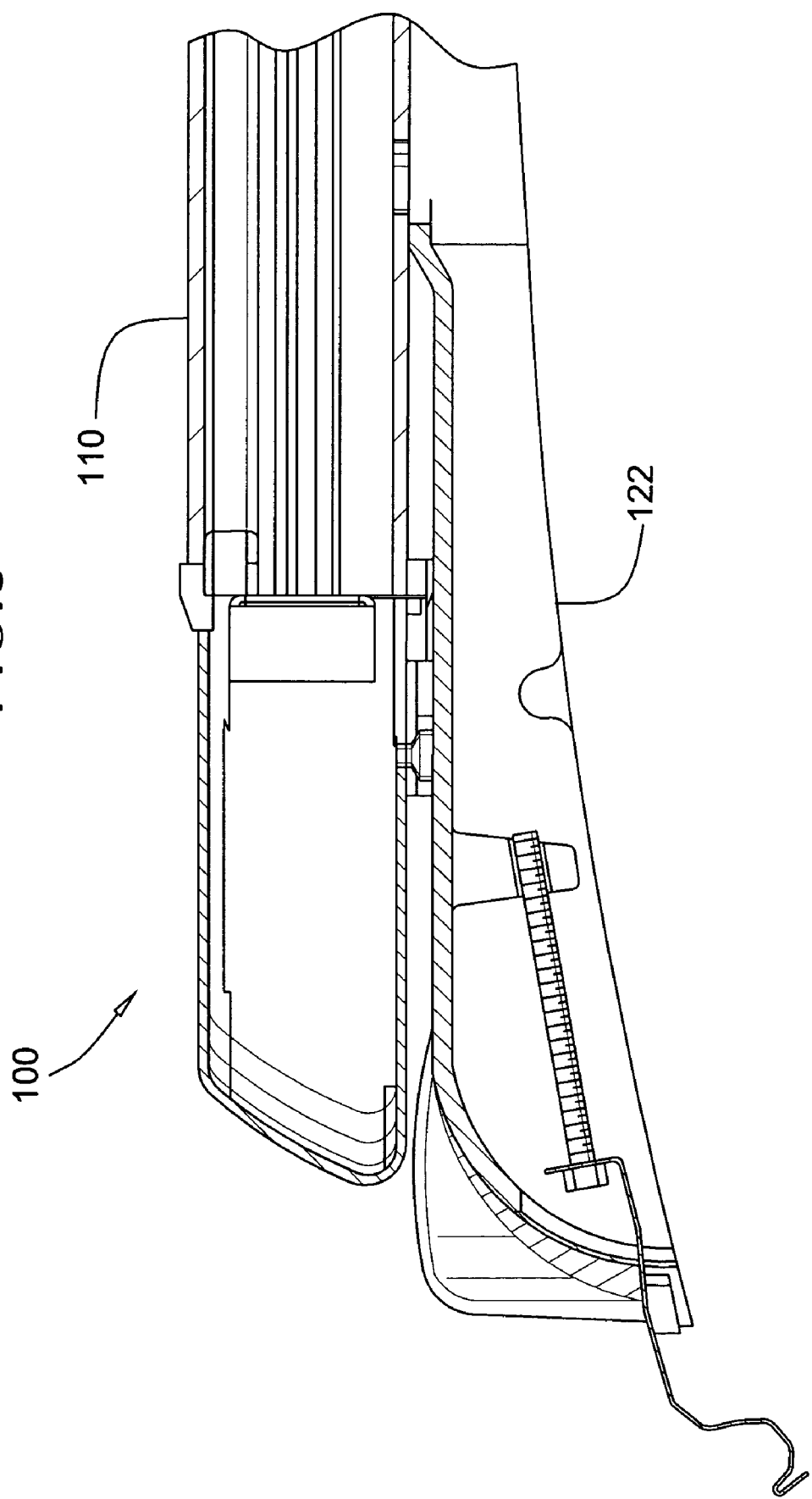
FIG. 8 is an enlarged, fragmentary view of the signaling assembly taken from FIG. 7.
Figure 9:
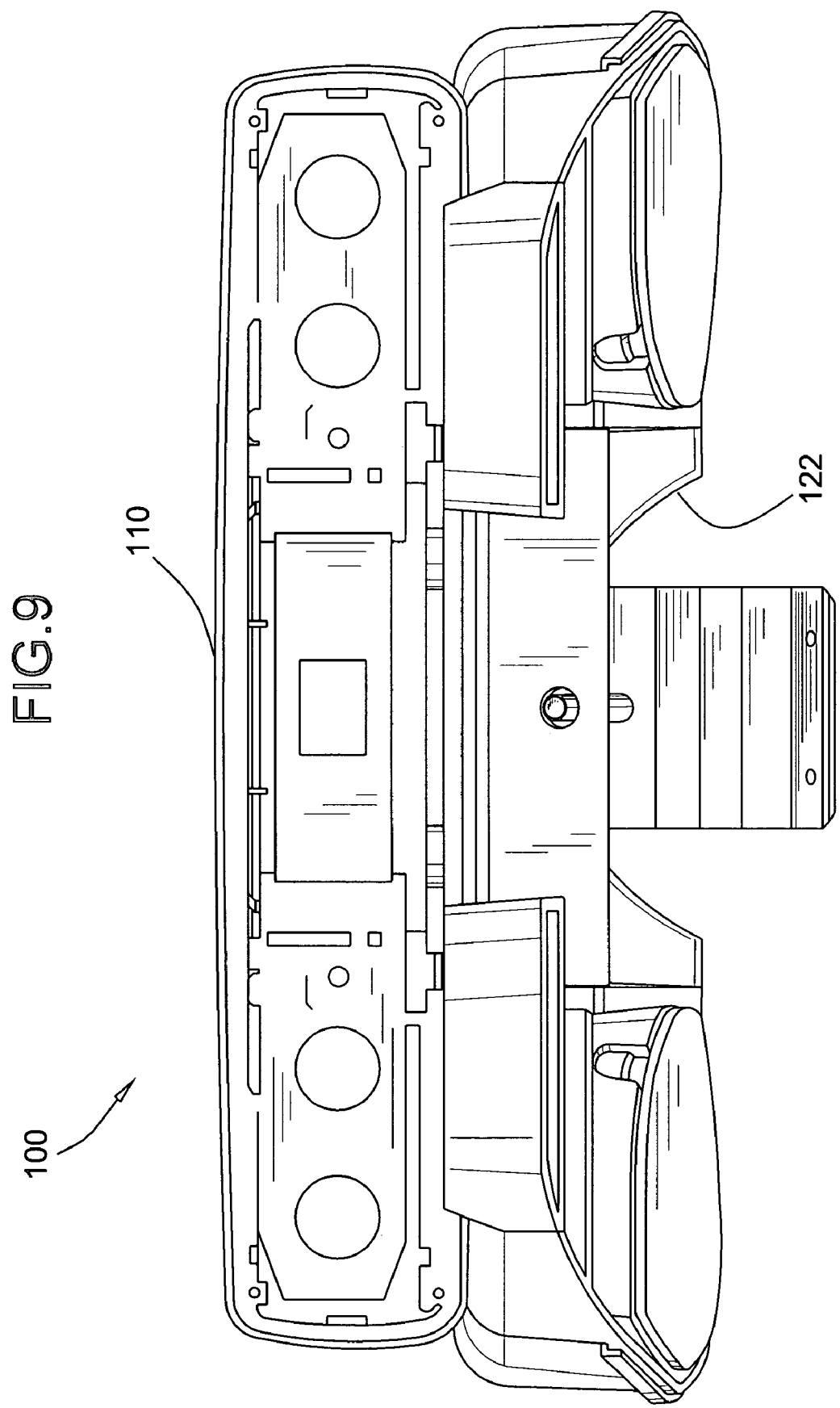
FIG. 9 is a cross-sectional view of the signaling assembly taken along line 9-9 in FIG. 3.

Referring to FIG. 4, attachment to the vehicle can be accomplished through conventional means, for example, through the use of hooks or fasteners through the mounting feet into the vehicle roof. In FIG. 4, the first mounting foot 120 includes a connecting bracket or roof strap 160 secured thereto by a fastener 162. Referring to FIG. 5, each fastener 162 can be secured to the respective mounting foot 120, 122 by extending through a transversely extending attachment rib 164. The support portion 150 of each mounting foot 120, 122 includes a plurality of holes 170 therein for receiving a respective fastener to attach the base 140 of the light bar 110 to the mounting feet 120, 122.

Figure 10:
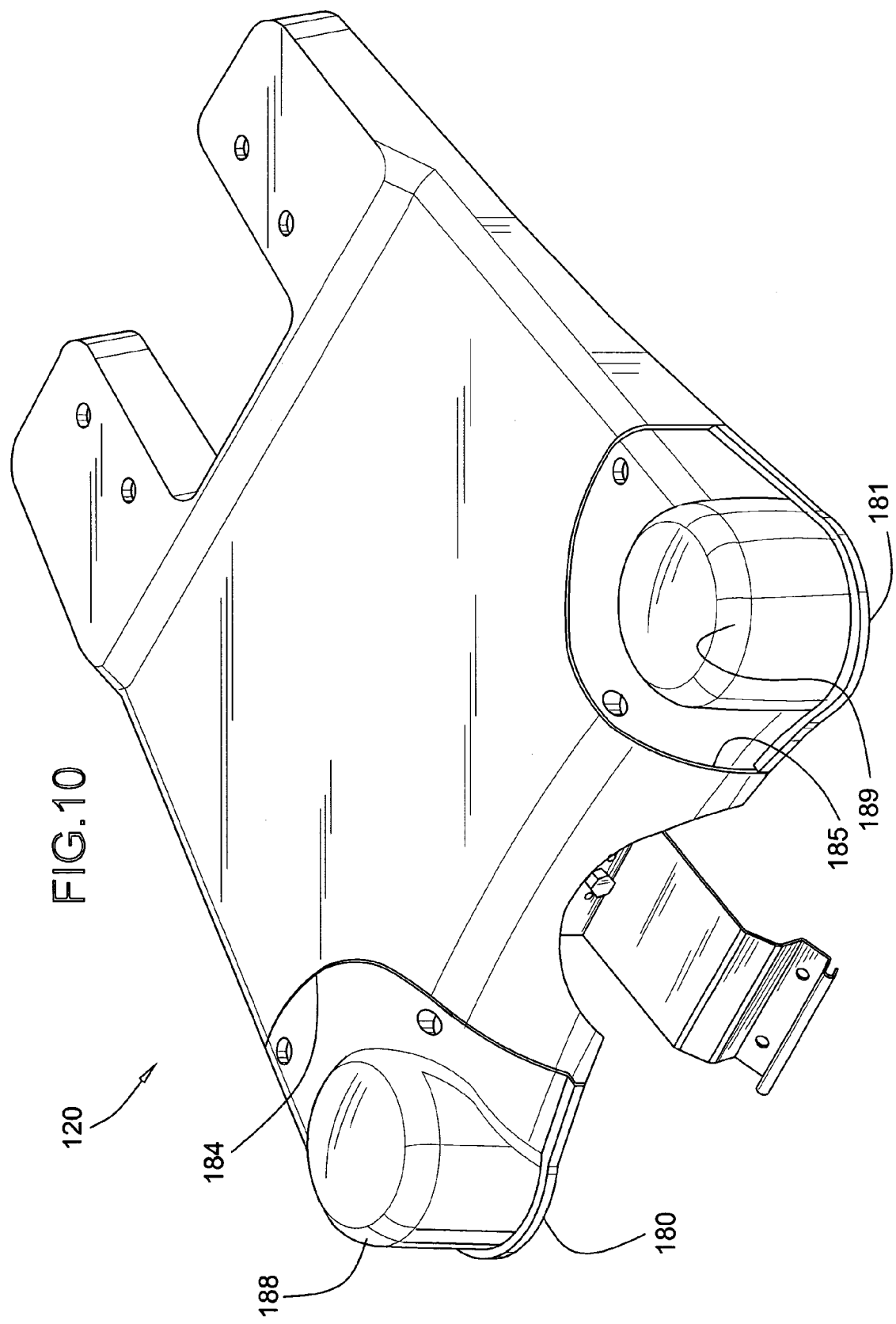
FIG. 10 is a perspective view of a first mounting foot of the signaling assembly of FIG. 1.
Figure 16:
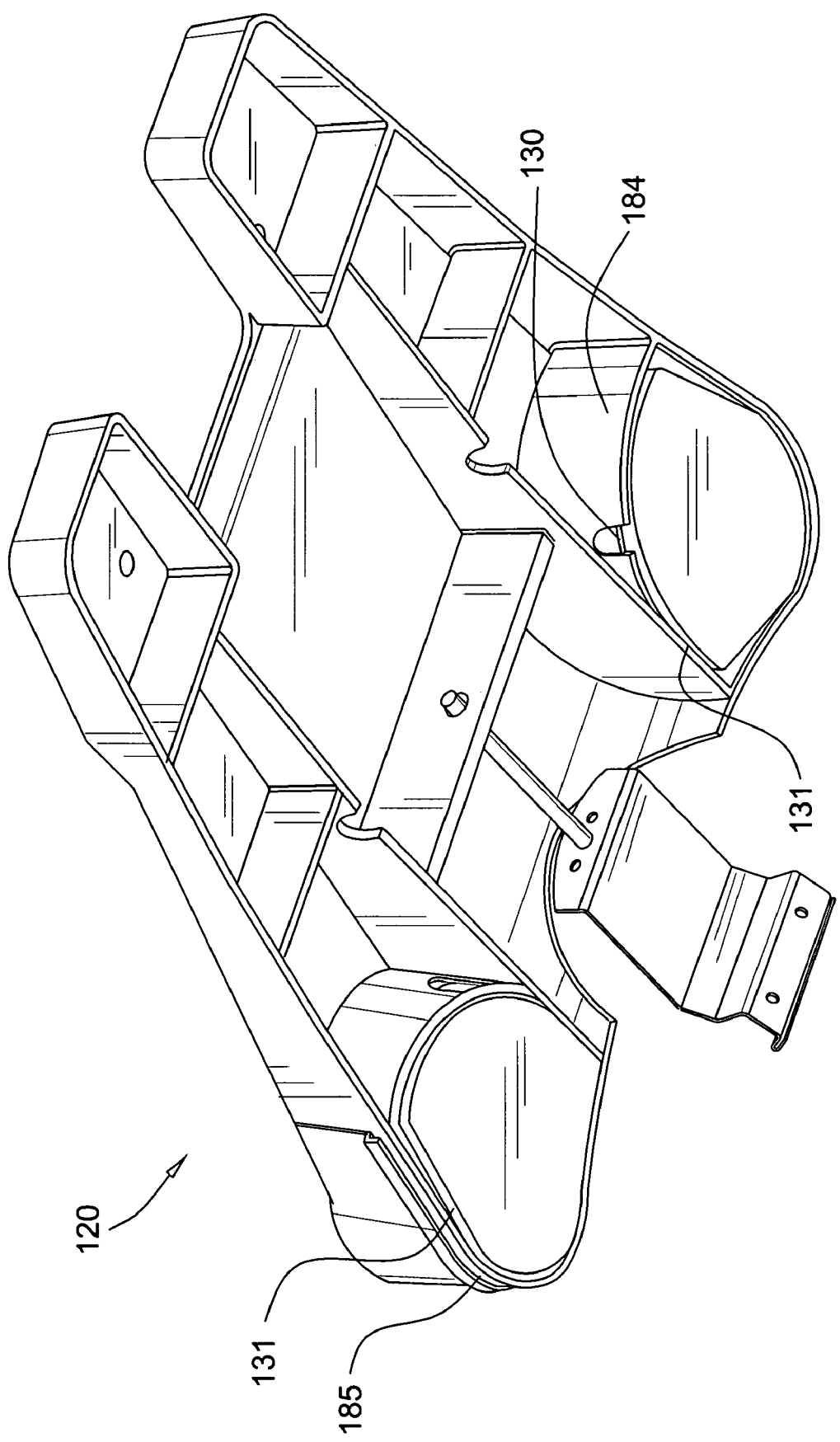
FIG. 16 is a bottom perspective view of the mounting foot of FIG. 10.
Figure 17:
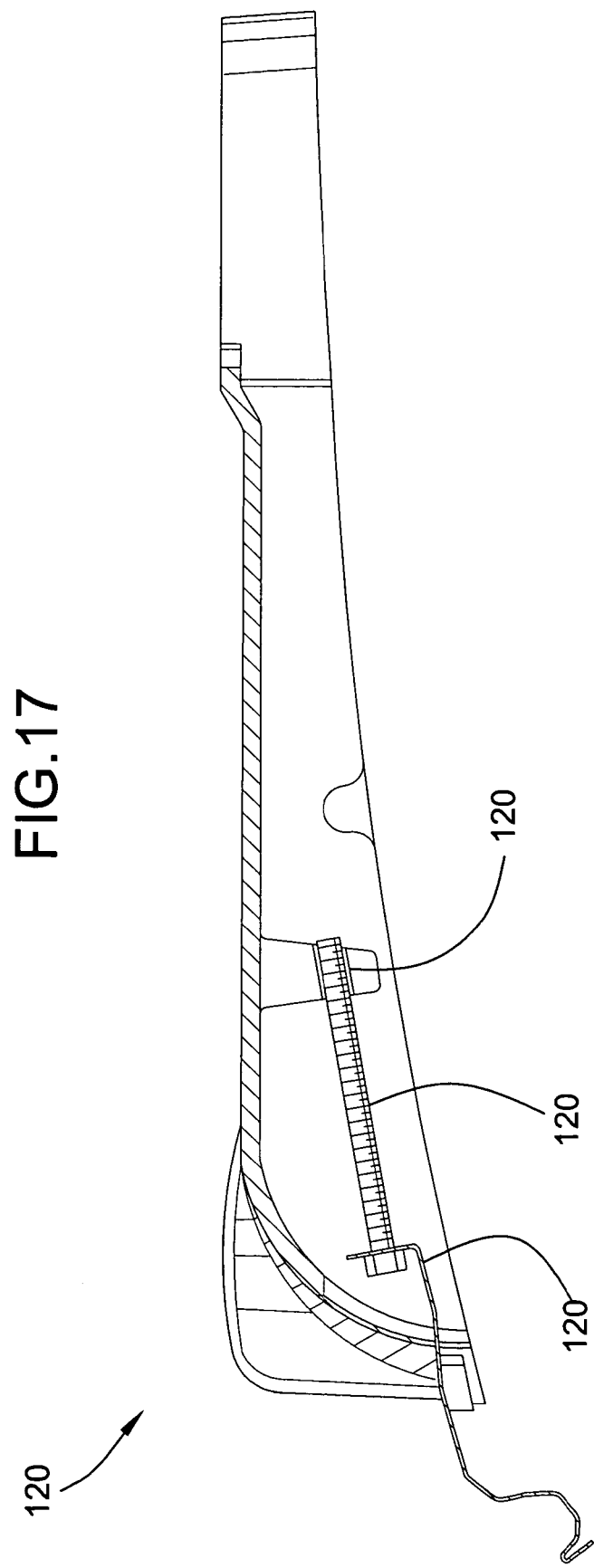
FIG. 17 is a cross-sectional view of the mounting foot of FIG. 10 taken along line 17-17 in FIG. 11.
Figure 18:
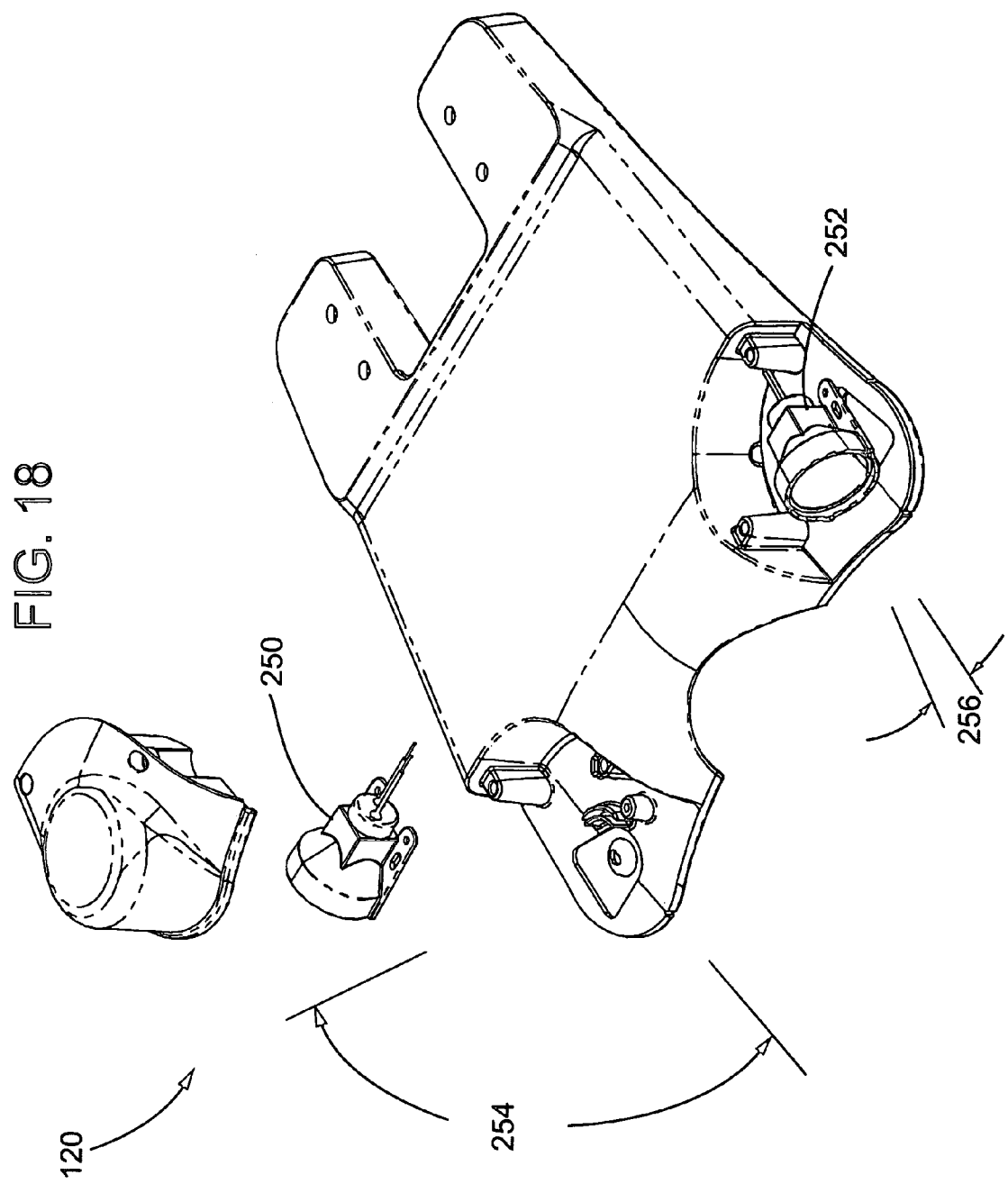
FIG. 18 is a partially exploded view of the mounting foot of FIG. 10, shown with a first signaling device and a first cover exploded from a mounting foot base and a second signaling device mounted to the base, with a second cover not shown for illustrative purposes.

Referring to FIGS. 10-18, the first mounting foot 120 is shown. It will be understood that the description of the first mounting foot 120 is applicable to the second mounting foot 122, as well. Referring to FIGS. 10 and 18, outer corners 180, 181 of the mounting foot 120 can each include a respective compartment 184, 185 for receiving therein one or more electrical components, such as a lighting device, for example. A respective cover 188, 189 encloses each compartment 184, 185. The covers 188, 189 can be produced from a transparent material or an opaque material, for example. In the illustrative embodiment, the first cover 188 is translucent, being blue, and the second cover 189 is opaque. In other embodiments, the cover can be constructed from a different colored material or a clear material, for example. Constructing the cover from an opaque material can be desired, for example, in embodiments where the particular compartment does not house a lighting device.

Figure 11:
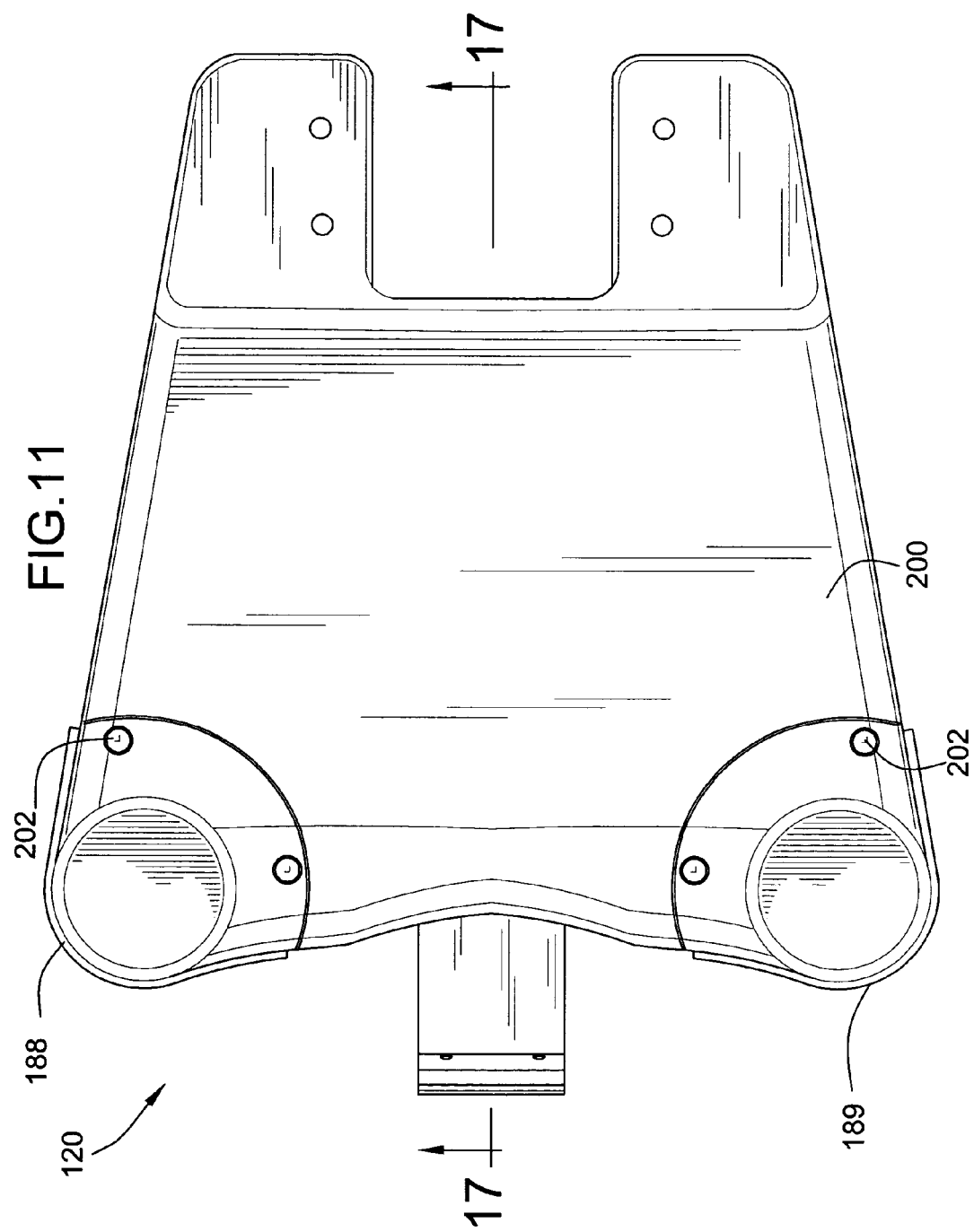
FIG. 11 is a top plan view of the mounting foot of FIG. 10.
Figure 12:
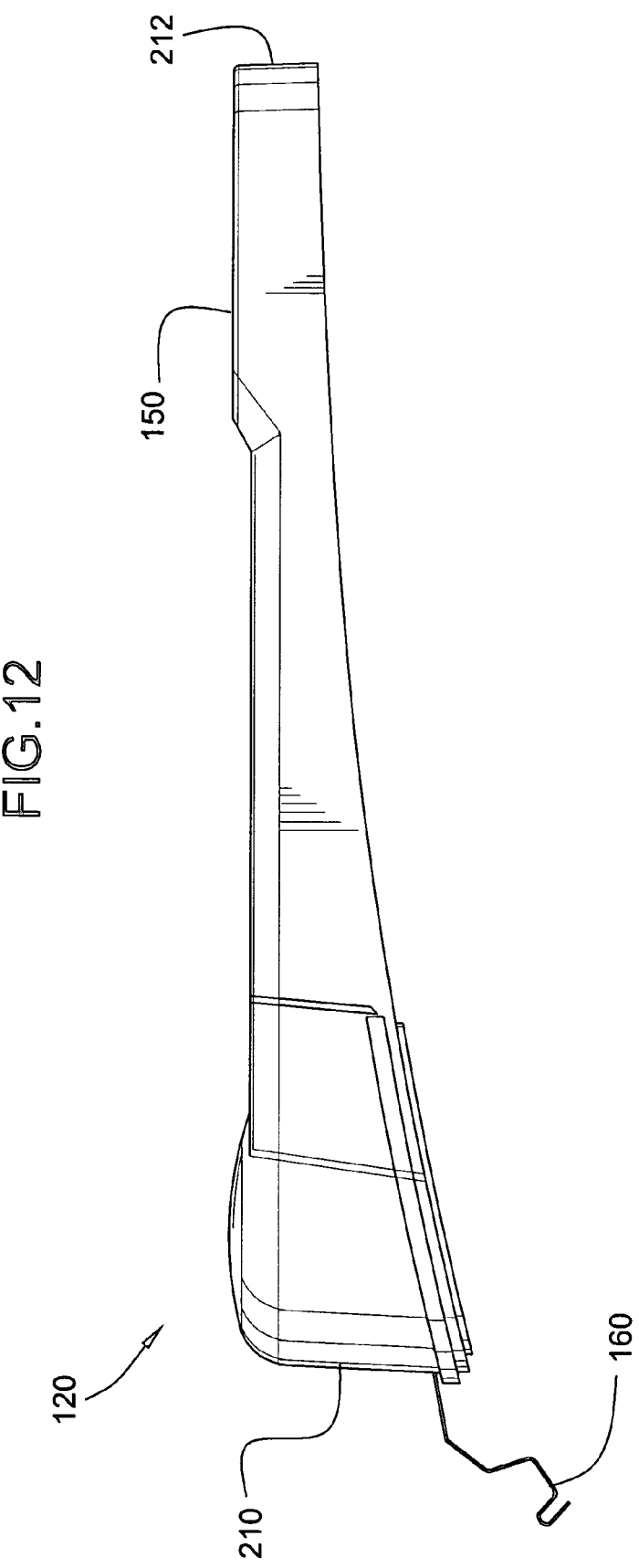
FIG. 12 is a side elevational view of the mounting foot of FIG. 10
Figure 13:
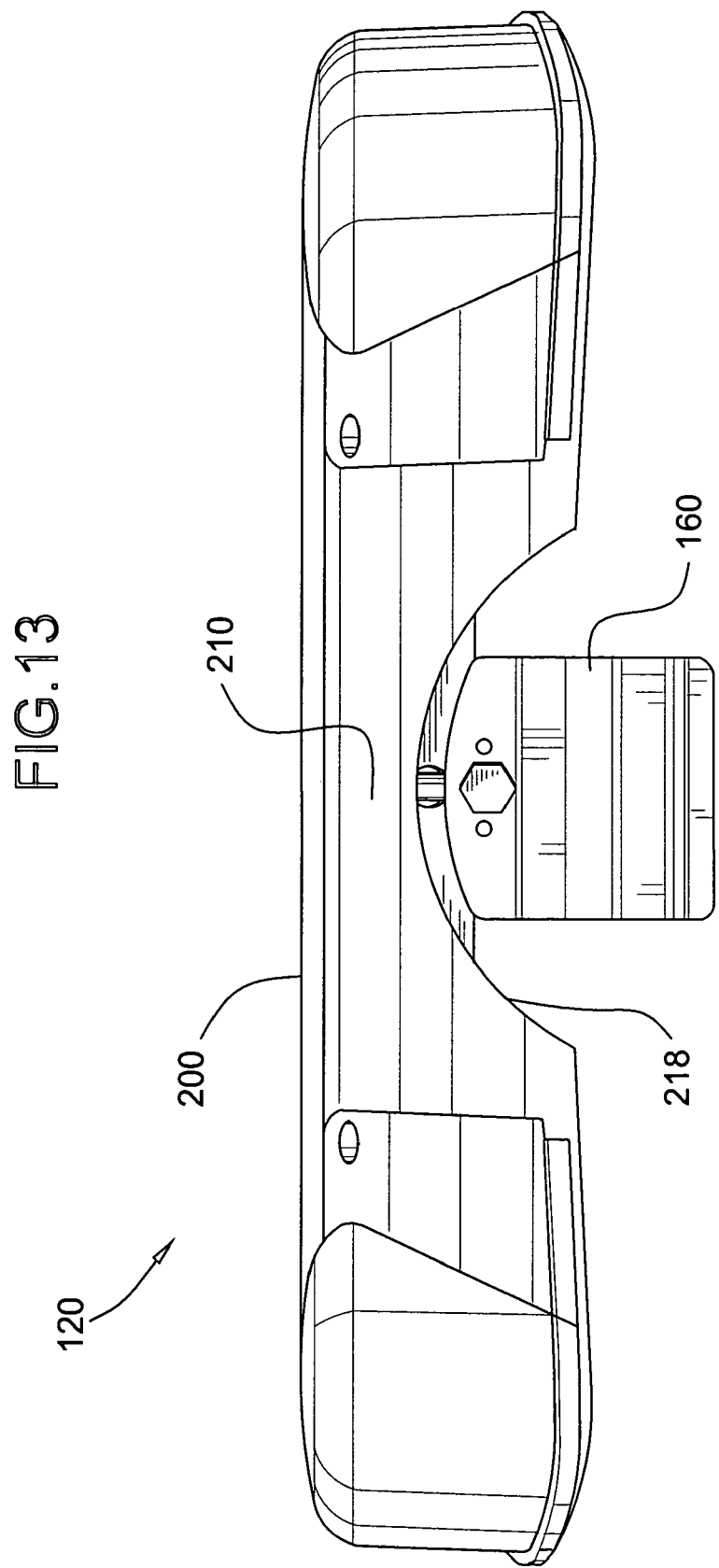
FIG. 13 is an outer end elevational view of the mounting foot of FIG. 10.

Referring to FIG. 11, the first and second covers 188, 189 are secured to a base 200 of the mounting foot 120 via a plurality of fasteners 202, such as screws, for instance. Referring to FIG. 12, the connecting bracket 160 extends from an outer end 210 of the mounting foot 120. The supporting portion 150 of the mounting foot 120 is disposed at an inner end 212 of the mounting foot 120. Referring to FIG. 13, the base 200 includes a curved cutout 218 for accommodating the connecting bracket 160 to allow the connecting bracket 160 to extend from the outer end 210 of the mounting foot 120.

Figure 14:
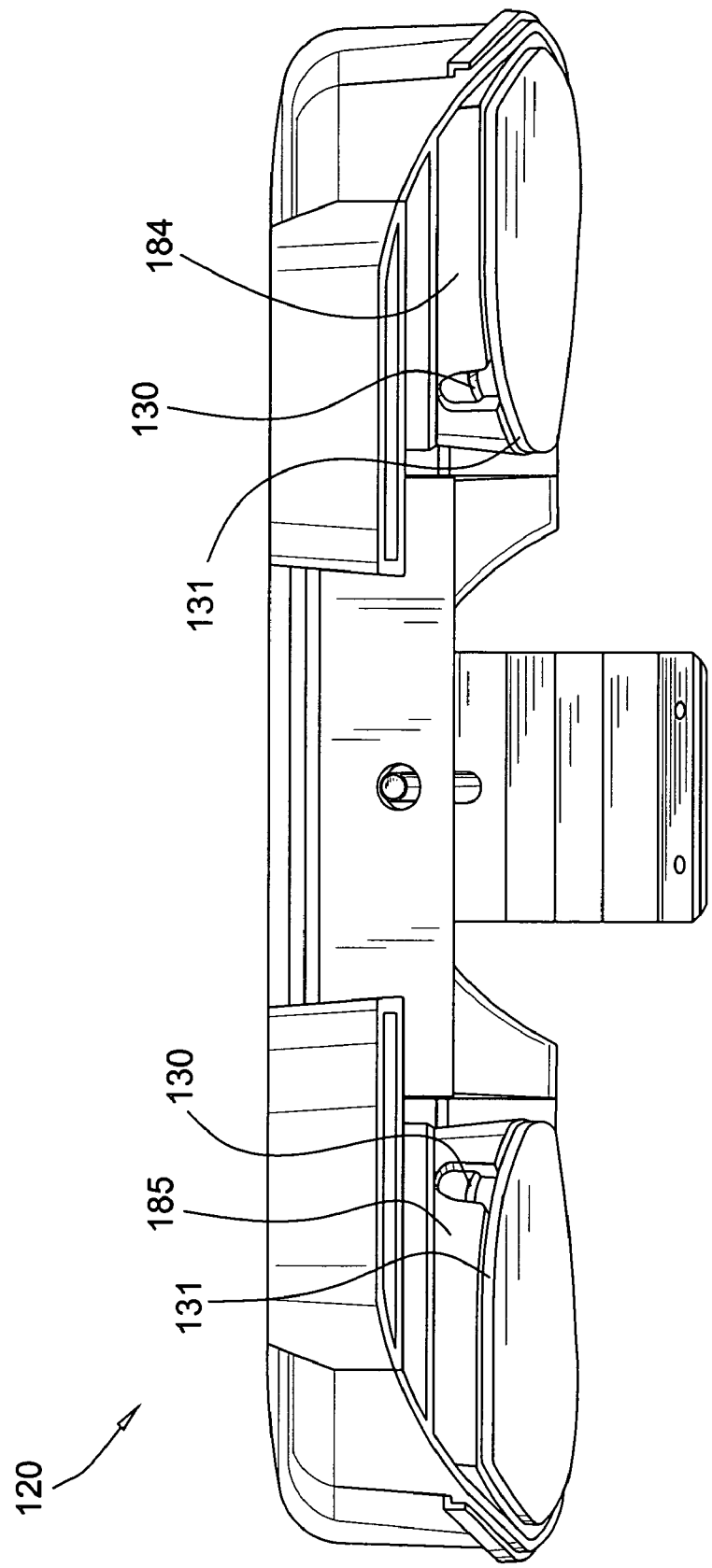
FIG. 14 is an inner end elevational view of the mounting foot of FIG. 10.
Figure 15:
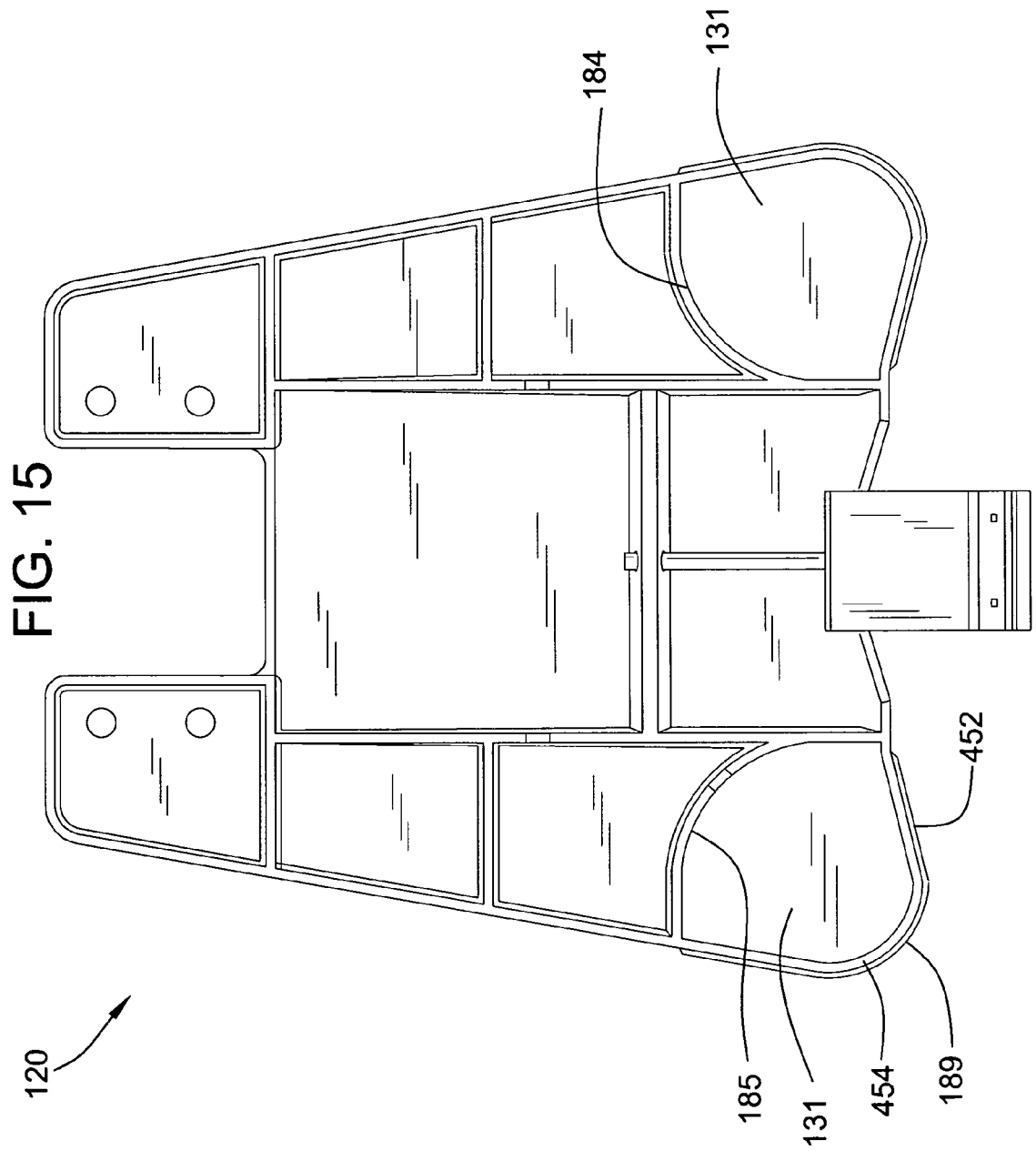
FIG. 15 is a bottom plan view of the mounting foot of FIG. 10.

Referring to FIGS. 14-16, the mounting foot 120 includes a pair of seals 230, 231 for each compartment 184, 185 thereof. The first and second seals 130, 131 can cooperate with the covers 188, 189 to respectively seal the interior of each compartment 184, 185 and to provide a seal between the mounting foot 120 and the vehicle. Referring to FIG. 18, two signaling devices in the form of lamp assemblies 250, 252 can be attached to the mounting foot 120. These lamp assemblies are capable of being adjusted over a horizontal angle 254 of about 110 degrees and then locked in position through the use of a screw, for example. The lamp assembly 252 can also be moved over a vertical angle 256 of about 10 degrees, measured between a point substantially parallel to the primary plane of the mounting foot and a point downward therefrom.

In other embodiments, the use of colored lighting that serves a secondary warning function could also be used. The invention is also not limited to the use of the described signaling device. LED or discharge (strobe) sources along with their associated lenses or reflectors could also be employed, for example. The signaling device can have a visual signaling feature and/or an aural signaling feature.

Figure 19:
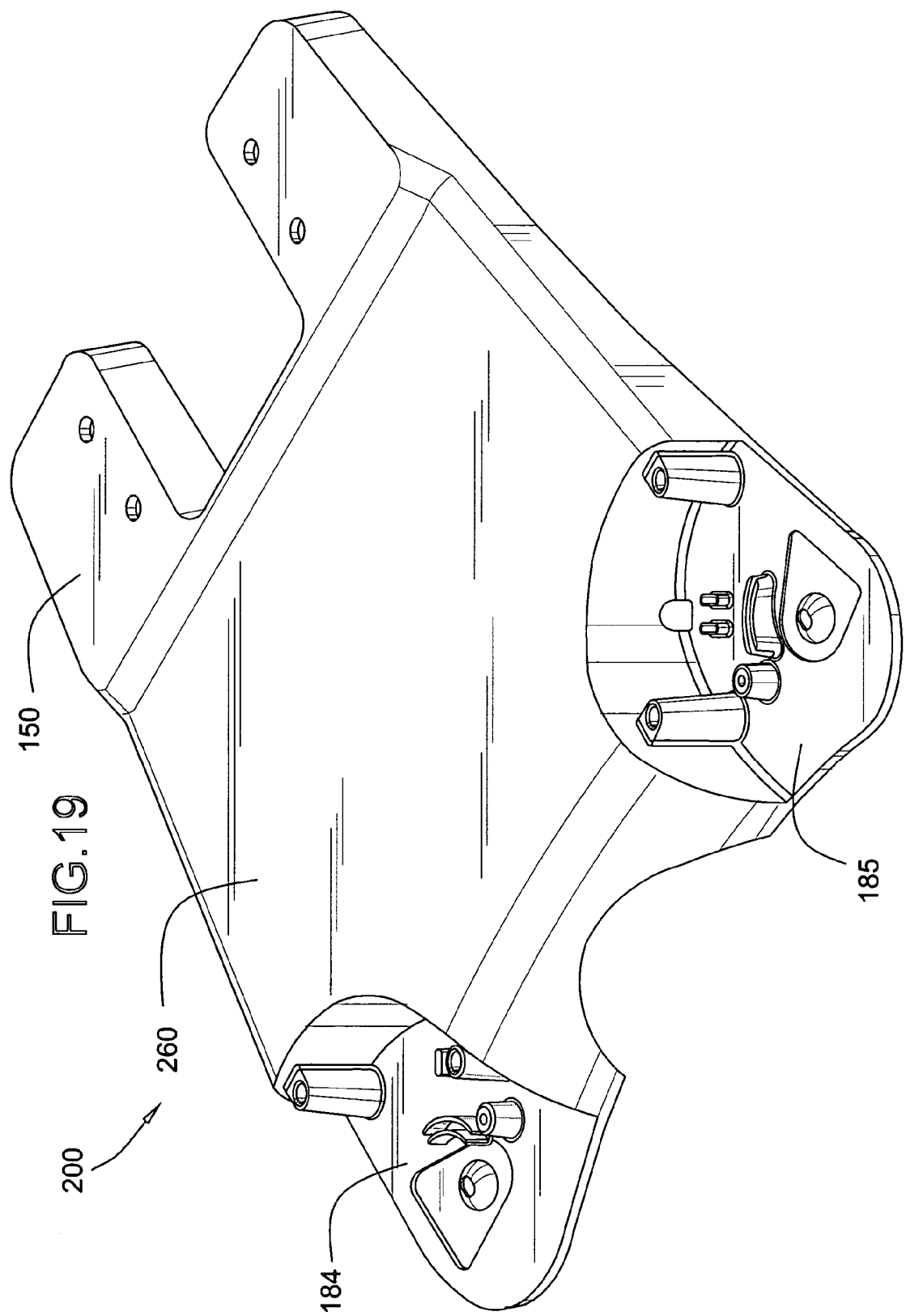
FIG. 19 is a perspective view of the base of the mounting foot of FIG. 10.
Figure 20:
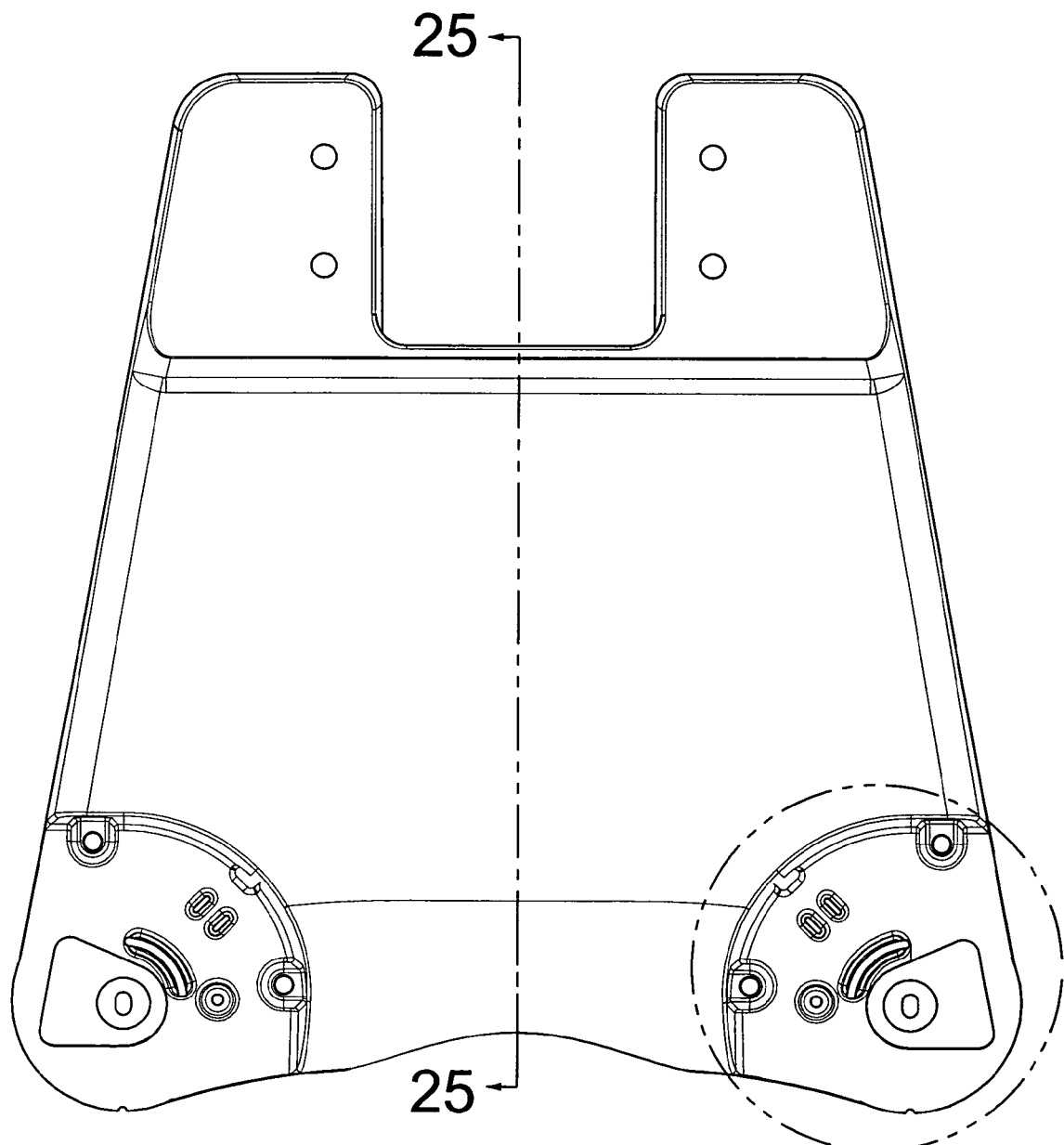
FIG. 20 is a top plan view of the mounting foot base of FIG. 19.
Figure 21:
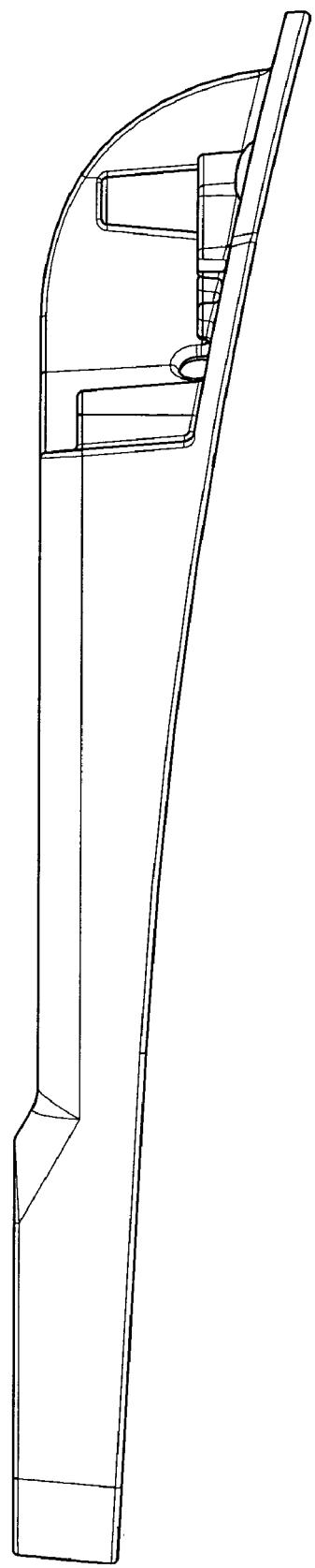
FIG. 21 is a side elevational view of the mounting foot base of FIG. 19.
Figure 22:
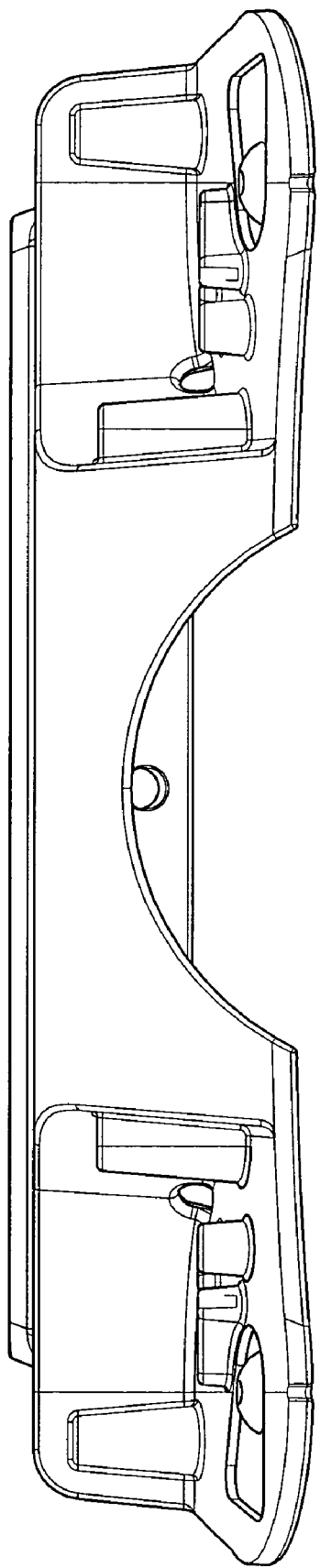
FIG. 22 is an outer end elevational view of the mounting foot base of FIG. 19.
Figure 23:
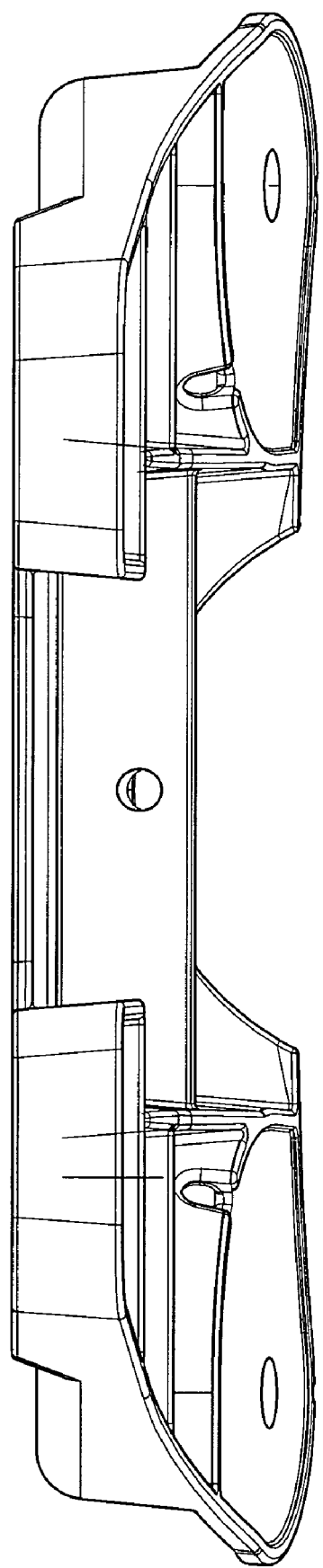
FIG. 23 is an inner end elevational view of the mounting foot base of FIG. 19.
Figure 24:
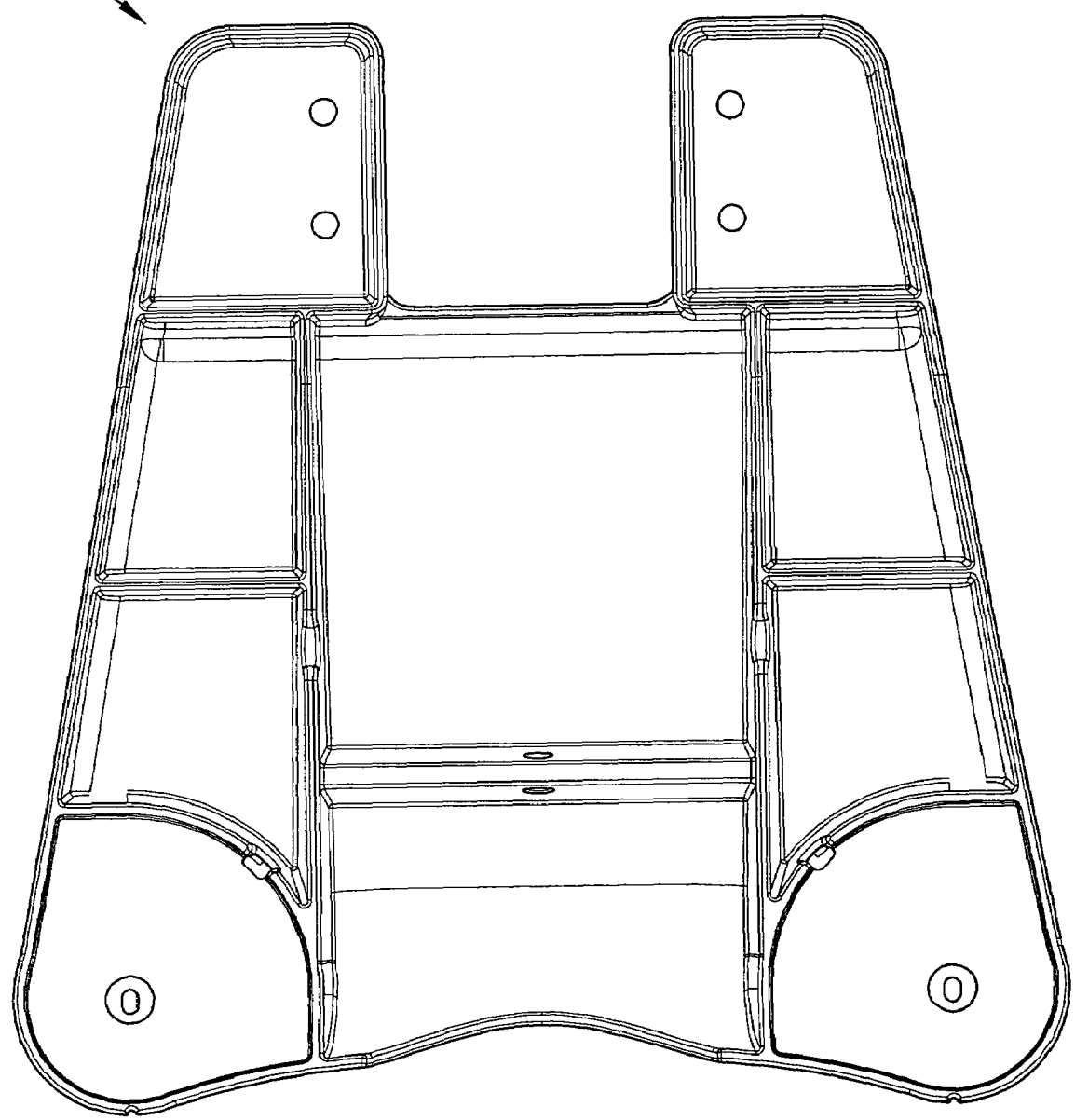
FIG. 24 is a bottom plan view of the mounting foot base of FIG. 19.
Figure 25:
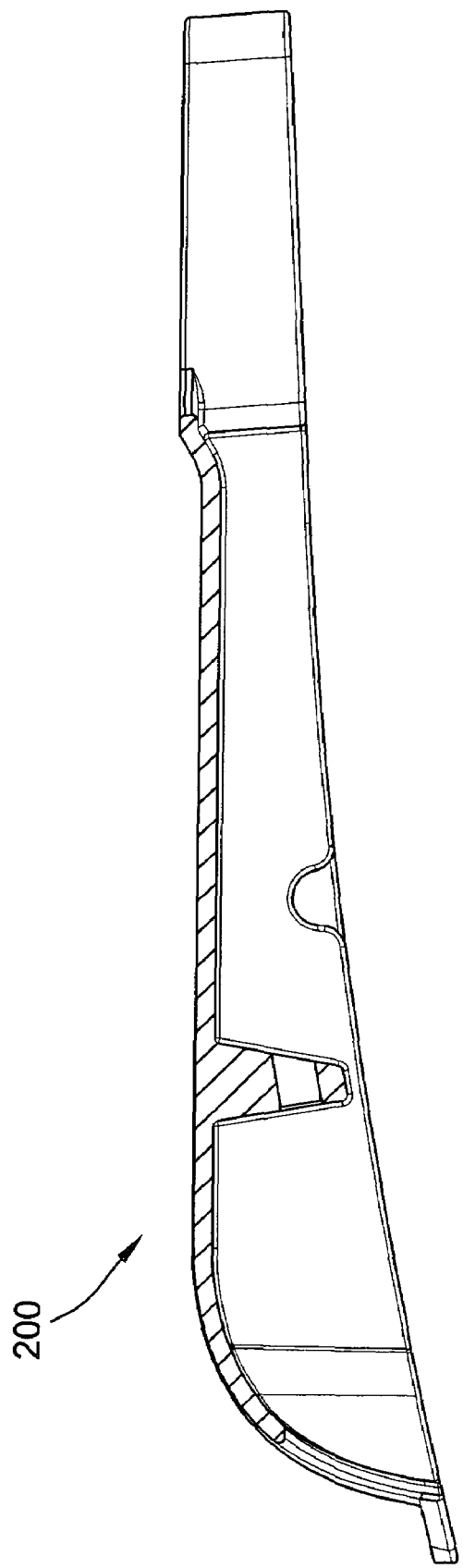
FIG. 25 is a cross-sectional view of the mounting foot base taken along line 25-25 in FIG. 20.

Referring to FIGS. 19-28, the base 200 of the mounting foot is shown. Referring to FIG. 19, the base 200 includes the support portion 150, a contoured portion 260, and the first and second compartments 184, 185. The contoured portion 260 extends between the supporting portion 150 and the compartments 184, 185. The contoured portion 260 is configured to dispose the compartments 184, 185 in predetermined, spaced relationship with the supporting portion 150 and with each other.

Figure 26:
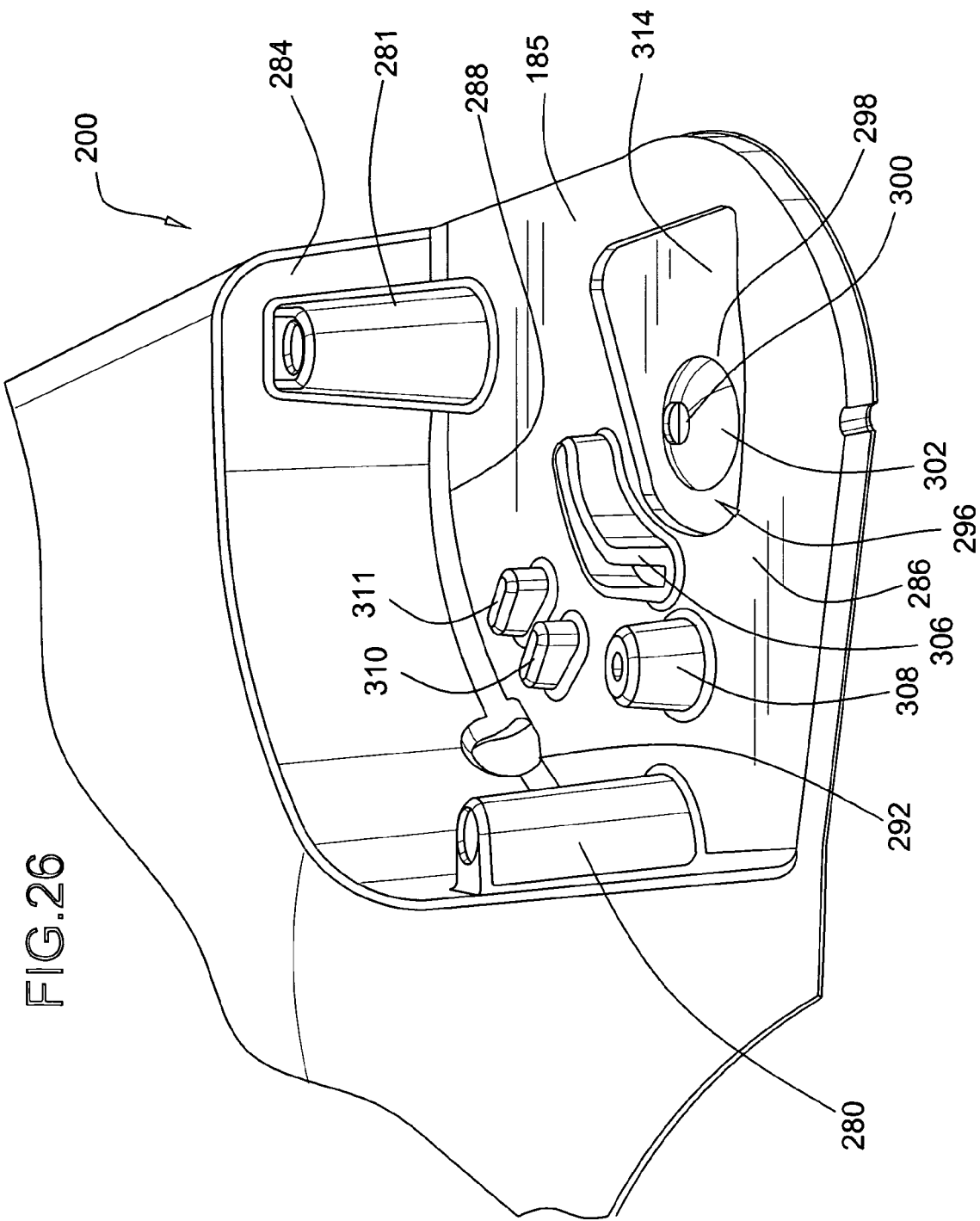
FIG. 26 is an enlarged, fragmentary perspective view of the mounting foot base taken from FIG. 19.
Figure 27:
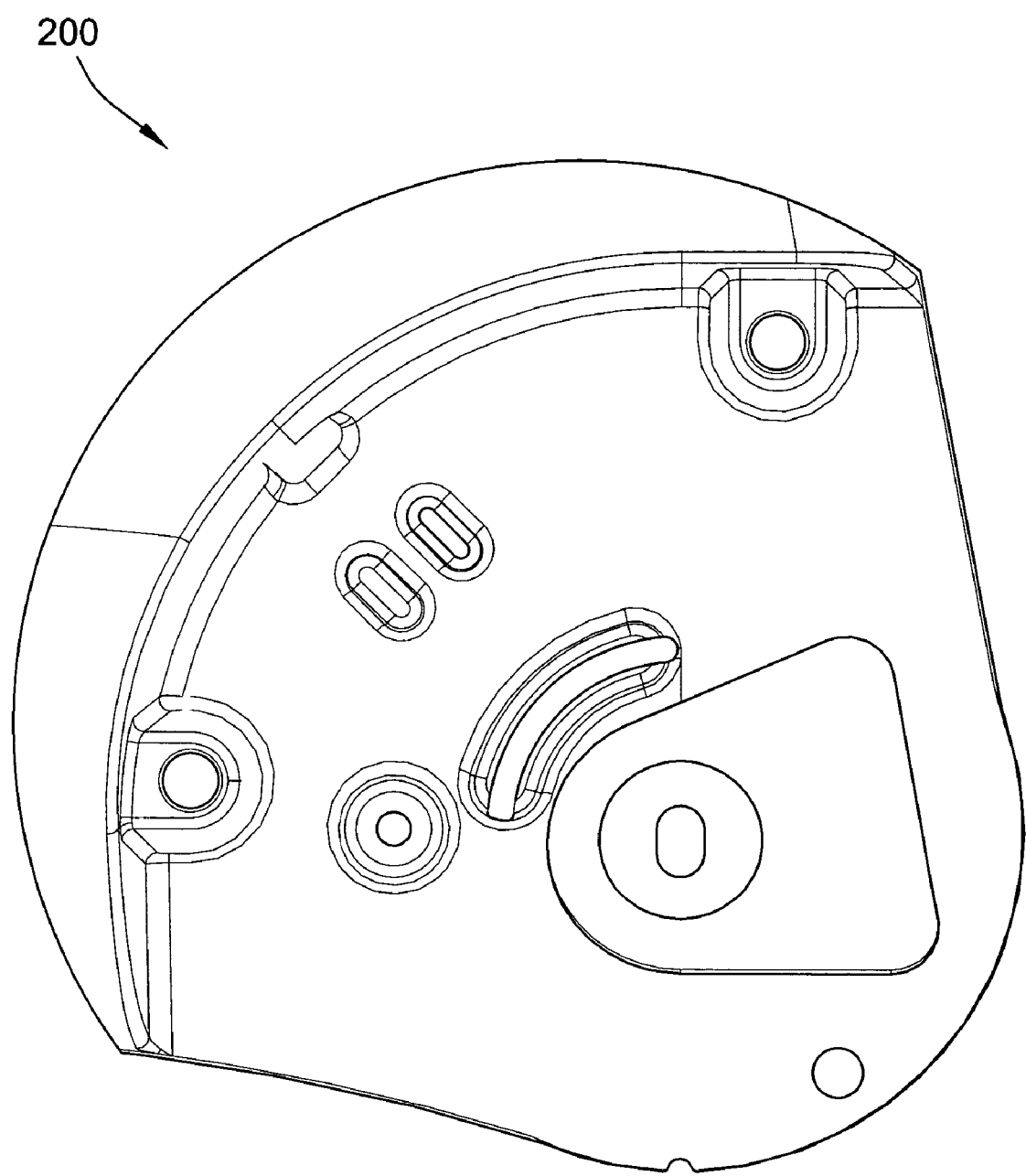
FIG. 27 is an enlarged, detail view taken from FIG. 20.
Figure 28:
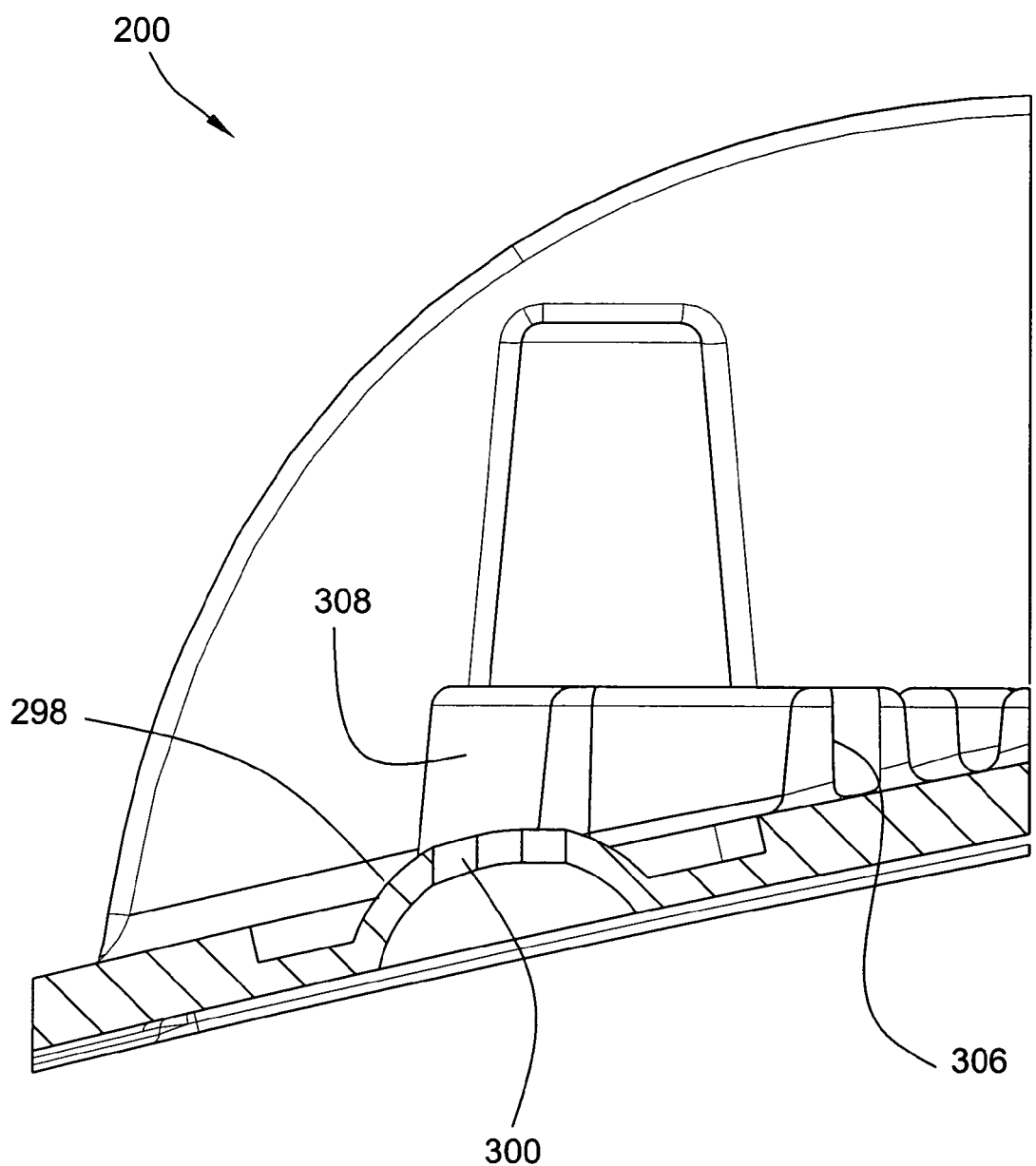
FIG. 28 is a cross-sectional view of the mounting foot base taken along line 28-28 in FIG. 20.

Referring to FIG. 26, the second compartment 185 is shown. The first compartment is substantially a mirror image of the second compartment 184. The second compartment includes a pair of cover mounts 280, 281 that extend from a sidewall 284 and a bottom 286 of the compartment 185. The sidewall 284 and the bottom 286 meet at an edge 288 that is curved. The compartment 185 includes an opening 292, disposed substantially at the edge 288, for allowing electrical wires, for example, to extend therethrough. The compartment 185 includes a signaling device mounting system 296 which includes a plurality of mounting points for allowing the signaling device to be pivotally connected to the base 200 such that the signaling device can rotate about at least two axis.

The mounting system includes a mounting dimple 298 having an opening 300 therethrough. The mounting dimple 298 presents a convex surface 302 to the bottom 286 of the compartment 185. The surface 302 can be configured to substantially conform to a housing of the signaling device. The signaling device can pivot both horizontally and vertically with respect to the base 200 of the mounting foot about the mounting dimple 298. The mounting system 296 can include a curved slot 306, a mounting boss 308, and a pair of lands 310, 311. The mounting dimple 298 can be disposed within a recess 314.

Figure 29:
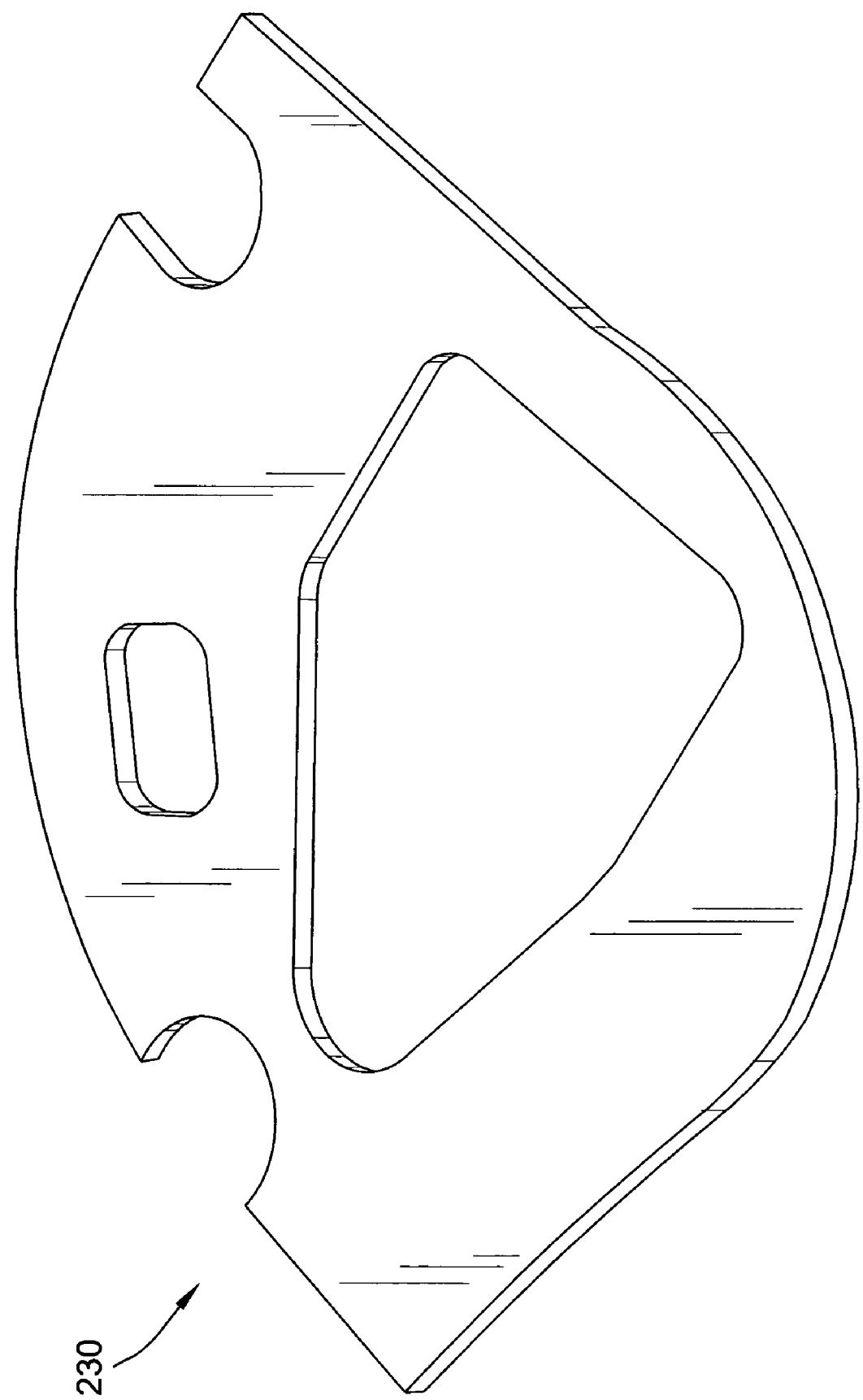
FIG. 29 is a perspective view of a first seal member of the mounting foot of FIG. 10.
Figure 30:
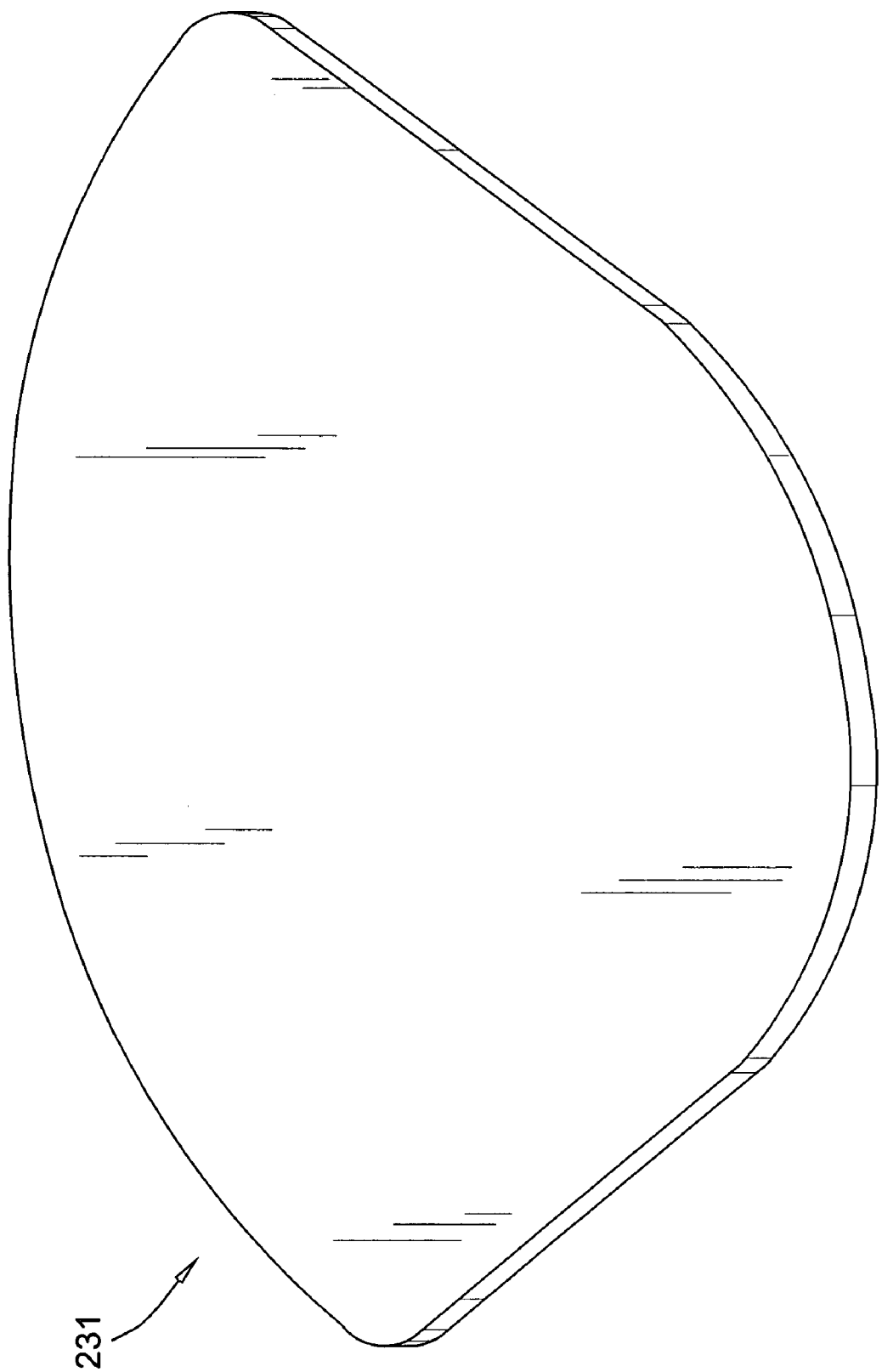
FIG. 30 is a perspective view of a second seal member of the mounting foot of FIG. 10.
Figure 31:
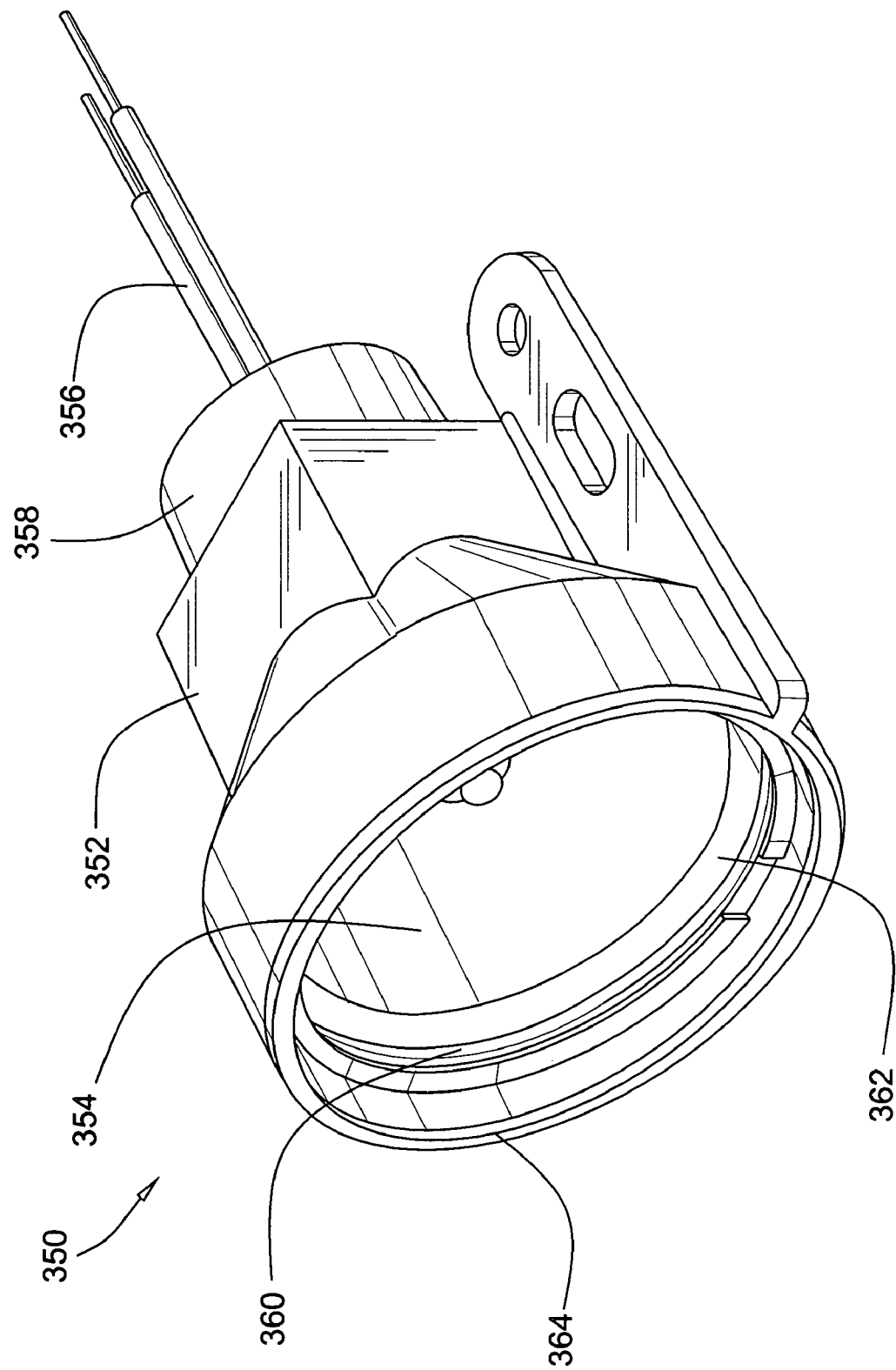
FIG. 31 is a perspective view of a signaling device of the mounting foot of FIG. 10, the signaling device being in the form of a lamp assembly.
Figure 32:
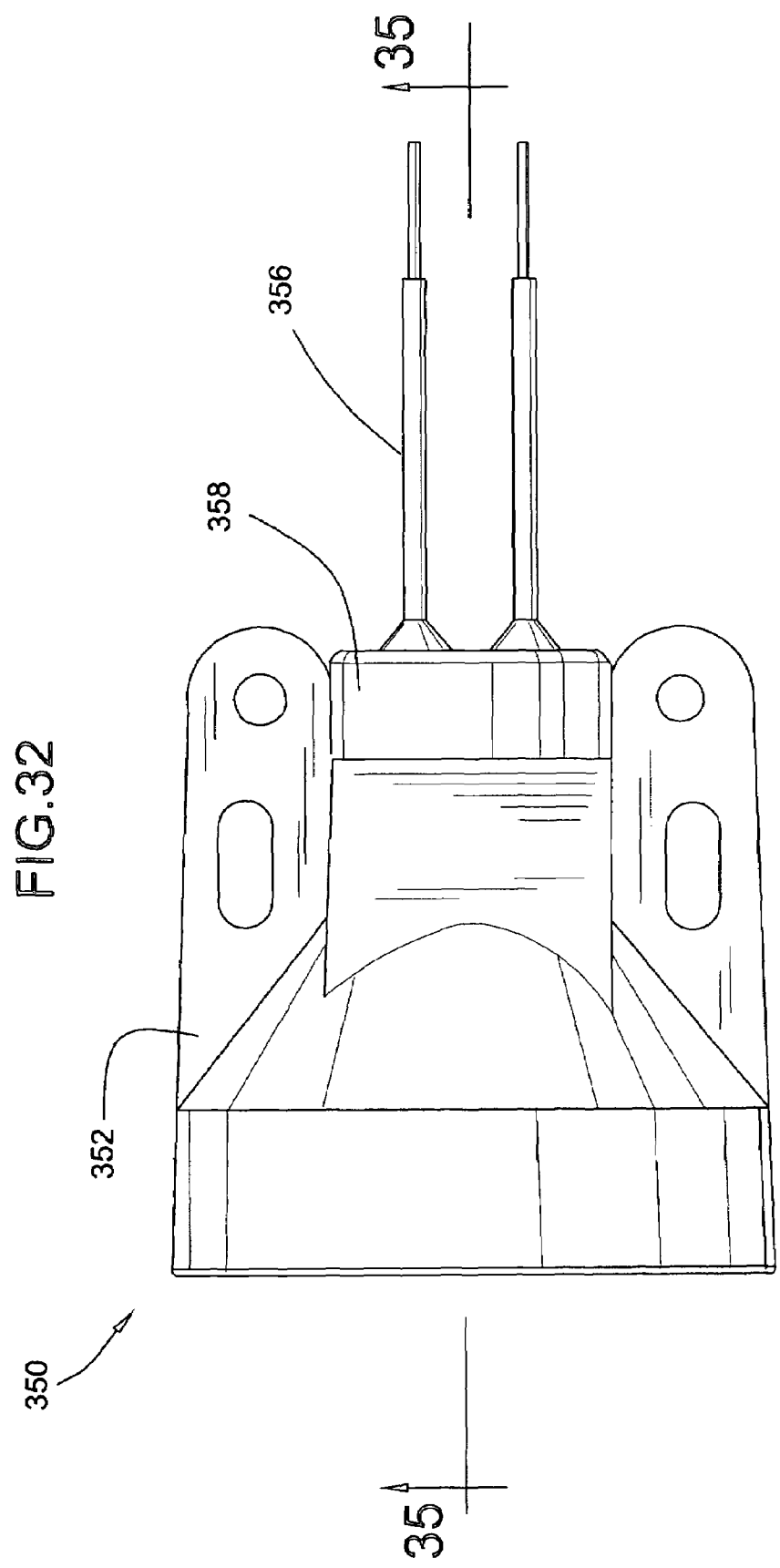
FIG. 32 is a top plan view of the lamp assembly of FIG. 31.
Figure 33:
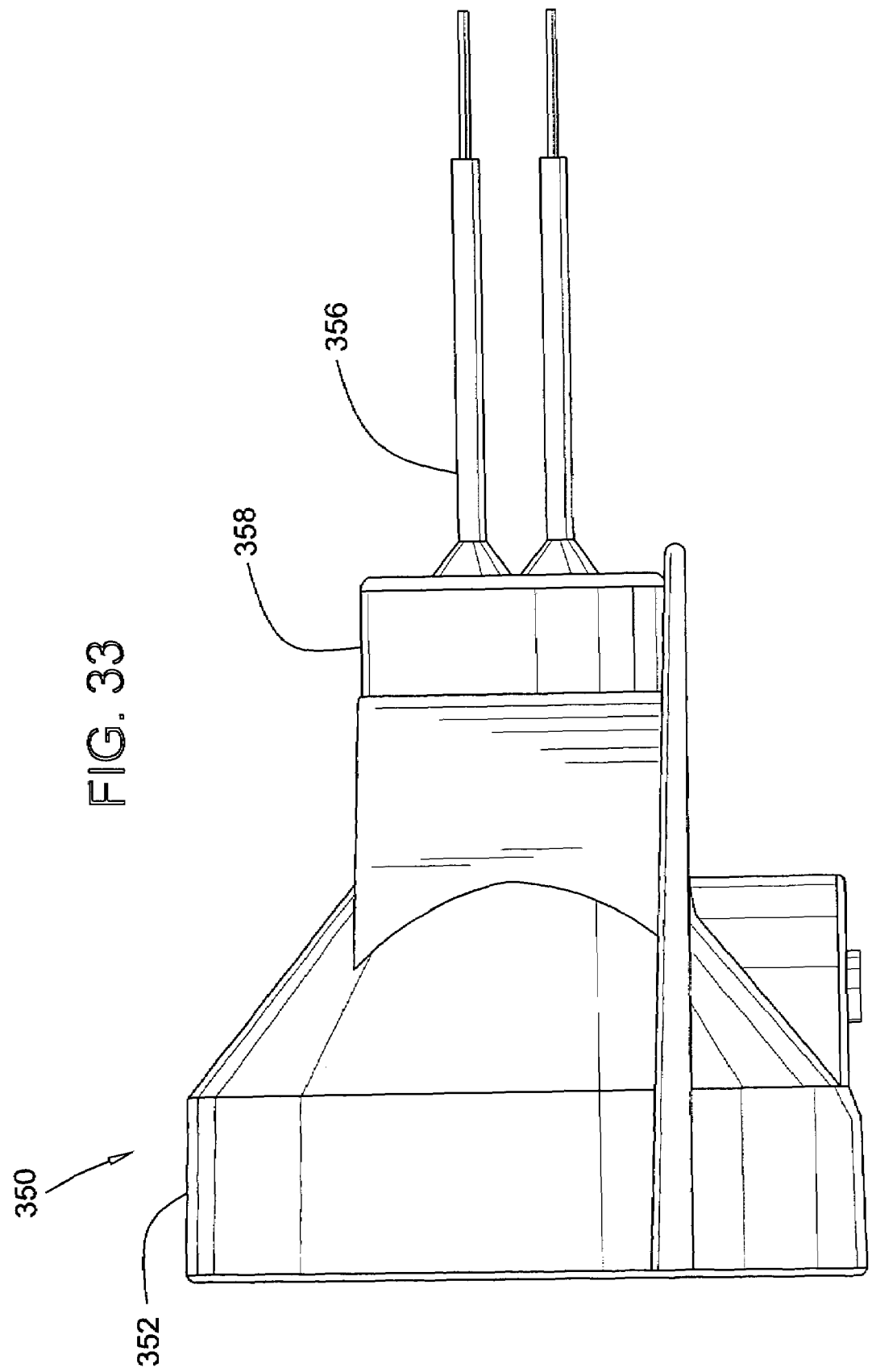
FIG. 33 is a side elevational view of the lamp assembly of FIG. 31.
Figure 34:
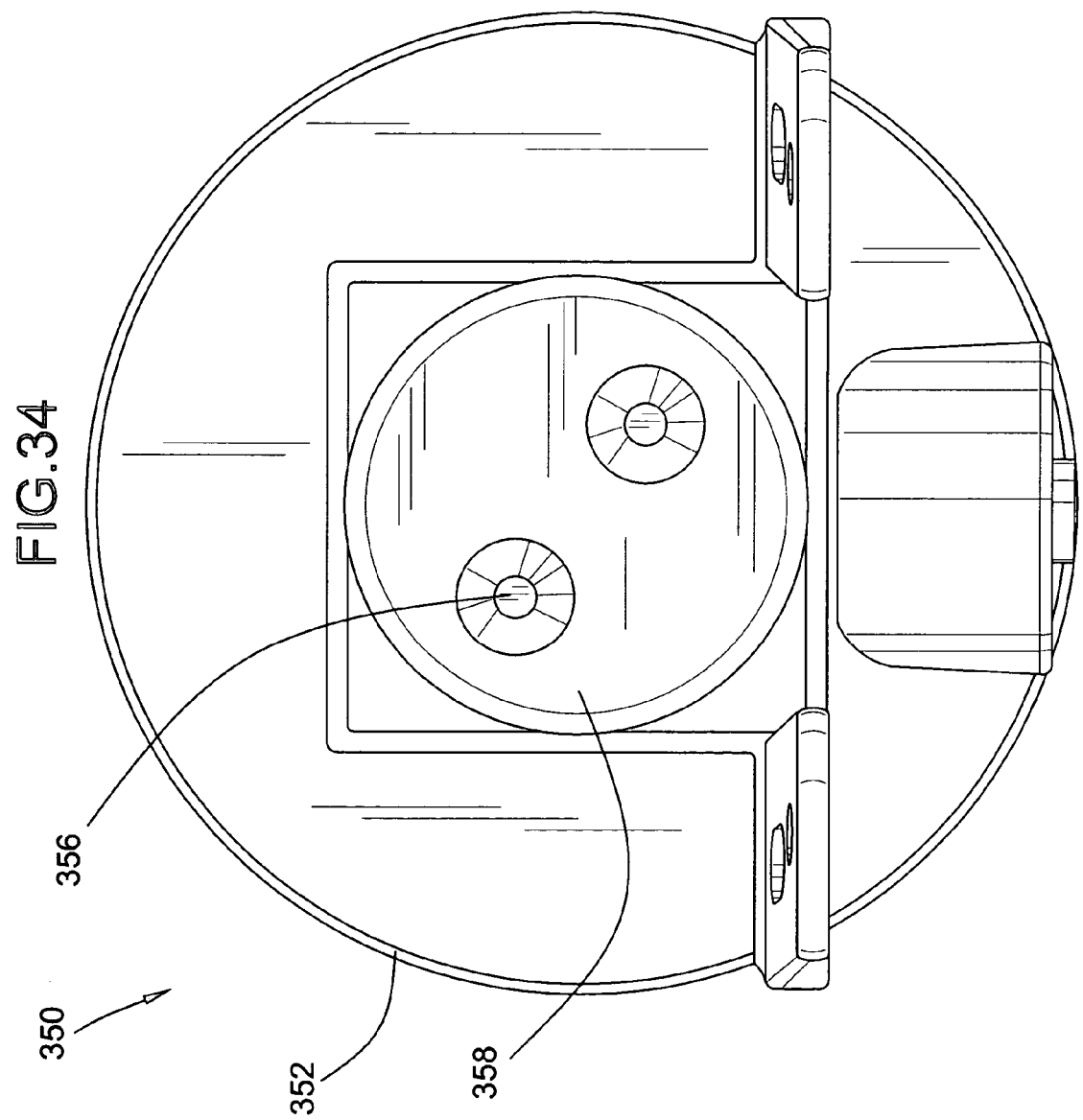
FIG. 34 is a rear end elevational view of the lamp assembly of FIG. 31.
Figure 35:
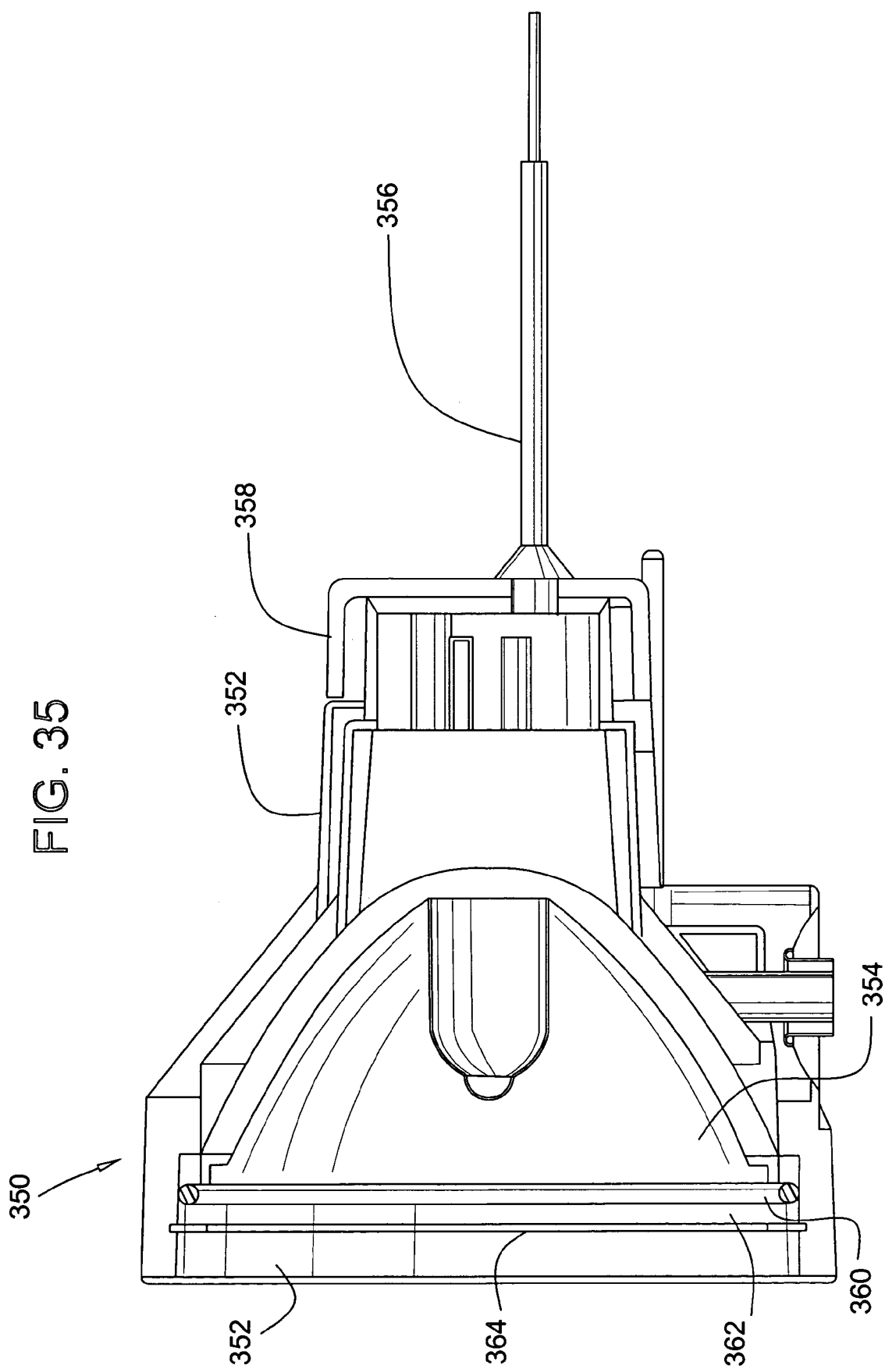
FIG. 35 is a cross-sectional view of the lamp assembly of FIG. 31 taken along line 35-35 in FIG. 32.
Figure 36:
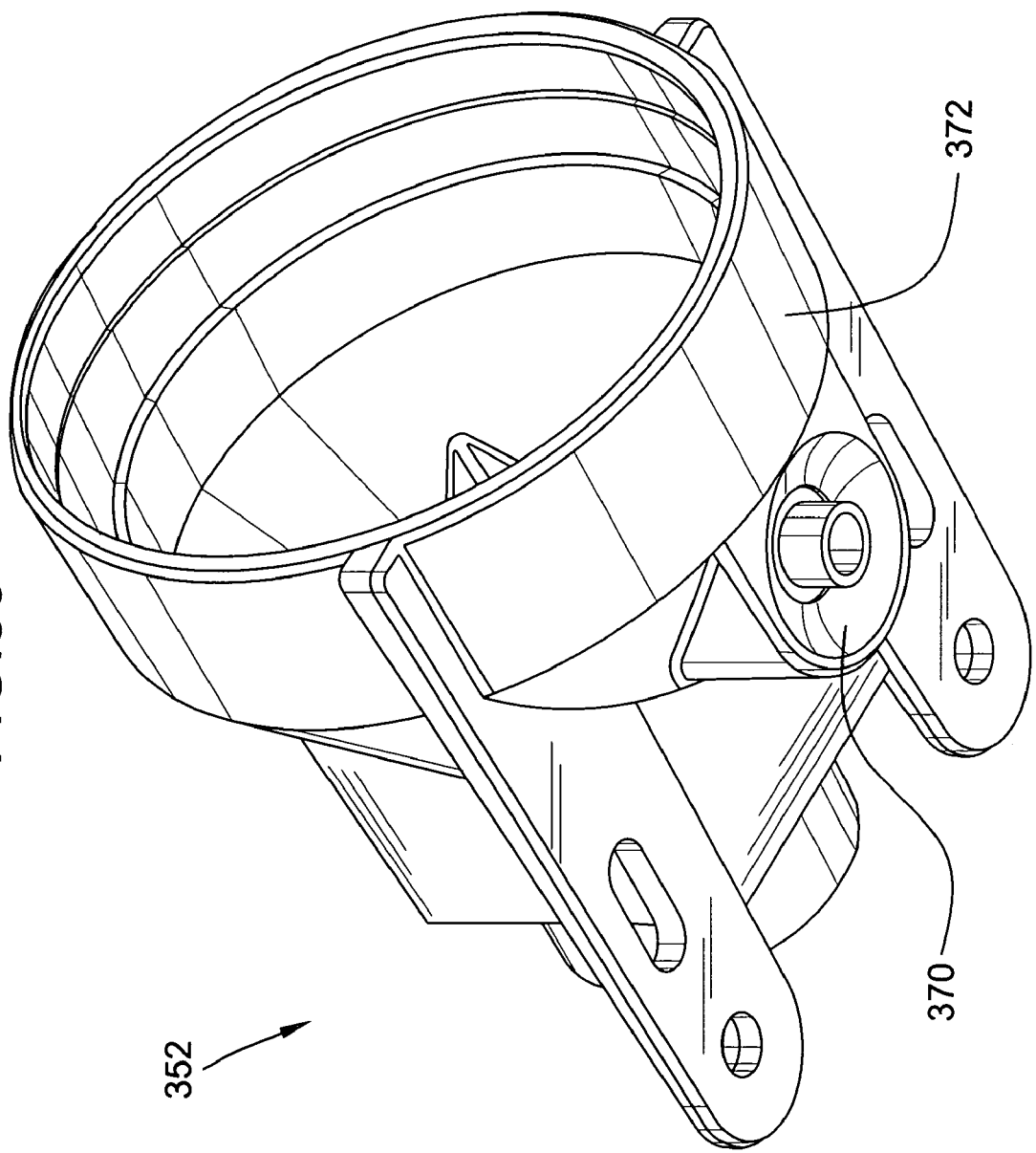
FIG. 36 is a perspective view of a housing of the lamp assembly of FIG. 31.

Referring to FIG. 29, the first seal 230 can include a plurality of cutouts and openings to substantially conform to the interior of the compartment of the mounting foot in which it is disposed. The first seal 230 can be made from any suitable material. Referring to FIG. 30, the second seal 231 is shown. The second seal 231 can be configured to substantially conform to the perimeter of the compartment with which it is associated. The second seal 231 can be made from the same material as the first seal or from a different material.

Referring to FIGS. 31-35, an illustrative signaling device 350 is shown. The signaling device 350 shown in FIGS. 31-35 is the same as the first and second signaling devices 250, 252 shown in FIG. 18. The signaling device 350 is in the form of a lamp assembly. The lamp assembly 350 includes a housing 352, a light source 354, a connector 356, a cap 358, an o-ring 360, a lens 362, and a retainer ring 364.

Figure 41:
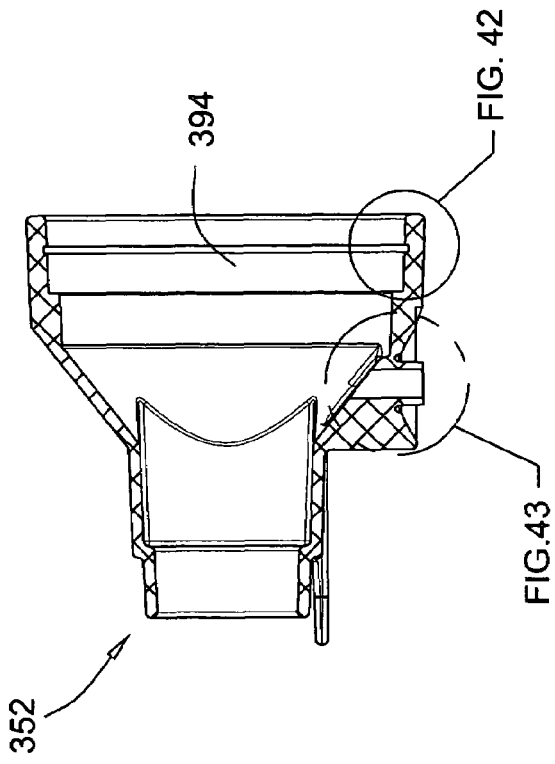
FIG. 41 is a cross-sectional view of the lamp housing of FIG. 36 taken along line 41-41 in FIG. 38.
Figure 42:
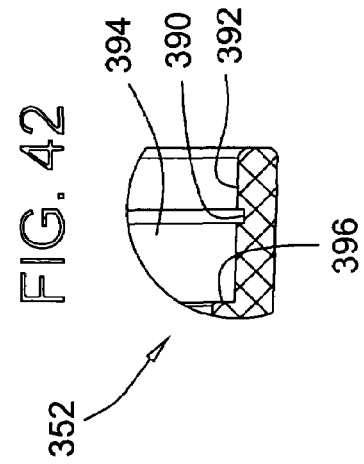
FIG. 42 is an enlarged, detail view taken from FIG. 41.
Figure 40:
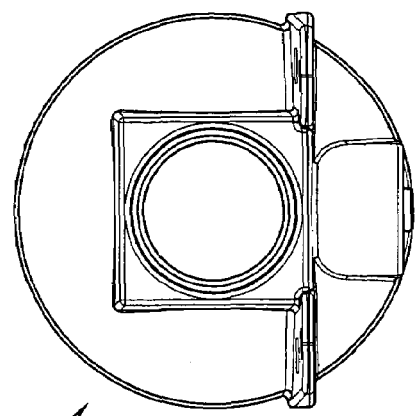
FIG. 40 is a rear end elevational view of the lamp housing of FIG. 36.
Figure 43:
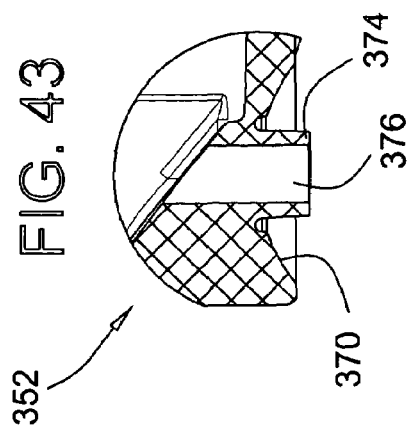
FIG. 43 is an enlarged, detail view taken from FIG. 41.

Referring to FIGS. 36-43, the lamp housing 352 is shown. The lamp housing 352 includes a generally concave recess 370 disposed at a bottom 372 thereof. Referring to FIG. 43, the recess 370 has a boss 374 extending therefrom. The boss 374 includes an opening 376 extending therethrough. Referring to FIG. 39, the lamp housing 352 includes a pair of fins 380, 381 each having an elongated slot 384 and an opening 386. Referring to FIG. 41, the lamp housing 352 is generally hollow. The concave recess 370 can be operably arranged with one of the mounting dimples 298 of the base 200 of one of the mounting feet, such as the mounting dimple 298 shown in FIG. 28.

Referring to FIG. 42, the lamp housing 352 includes a groove 390 extending around a perimeter 392 of a front opening 394. The groove 390 is configured to accommodate the retainer ring such that the retainer ring can be disposed within the groove 390 with a portion of the retainer ring extending into the front opening 394 from the groove 390 around the perimeter 392. With the retainer ring disposed in the groove 390, the retainer ring can act to retain the lens, the o-ring, and a portion of the light reflector between the retainer ring and a shoulder 396 of the housing 352.

Figure 44:
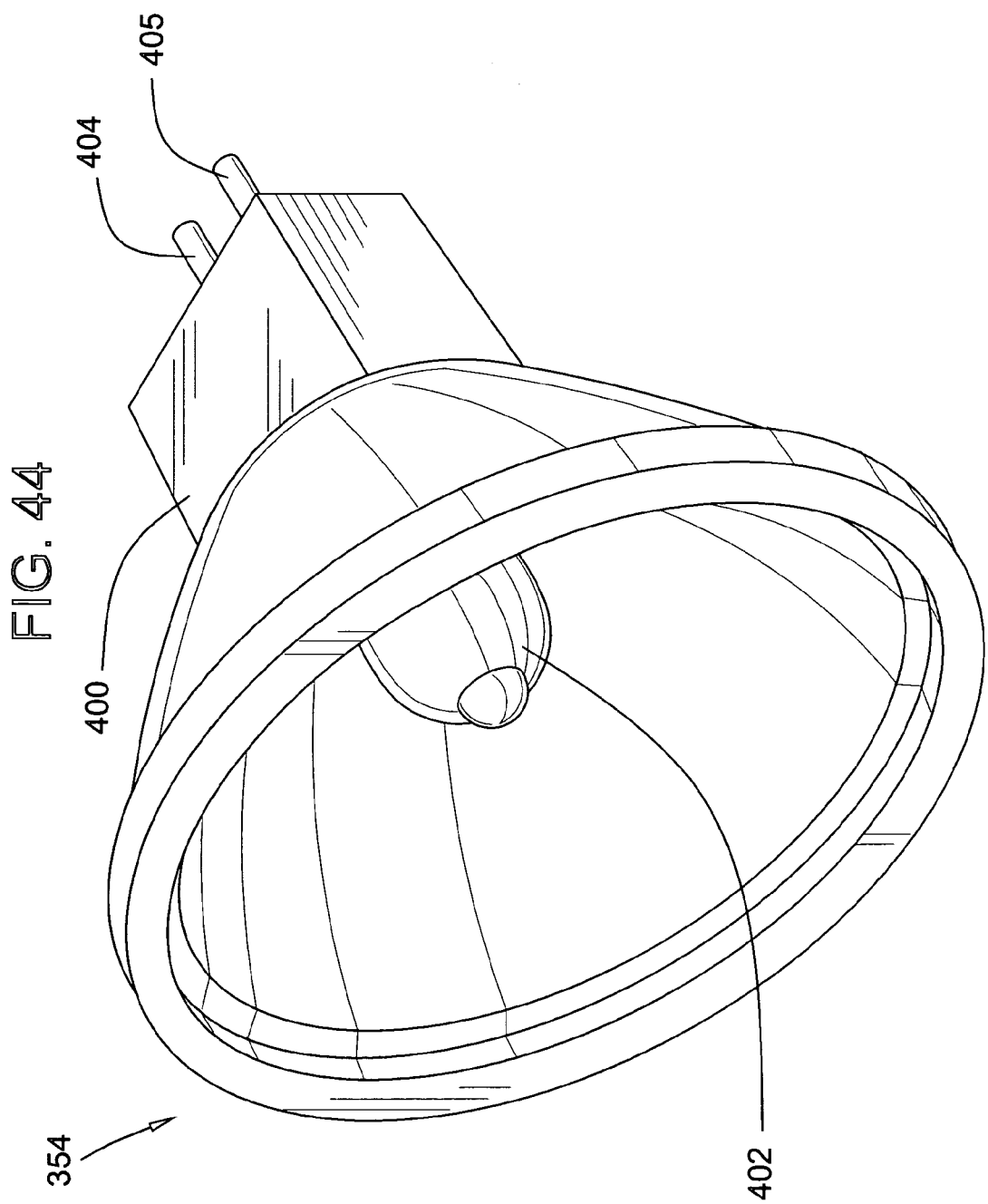
FIG. 44 is a perspective view of a light reflector of the lamp assembly of FIG. 31.
Figure 45:
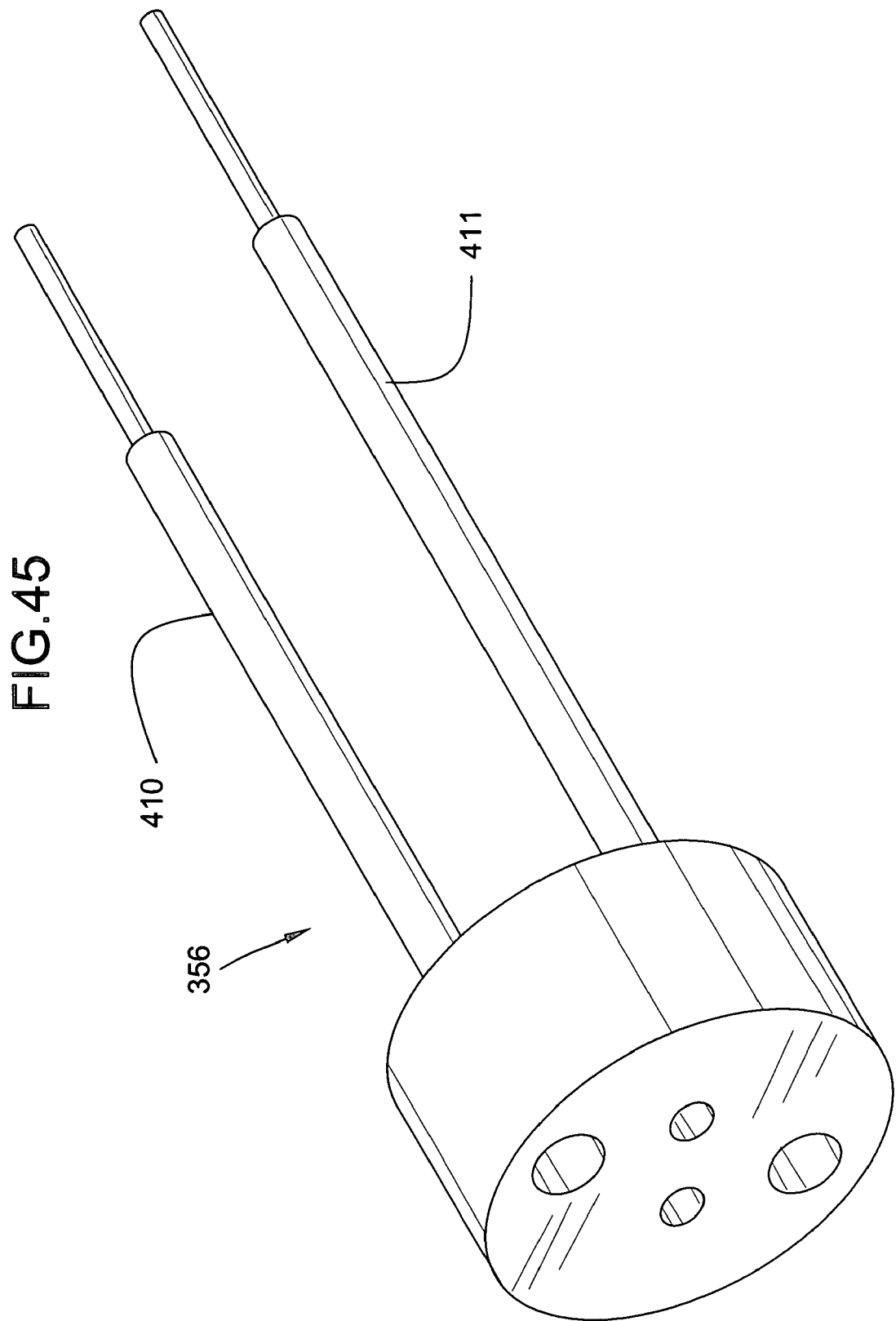
FIG. 45 is a perspective view of a connector of the lamp assembly of FIG. 31.
Figure 46:
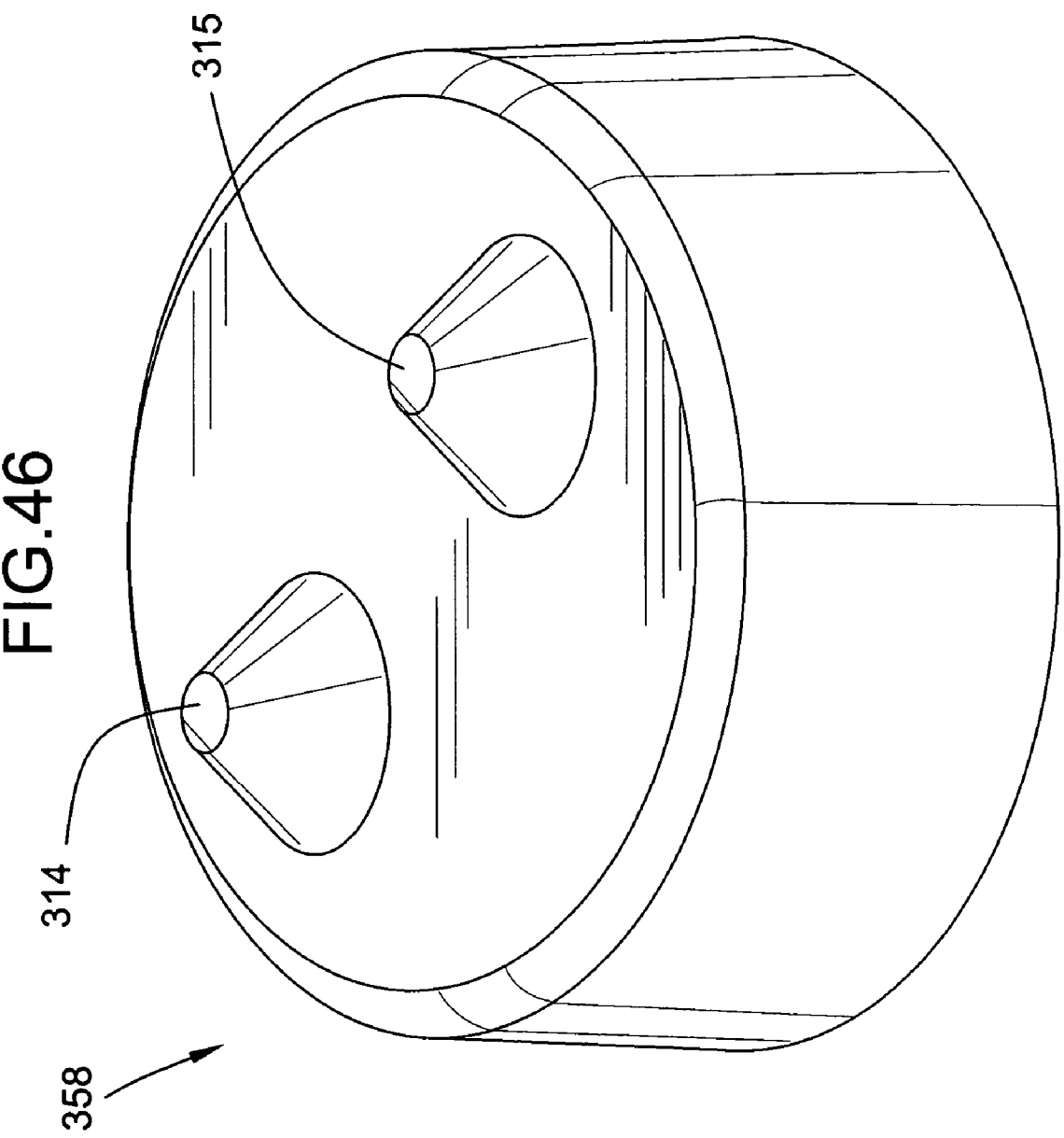
FIG. 46 is a perspective view of a cap of the lamp assembly of FIG. 31, the cap having a pair of grommets.
Figure 47:
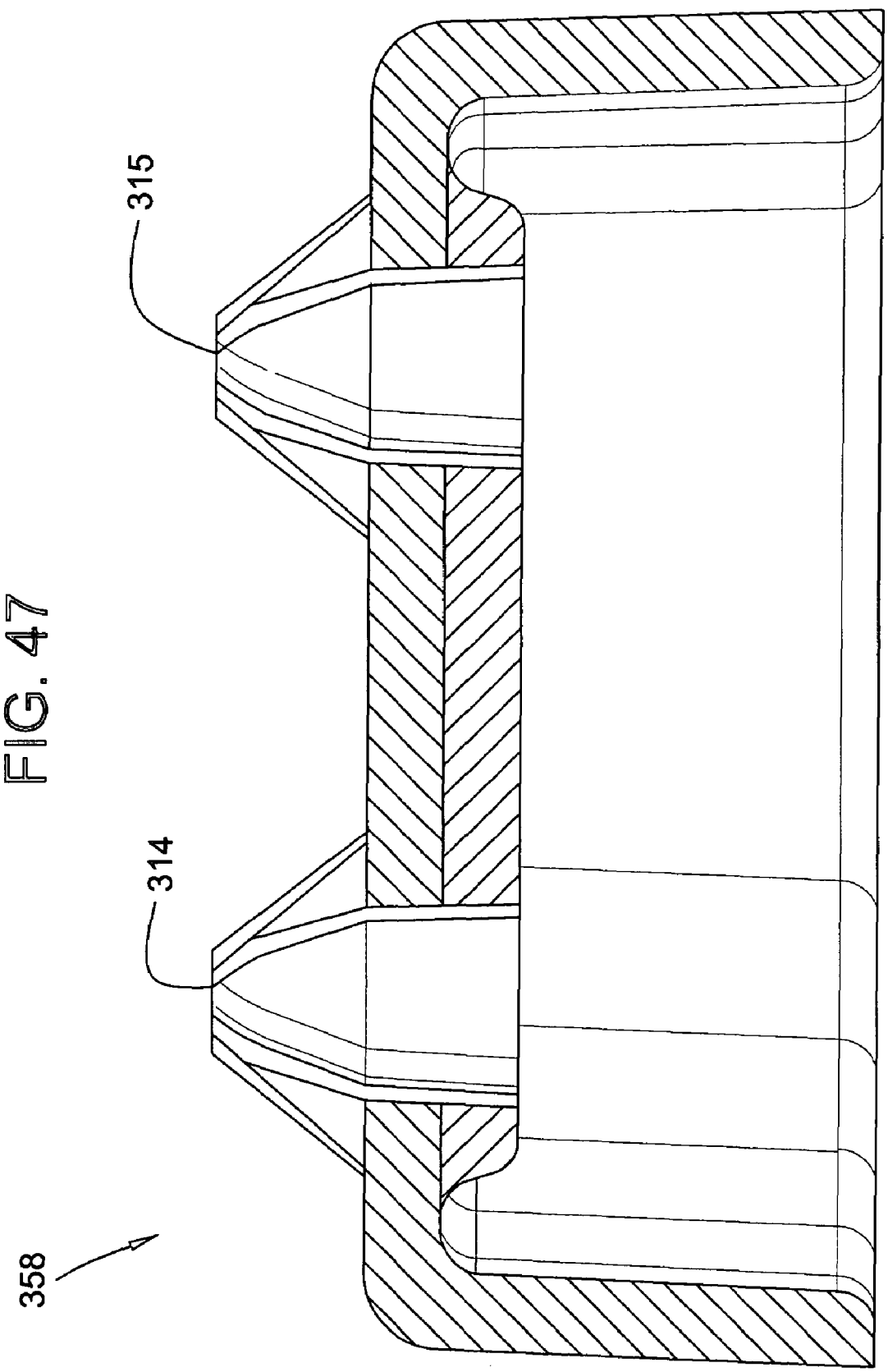
FIG. 47 is a sectional elevation view of the cap of FIG. 46.

As illustrated in FIG. 44, the light source 354 is molded with a light bulb receptacle 400 for receiving a light bulb 402, which can be integrally molded together. In the illustrated embodiment, the receptacle 400 is formed to receive and retain two connection pins 404, 405, which form electrical connection with the light bulb 402. Referring to FIG. 45, the connector 356 includes wires 410, 411 for supplying electrical power to the light bulb. The wires 410, 411 can be connected to the pins via push-on connectors, for example. Referring to FIGS. 46 and 47, the cap 358 is generally hollow and is provided to encircle the connector. The cap 358 includes a pair of grommets 314, 315 to accommodate the wires of the connector. The cap 358 can be constructed from a material, such as rubber, for example, to provide a seal around the wires of the connector. The cap 358 can be sized such that the cap is retained around the connector via a friction fit. In other embodiments, different lights sources can be used, such as one or more LEDs, for example.

Figure 48:
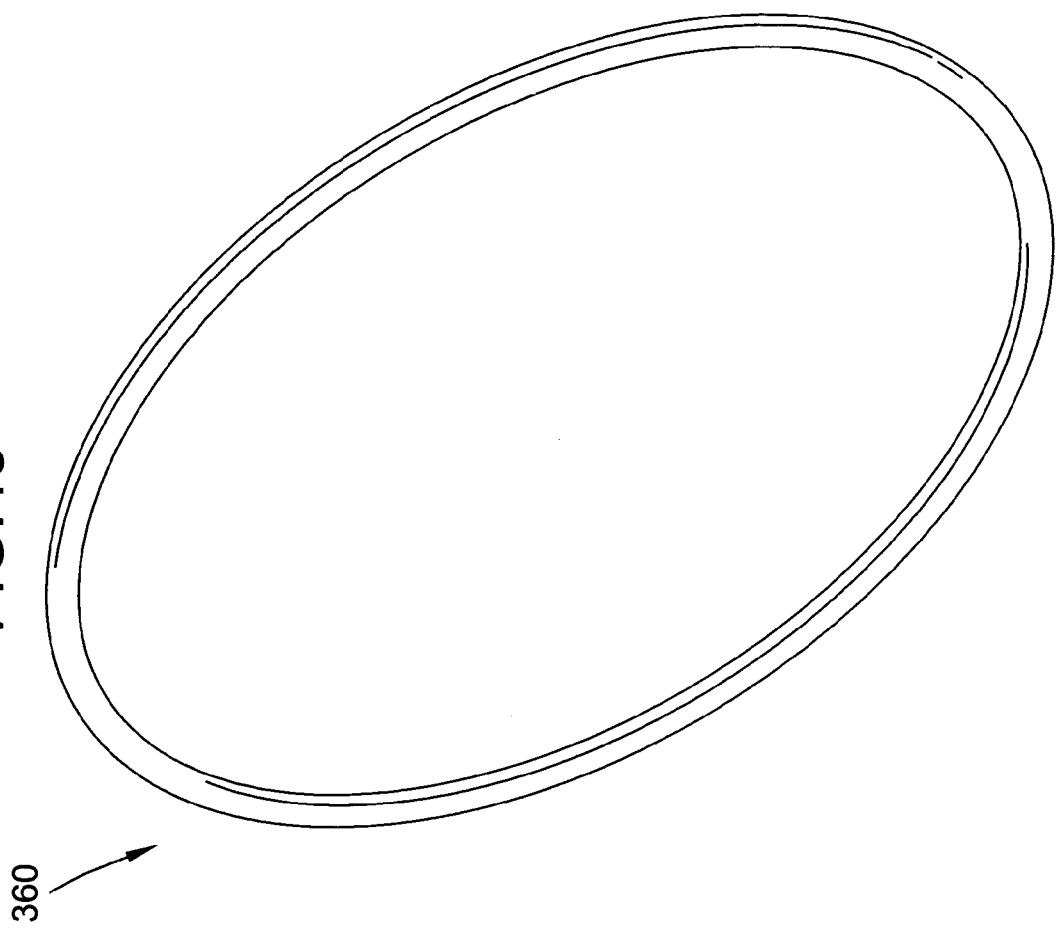
FIG. 48 is a perspective view of an o-ring of the lamp assembly of FIG. 31.
Figure 49:
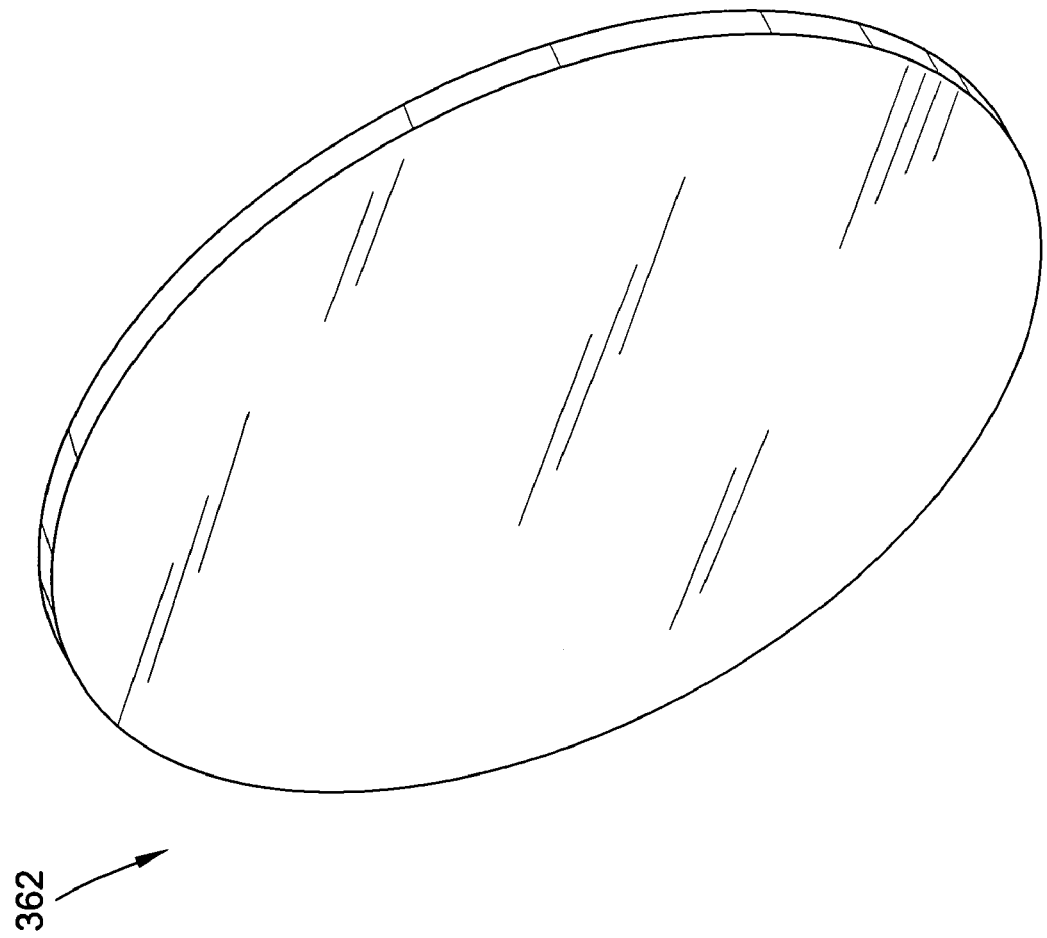
FIG. 49 is a perspective view of a lens of the lamp assembly of FIG. 31.
Figure 50:
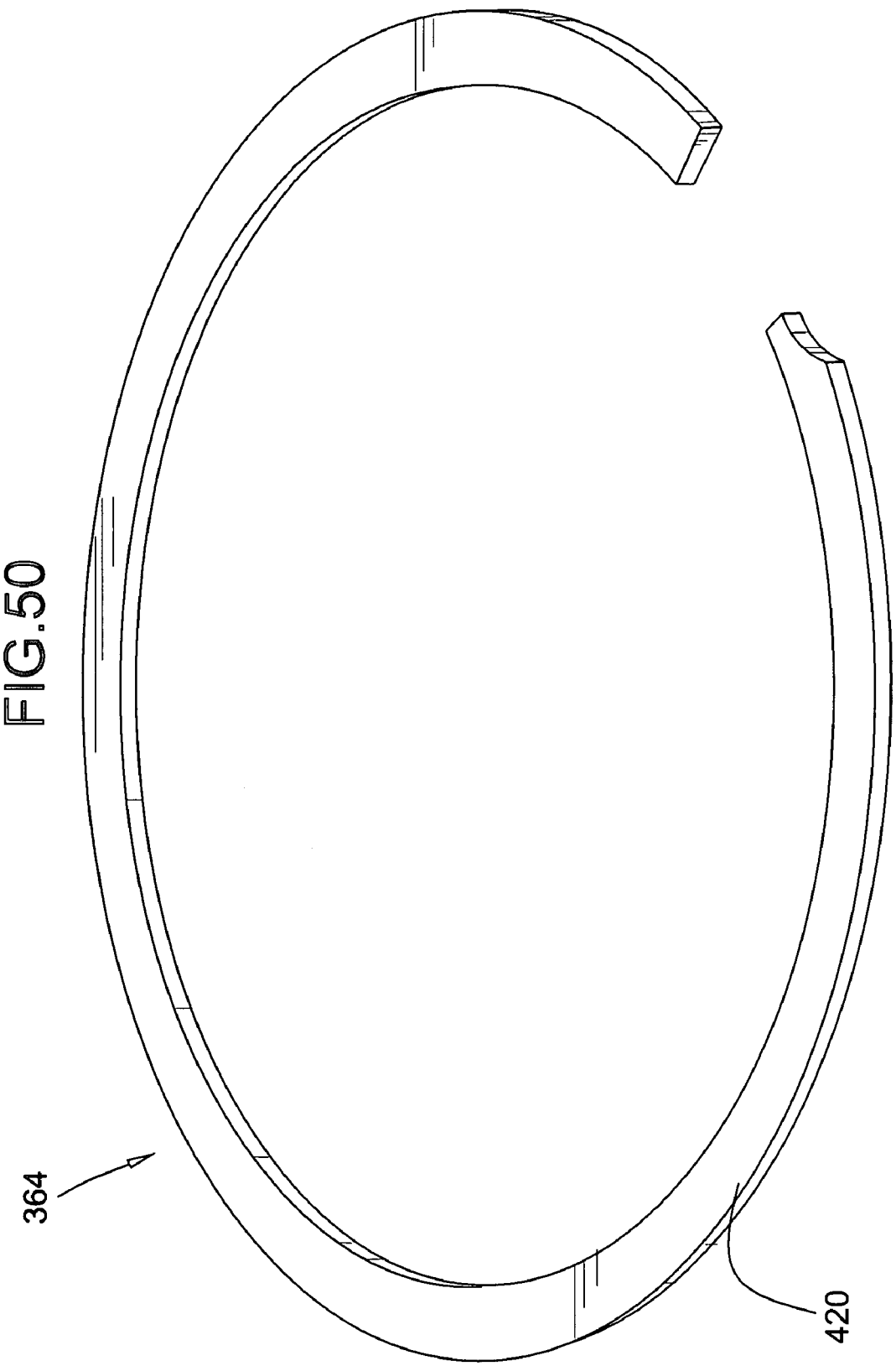
FIG. 50 is a perspective view of a retainer ring of the lamp assembly of FIG. 31.
Figure 51:
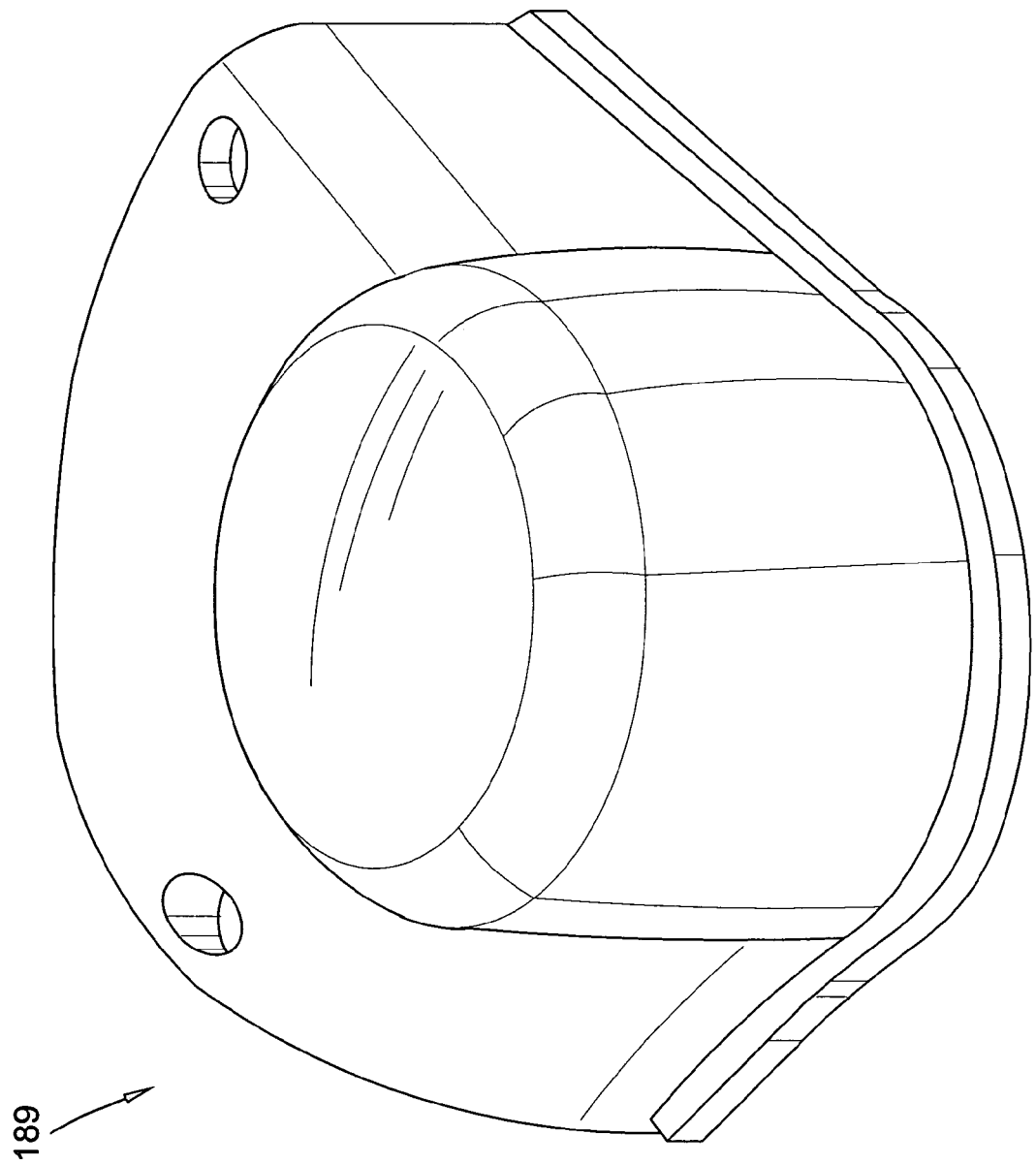
FIG. 51 is a perspective view of the second cover of the mounting foot of FIG. 10.

Referring to FIG. 48, the o-ring 360 is shown. The o-ring 360 can be made from any suitable material, such as, any suitable elastomer, for example. In some embodiments, the o-ring 360 can be made from silicone. Referring to FIG. 49, the lens 362 is shown. The lens 362 can be made from any suitable translucent or transparent material, such as borosilicate glass, for example. The lens 362 can be clear or be colored. Referring to FIG. 50, the retainer ring 364 is shown. The retainer ring 364 is the shape of an annulus with a portion removed therefrom. The retainer ring can be constructed from any suitable resiliently flexible material, such as metal for instance. The cutout portion of the retainer ring 364 allows the retainer ring to be flexed to reduce the size of an outer perimeter 420 thereof to allow the retainer ring to fit through the front opening of the lamp housing. The resiliently flexible nature of the retainer ring 364 allows the retainer ring to return to its original shape once the retainer ring 364 is aligned with the groove of the lamp housing.

Figure 52:
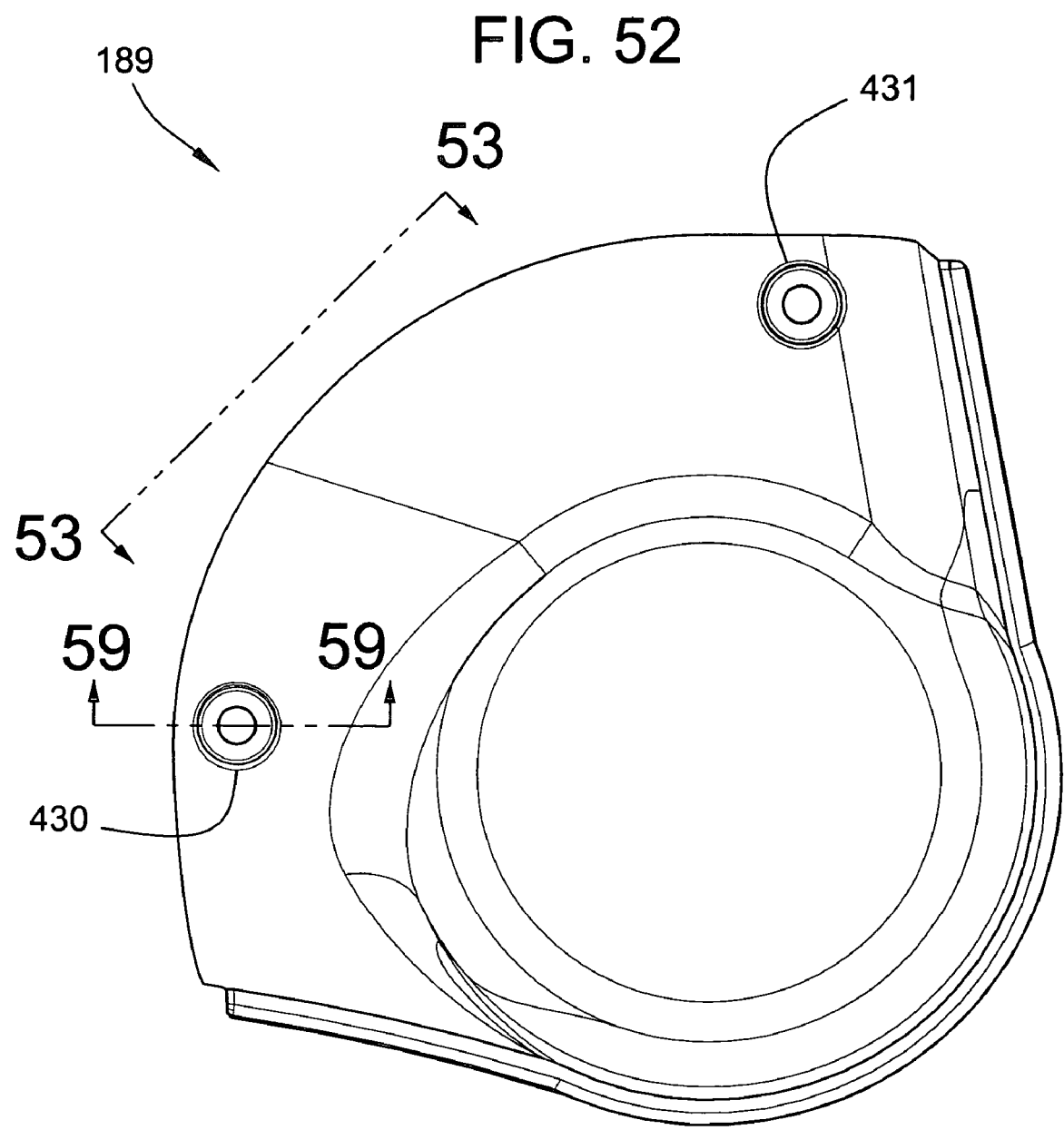
FIG. 52 is a top plan view of the cover of FIG. 51.
Figure 53:
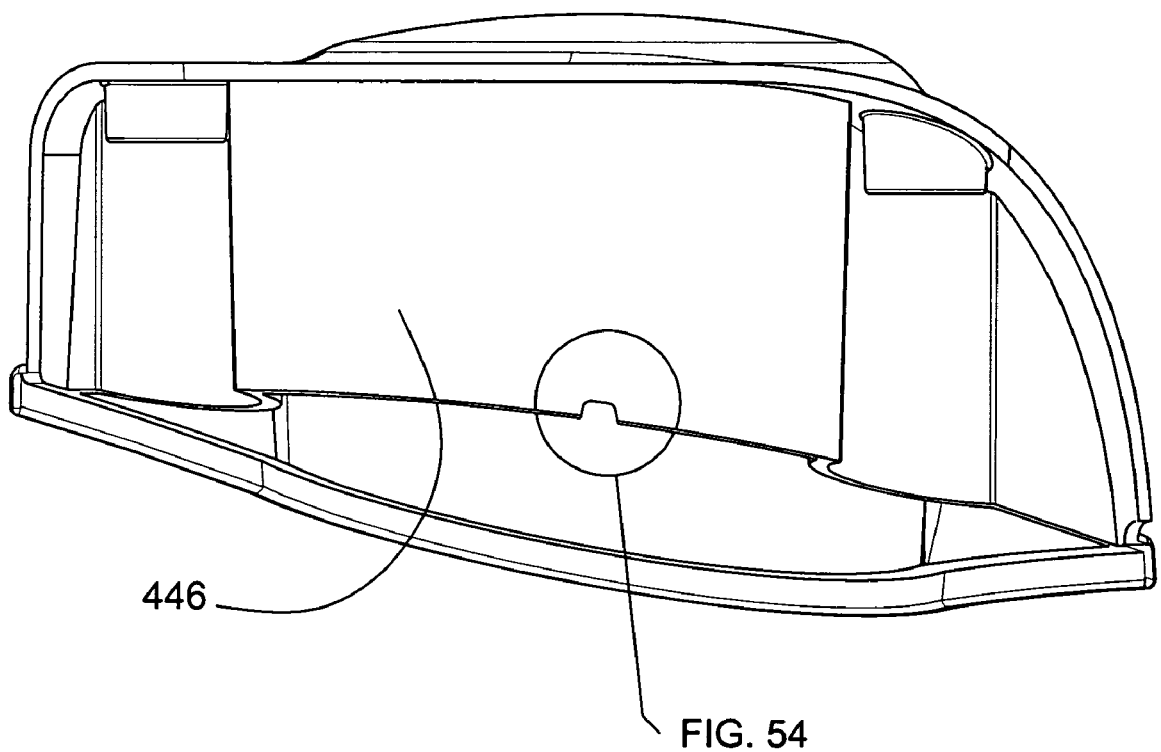
FIG. 53 is a rear elevational view of the cover of FIG. 51 viewed from the direction indicated by line 53-53 in FIG. 52.

Referring to FIGS. 51-59, the second cover 189 of the mounting foot is shown. The second cover 189 is a mirror image of the first cover 188 shown in FIG. 10. The second cover 189 is opaque whereas the first cover 188 is translucent. It will be understood that the second cover is similar to the first cover in other respects. As such, the description of the second cover 189 is applicable to the first cover 188 as well. Turning to FIG. 52, the cover 189 is shaped to substantially conform to the perimeter of the second compartment of the mounting foot to thereby enclose the compartment. The second cover 189 includes a pair of mounting holes 430, 431 which are arranged such that the mounting holes 430, 431 can be substantially aligned with the first and second cover mounts 280, 281 of the mounting foot base 200, shown in FIG. 26.

Figure 59:
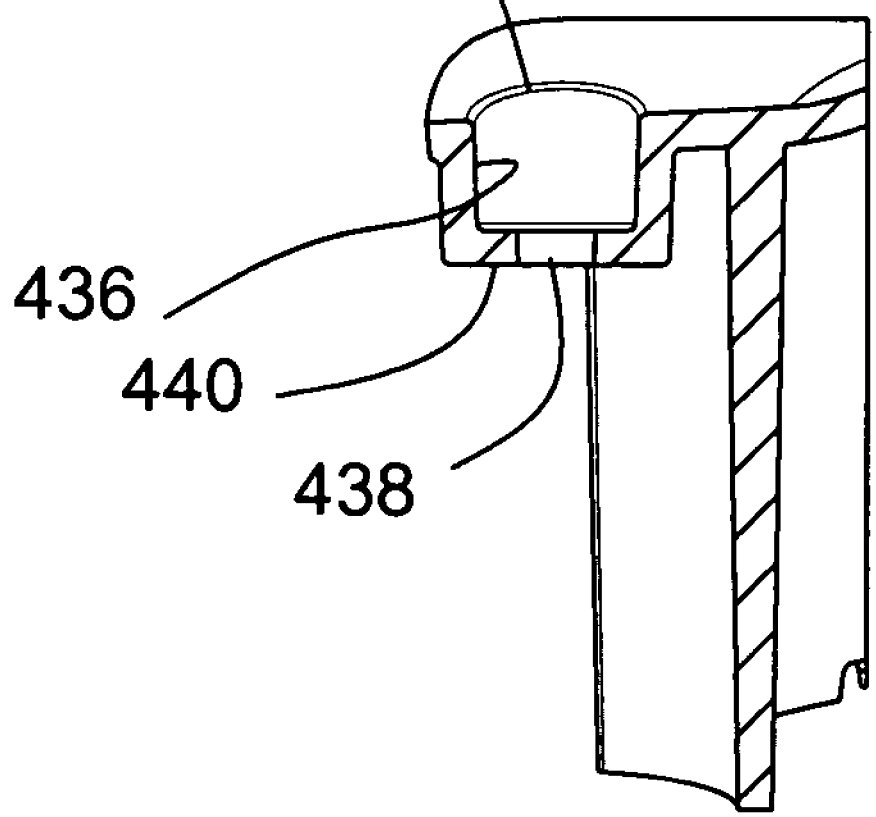
FIG. 59 is a cross-sectional view of the cover of FIG. 51 taken along line 59-59 in FIG. 52.

Referring to FIG. 59, the first mounting hole 430 of the cover 189 is shown. The second mounting hole of the cover 189 is substantially similar to the first mounting hole 430. The first mounting hole includes a counterbore 436 and an opening 438 extending through a base 440 of the counterbore 436.

Figure 54:
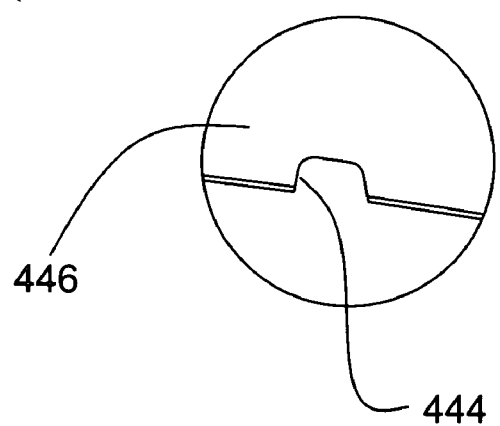
FIG. 54 is an enlarged detail view taken from FIG. 53.
Figure 55:
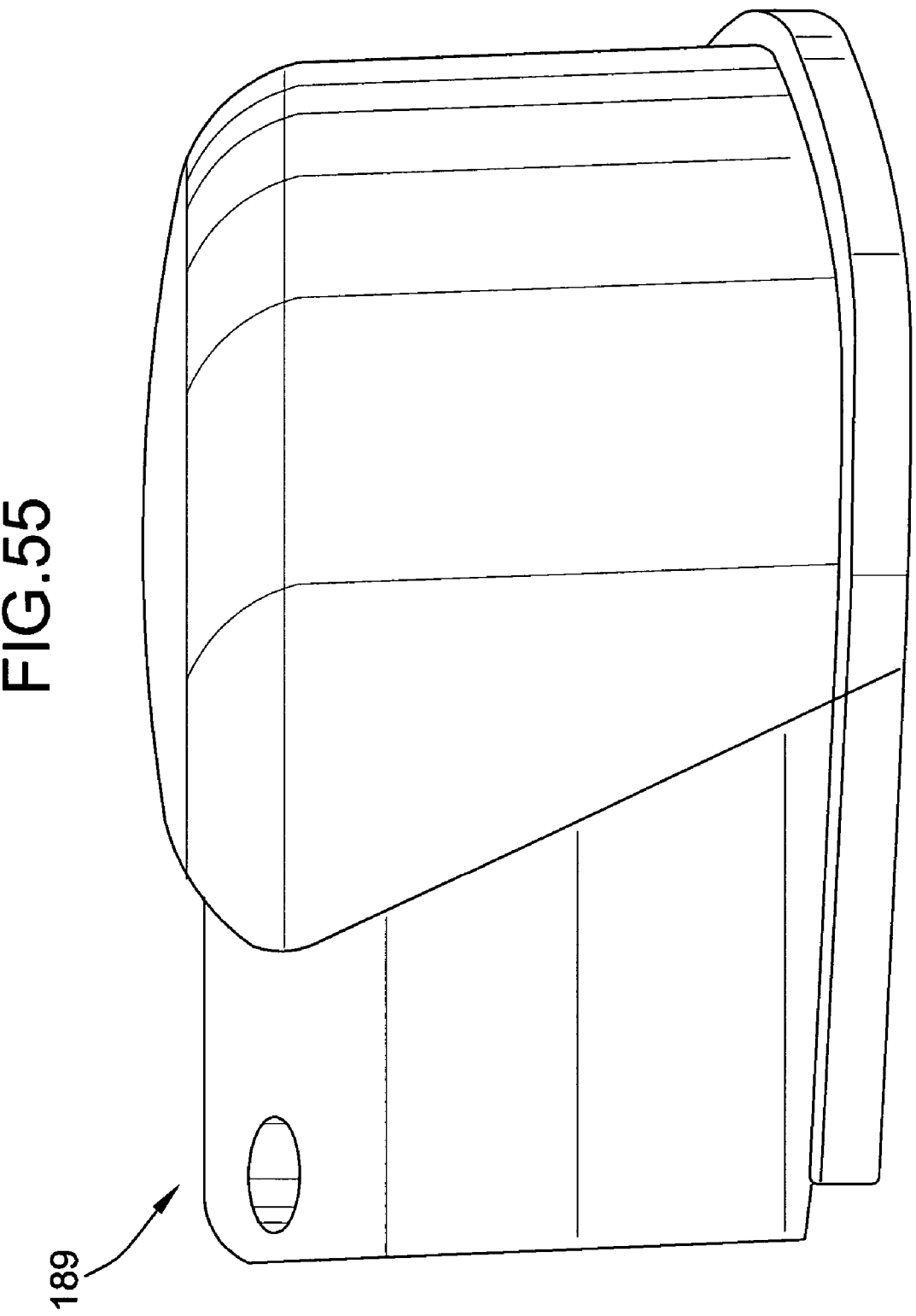
FIG. 55 is a second elevational view of the cover of FIG. 51.
Figure 56:
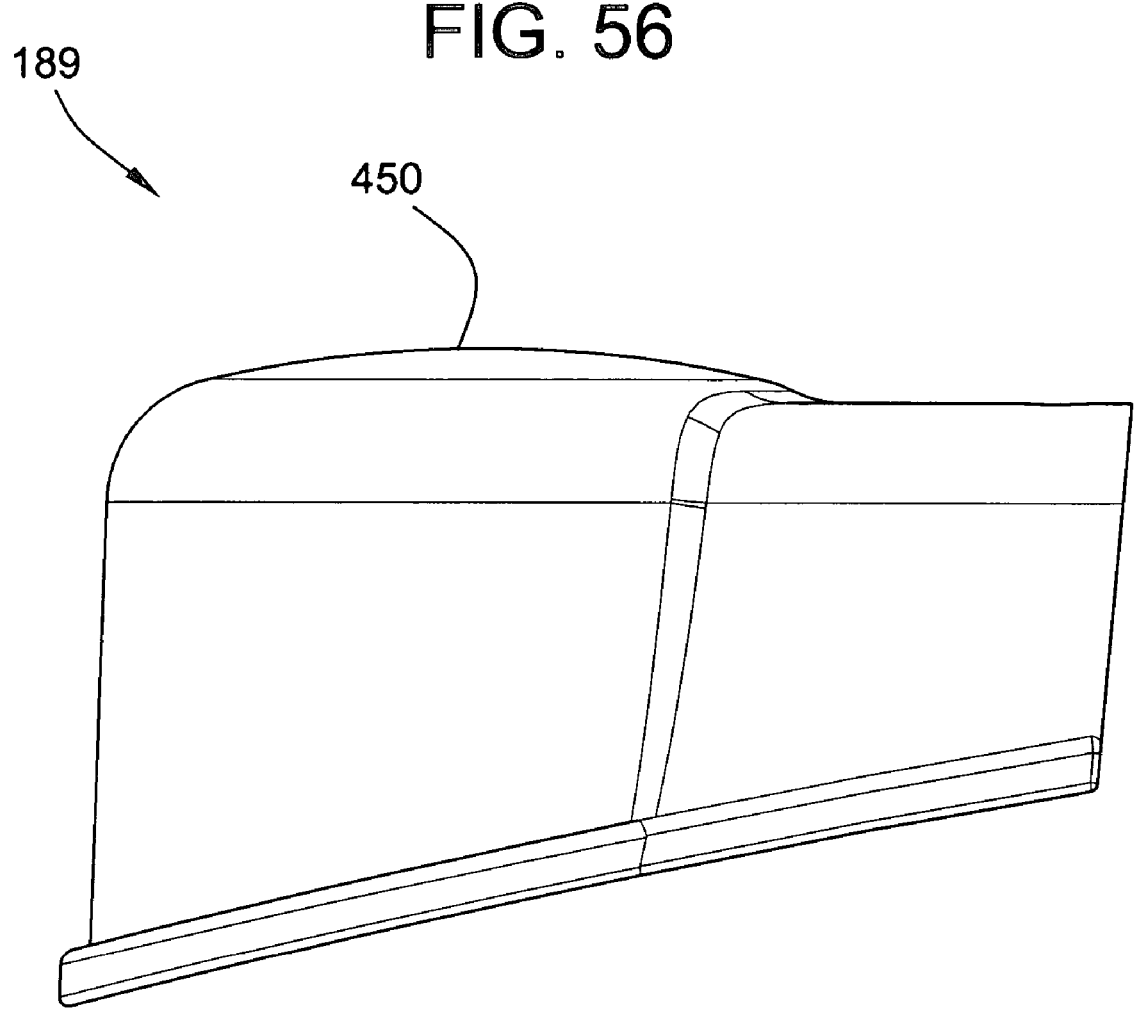
FIG. 56 is a third elevational view of the cover of FIG. 51.
Figure 57:
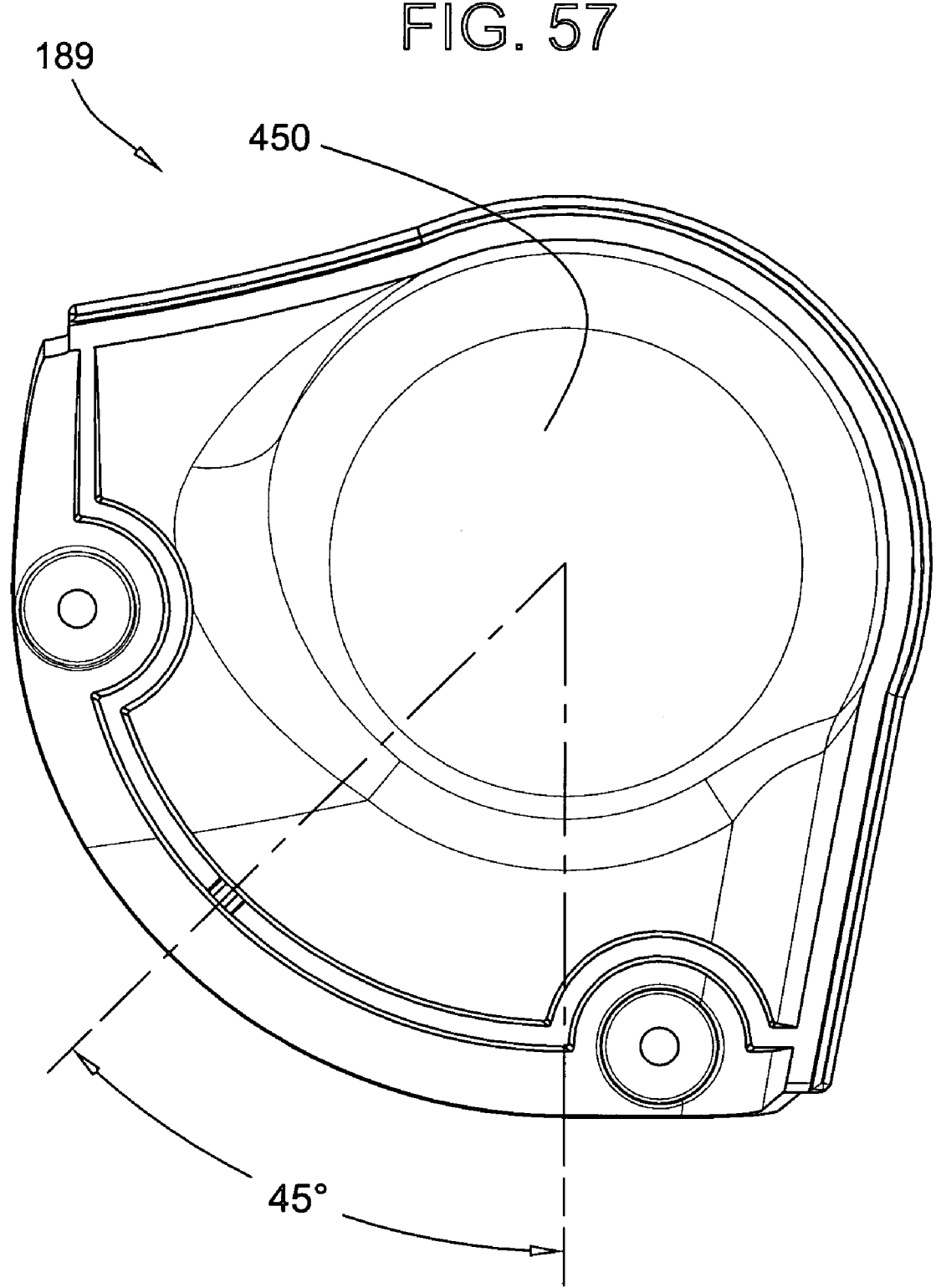
FIG. 57 is a bottom plan view of the cover of FIG. 51.
Figure 58:
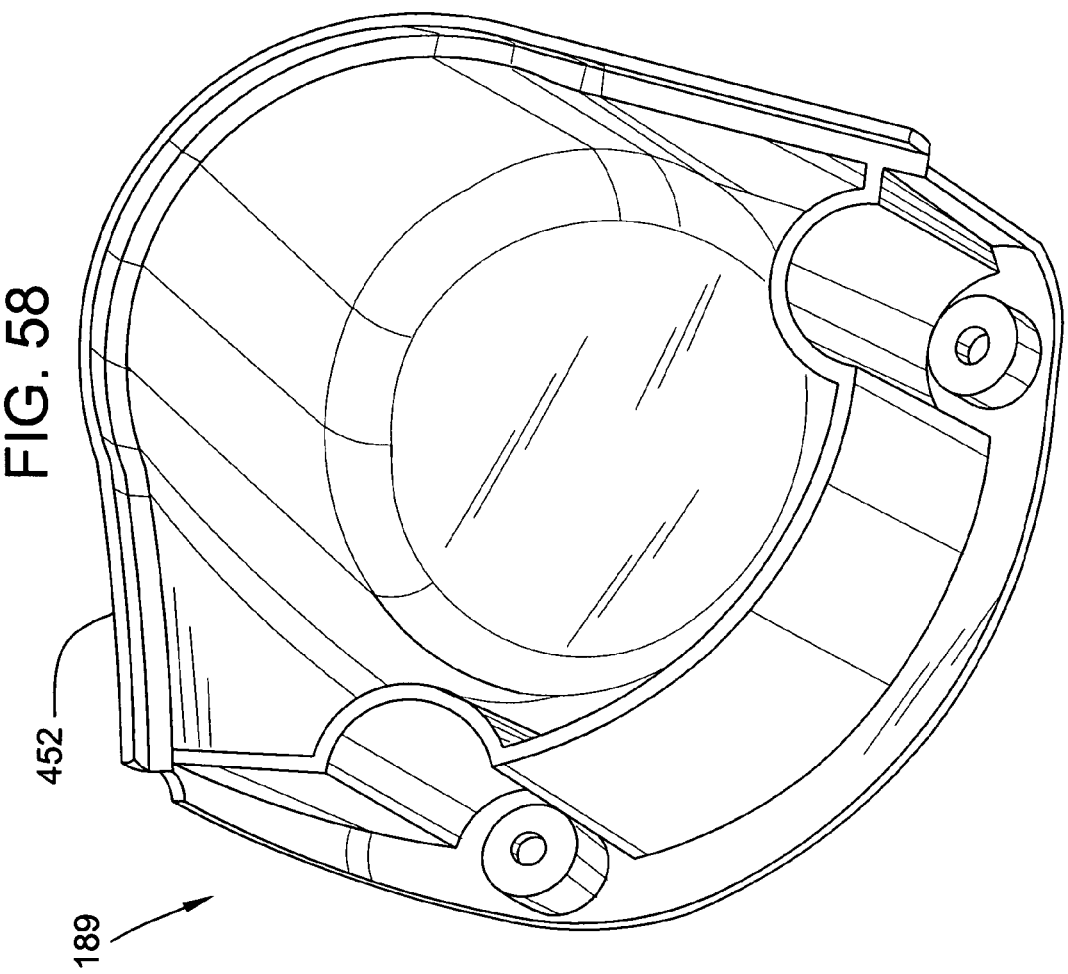
FIG. 58 is a bottom perspective view of the cover of FIG. 51.

Referring to FIG. 54, the cover 189 includes a notch 444 in a rear end wall 446. When the cover 189 is mounted over the second compartment 185 of the mounting foot, the notch 444 is substantially aligned with the opening 292 of the compartment 185, as shown in FIG. 26. Referring to FIGS. 56 and 57, the cover 189 includes a dome portion 450. Referring to FIG. 58, the cover 189 includes a lip 452 which can extend about a perimeter 454 of the second compartment 185, as shown in FIG. 15. At least a portion of the lip 452 can overlap the perimeter 454.

In some embodiments, the cover can be what is sometimes referred to as a "hot mirror" wherein the cover allows visible light to pass through it but reflects back inwardly infrared light so as to diminish the amount of heat transferred outwardly. With such a cover, it can be possible to locate a lamp housed within it closer to materials which would otherwise be susceptible to melting and/or damage from heat.

Figure 60:
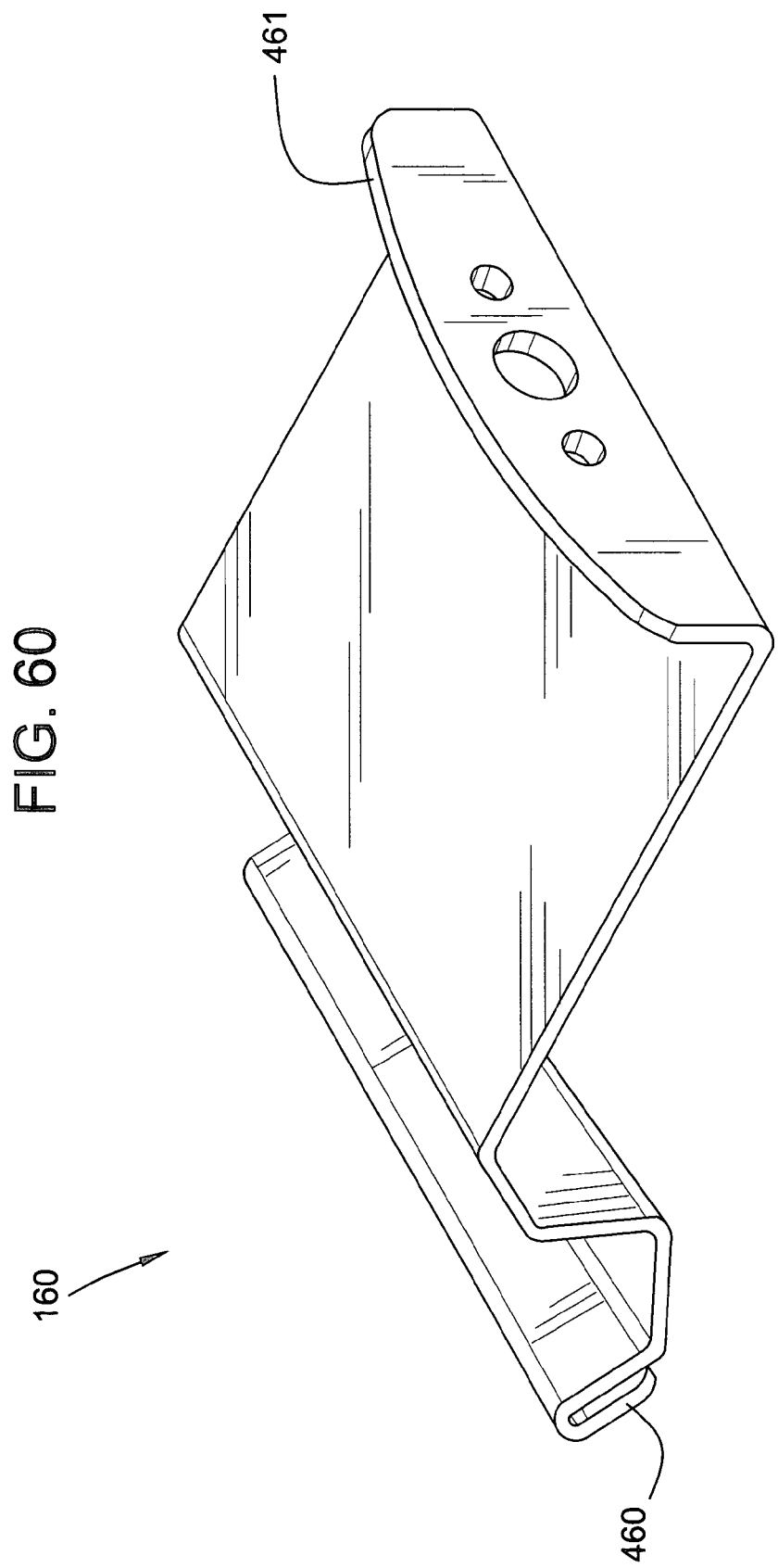
FIG. 60 is a perspective view of a connecting bracket of the mounting foot of FIG. 10.
Figure 61:
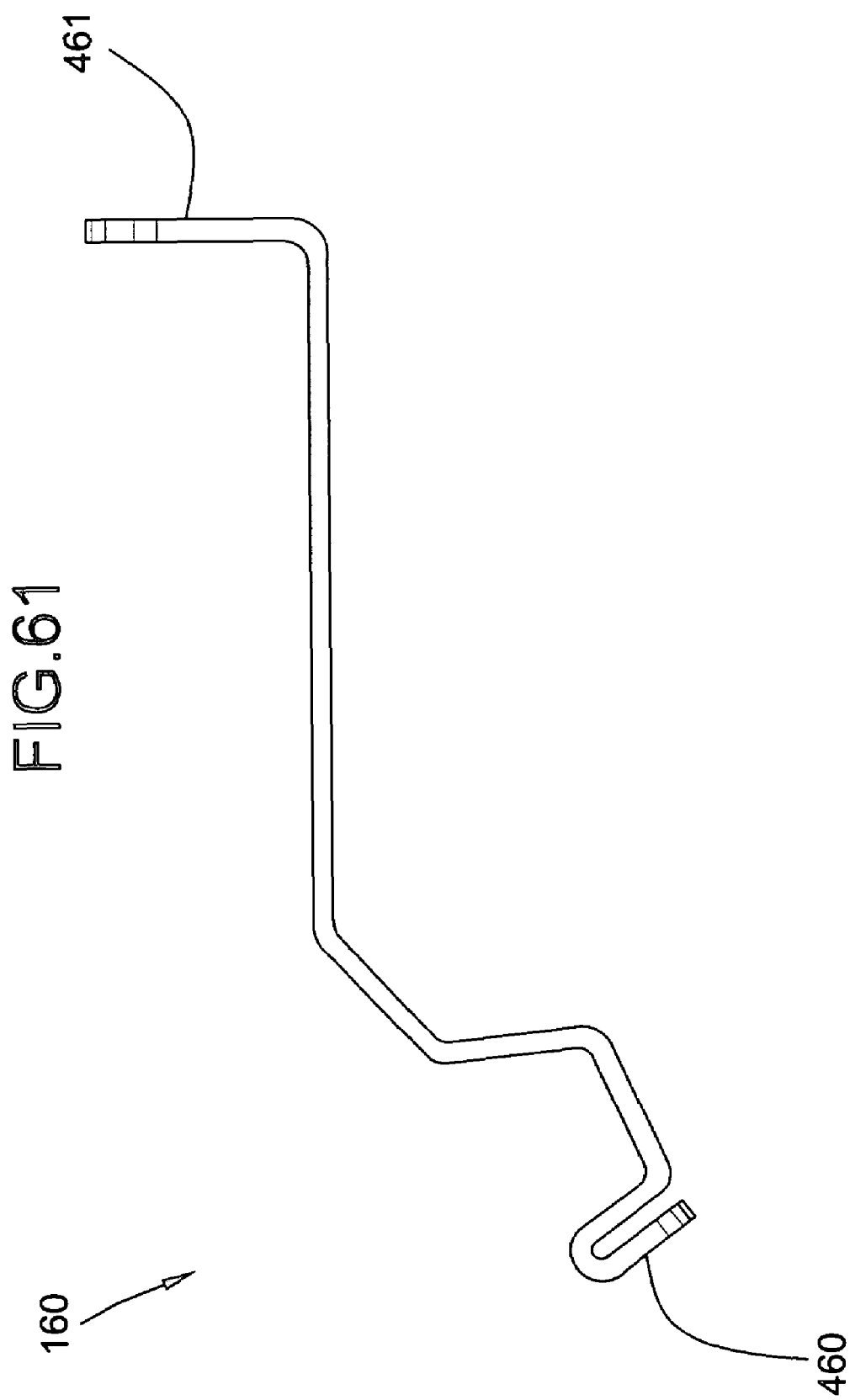
FIG. 61 is a side elevational view of the connecting bracket of FIG. 60.
Figure 62:
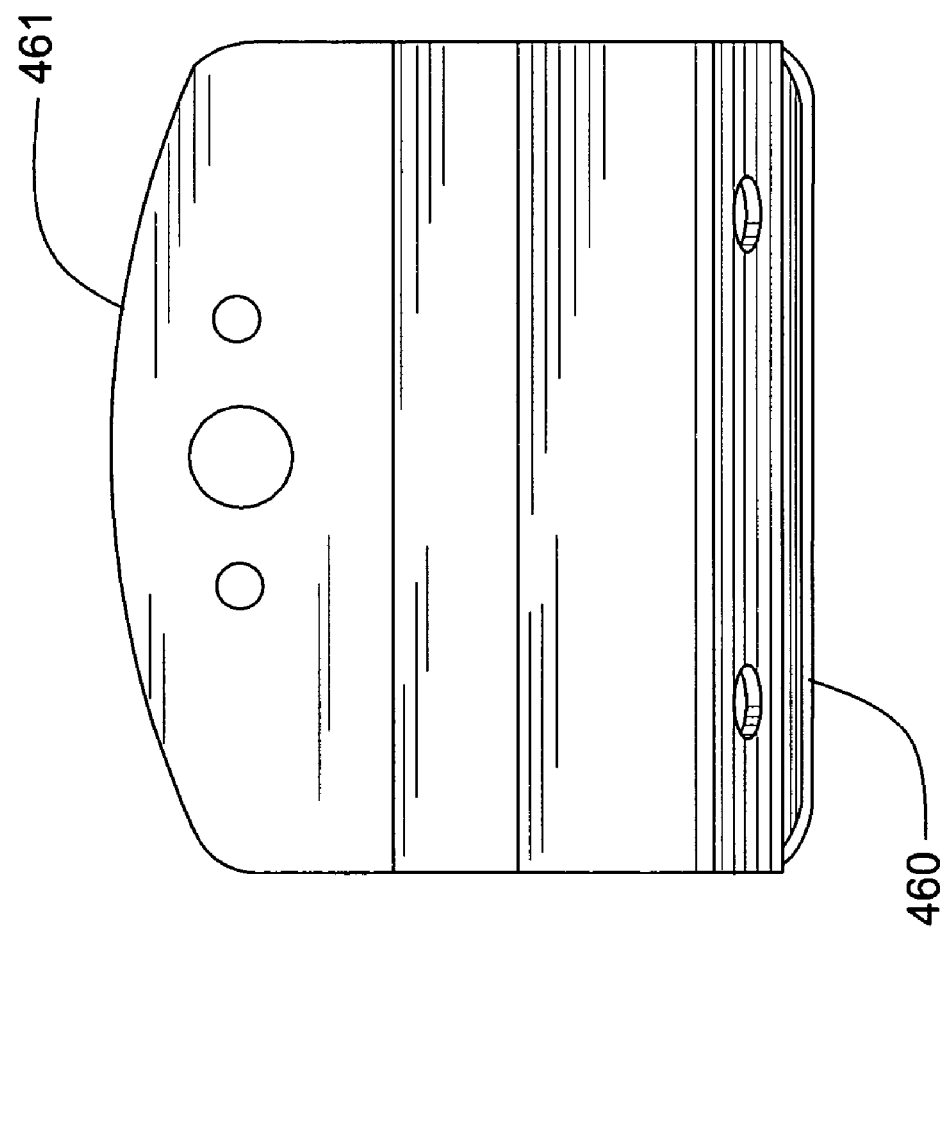
FIG. 62 is an end elevational view of the connecting bracket of FIG. 60.

Referring to FIGS. 60-62, the connecting bracket or roof strap 160 is shown. The roof strap 160 can be made from cold-rolled steel, for example, and provided for securing each of the mounting feet to the roof of the vehicle 130, as shown in FIG. 1. A first end 460 of the strap 160 can be secured under a rain gutter of the vehicle and a second end 461 of the strap 160 can be secured to the respective mounting foot by way of a bolt 458, for example, through the roof strap 160 and the strap mounting hole 470 of the mounting foot 120, as shown in FIG. 17.

Figure 63:
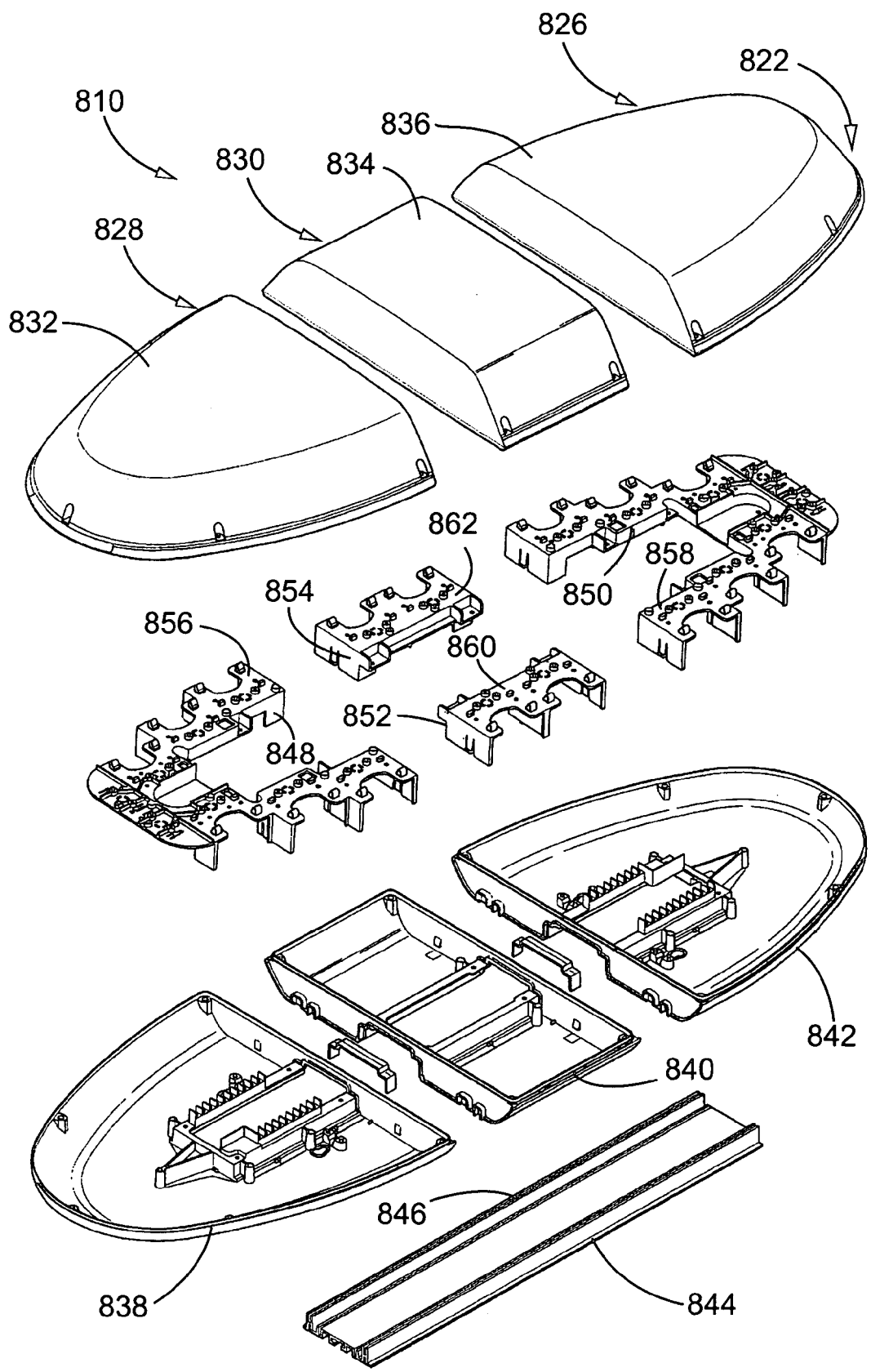
FIG. 63 is an exploded view of another embodiment of a light bar suitable for use in the present invention.

Referring to FIG. 63, another embodiment of a light bar 810 is shown. The light bar 810 can be substantially similar to the light bar shown and described in U.S. Pat. No. 5,884,997 to Stanuch et al., which issued on Mar. 23, 1999. In other embodiments of the signaling assembly, the light bar can be similar to the light bar shown and described in U.S. Pat. No. RE36,245 to Stanuch et al., which issued on Jul. 6, 1999. In yet other embodiments, the signaling assembly can include a light bar commercially available from Federal Signal of Oak Brook, Ill., such as one form the group including multi-level light bars, such as those marketed under the trade names VISTA Strobe, VISTA Halogen, and CUDA Spectre™, v-shaped light bars, such as those marketed under the trade names Premium Vision®, Smart Vector®, and Vector®; and single-level light bars, such as those marketed under the trade names Jetstream, JetStrobe Plus, Arjent™, Raydian™, and StreetHawk®, for example.

The light bar 810 shown in FIG. 63 is a multi-level light bar and has a housing 822 with a generally elliptical shape and a plurality of lights disposed inside the housing. The light bar 810 can be mounted on the emergency vehicle by means of the mounting feet, with the lengthwise direction of the light bar transverse to the forward direction of the vehicle.

In the illustrated embodiment, the light bar 810 has three sections, including a left side section 826, a right side section 828, and a center section 830. Another center section can be added to the light bar to allow incorporation of more lights in the light bar. Each section of the housing has a set of interfitting upper and lower shells which form a closed container. Thus, the housing includes upper shells 832, 834, 836, and the corresponding lower shells 838, 840, 842. The upper shells join the respective lower shells at a seam which surrounds the light bar. The lights in the light bar 810 are arranged in two tiers, one above the seam and one below the seam, to provide a variety of warning functions.

The upper and lower shells of each section interfit to form a substantially sealed container for protecting light fixtures mounted therein from the elements in the environment. The shells are preferably molded of a substantially transparent, high-impact plastic material, such as polycarbonate, for example, and are preferably clear, although they may be colored, or certain portions of the shells may be made opaque to prevent light emission in certain selected directions.

FIG. 63 shows the basic structural components of the light bar 810 without the lights mounted therein. As illustrated, the housing includes three sections 828, 830, 826 with upper shells 832, 834, 836 and lower shells 838, 840, 842, respectively. The lower shells 838, 840, 842 of the three sections are rigidly secured to a structural support member for structural support. In the illustrated embodiment, the structural support is an extruded beam 844 which has a length shorter than the overall length of the light bar. The beam 844 can be made from any suitable metal, such as, aluminum, for example. The structural rigidity of the light bar is further enhanced by the use of interlocking ribs 846 disposed on the opposing sides of adjacent lower shells.

The light bar can have a modular construction which is achieved by the use of trays with cells for mounting lights. As illustrated in FIG. 63, the side sections 826, 828 have side trays 850, 848, respectively, disposed therein in the recesses of the lower shells 838, 842 around the ends of the beam 844. The center section 830 has a front tray 852 and a rear tray 854 disposed in the recesses in the lower center shell 840 on the two sides of the beam 844. The trays are preferably molded of plastic.

The trays 848, 852, 854, 850 are attached to the respective lower shells 838, 840, 842. Each tray 848, 852, 854, 850 can include a plurality of vertical dividers which define an associated plurality of light cells (indicated by arrows in FIG. 63) for receiving standardized light fixture components, for example. The thickness of the trays is such that the tops 856, 858, 860, 862 of the trays when mounted in the lower shells have a height that substantially matches that of the seam of the housing. The tops of the trays separate a lower tier of lights which is below the seam from an upper tier of lights above the seam. The tops of the trays also provide a platform for mounting lights on the upper tier.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting foot for mounting a light bar to an exterior surface of a vehicle, the mounting foot comprising:
    a base, the base having a light bar mounting surface for supporting the light bar;
    a vehicle connector for connecting said mounting foot to the vehicle, the vehicle connector secured to the base; and
    a signaling device mounted to the base;
    wherein the base includes a signaling device mounting surface and an underside, the signaling device being disposed on the signaling device mounting surface, the light bar mounting surface and the signaling device mounting surface being offset with respect to each other, and the underside having a vehicle mounting surface engageable with the vehicle, the vehicle mounting surface in opposing relationship to the light bar mounting surface, the signaling device mounting surface being disposed between the light bar mounting surface and the vehicle mounting surface.

2. The mounting foot according to claim 1 wherein the base has a first end and an opposing second end, the light bar mounting surface disposed adjacent the first end of the base, the signaling device disposed adjacent the second end of the base.

3. The mounting foot according to claim 1 wherein the base includes a contoured profile, the contoured profile configured to substantially conform to at least a portion of the exterior surface of the vehicle.

4. The mounting foot according to claim 1 wherein the base includes a sidewall, the sidewall and the signaling device mounting surface defining a recess, the signaling device disposed in the recess.

5. The mounting foot according to claim 4 wherein the signaling device includes at least one electrical wire extending therefrom, and the recess includes an opening through the base, the opening sized to allow the at least one electrical wire to extend therethrough.

6. The mounting foot according to claim 4 wherein the base includes an outer end, the outer end including a corner, the recess disposed at the corner of the outer end of the base.

7. The mounting foot according to claim 4, further comprising:
    a cover, the cover defining an interior, the signaling device disposed within the interior of the cover.

8. The mounting foot according to claim 7, wherein the cover is removably mounted to the base.

9. The mounting foot according to claim 7 wherein the cover comprises a transparent material.

10. The mounting foot according to claim 9 wherein the cover comprises a colored material.

11. The mounting foot according to claim 8, further comprising:
    a seal member associated with the recess, the seal member cooperating with the cover to substantially seal the interior.

12. The mounting foot according to claim 11 wherein the base includes an underside, the underside having a vehicle mounting surface engageable with the vehicle, the mounting foot further comprising:
    a second seal member, the second seal member being disposed in contacting relationship with the vehicle mounting surface of the base and in substantial alignment with the recess.

13. The mounting foot according to claim 1 wherein the base includes a mounting hole, the vehicle connector includes a roof clamp and a bolt, the roof clamp being substantially rigid and having a flange with an opening therethrough, the bolt extending through the opening of the roof clamp and into the mounting hole to secure the roof clamp to the base.

14. The mounting foot according to claim 1 wherein the signaling device comprises a light source.

15. The mounting foot according to claim 14 wherein the light source is pivotally mounted to the base.

16. The mounting foot according to claim 1 wherein the signaling device has at least one of a visual signaling feature and an aural signaling feature.

17. The mounting foot according to claim 1 further comprising:
    a second signaling device mounted to the base.

18. The mounting foot according to claim 16 wherein the base includes first and second signaling device mounting surfaces, the signaling device mounting surfaces each being in offset relationship to the light bar mounting surface, the first and second signaling devices being respectively mounted to the first and second signaling device mounting surfaces.

19. The mounting foot according to claim 18 wherein the base includes first and second sidewalls, the sidewalls respectively cooperating with the first and second signaling device mounting surfaces to define a first recess and a second recess, the first and second signaling devices disposed in the first and second recesses, respectively.

20. The mounting foot according to claim 19 wherein the base includes an outer end, the outer end including first and second corners, the first and second recesses respectively disposed at the first and second corners of the outer end of the base.

21. The mounting foot according to claim 19, further comprising:
   first and second covers, the first and second covers each defining an interior, the first and second signaling device disposed in the interiors of the first and second covers, respectively.

22. A vehicle comprising:
   an exterior surface; and
   a signaling system mounted to the exterior surface, the signaling system including:
      a light bar comprising a plurality of signaling devices supported on and distributed along a base member;
      a mounting foot having a generally planar light bar mounting surface supporting the base member of the light bar, the mounting foot secured to the exterior surface; and
      a signaling device mounted to the mounting foot said mounting foot includes a first sidewall and a first signaling device mounting surface, the first signaling device mounting surface being offset with respect to the light bar mounting surface, the first sidewall cooperating with the first signaling device mounting surface to define a first recess, said first signaling device disposed in the first recess.

23. The vehicle according to claim 22, wherein the base member of the light bar includes a pair of ends, the vehicle further comprising:
   a second mounting foot, the first and second mounting feet connected to the base member of the light bar such that the mounting feet are respectively disposed adjacent the first and second ends thereof, the second mounting foot connected to the exterior surface.

24. The vehicle according to claim 22 further comprising:
   a second signaling device mounted to the mounting foot.

25. The vehicle according to claim 22 wherein the mounting foot includes an outer end, the outer end including first and second corners, the first recess disposed at one of the first and second corners of the outer end thereof.

26. The vehicle according to claim 22 wherein the light bar includes an end, the mounting foot disposed at the end of the light bar, and the signaling device is mounted to the mounting foot such that the signaling device extends outwardly a predetermined distance from the end of the light bar.

27. The vehicle according to claim 22, wherein the light bar includes a pair of ends, the vehicle further comprising:
   a second mounting foot, the second mounting foot connected to the light bar and to the exterior surface of the vehicle;
   a second signaling device, the second signaling device connected to the second mounting foot;
   wherein, the first and second mounting feet are connected to the light bar such that the mounting feet are respectively disposed adjacent the first and second ends thereof, and the first and second signaling devices are mounted to the first and second mounting feet, respectively, such that the signaling devices each extend outwardly a predetermined distance from the respective first and second ends of the light bar.

28. The vehicle according to claim 22 wherein the light bar comprises a single level light bar.

29. The vehicle according to claim 22 wherein the light bar comprises a multi-level light bar.

30. The vehicle according to claim 22 wherein the vehicle is an emergency vehicle.

31. An apparatus for mounting a light bar with a housing for light sources to a vehicle comprising:
   a mounting foot joining the light bar to the vehicle;
   at least one fastener for detachably securing the light bar to the mounting foot;
   a mounting foot light source; and
   a separate housing for the mounting foot light source supported on the mounting foot which is separate from the housing for the light sources of the light bar.

32. The apparatus of claim 31 wherein the housing includes an opening for communicating power to the light source in the housing.

33. The apparatus of claim 31 wherein the housing includes a transparent cover that protects the light source while at the same time allows light from the light source to pass through it.

* * * * *